(12) United States Patent
Miura et al.

(10) Patent No.: US 6,876,476 B1
(45) Date of Patent: Apr. 5, 2005

(54) DISPLAY DEVICE AND PROCESS FOR PRODUCTION THEREOF

(75) Inventors: Naoko Miura, Kawasaki (JP); Taiko Motoi, Atsugi (JP); Hiroshi Matsuda, Isehara (JP); Tsutomu Ikeda, Hachiohji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/572,328

(22) Filed: May 18, 2000

(30) Foreign Application Priority Data

| May 18, 1999 | (JP) | 11-137790 |
| May 18, 1999 | (JP) | 11-137991 |
| Jun. 9, 1999 | (JP) | 11-163081 |
| Jun. 9, 1999 | (JP) | 11-163093 |
| Oct. 29, 1999 | (JP) | 11-308555 |
| Oct. 29, 1999 | (JP) | 11-308556 |
| Oct. 29, 1999 | (JP) | 11-308559 |
| Oct. 29, 1999 | (JP) | 11-308560 |

(51) Int. Cl.$^7$ .............................. G02F 1/03; G02F 1/07
(52) U.S. Cl. .................. 359/252; 359/296; 359/253
(58) Field of Search ................ 359/252, 452, 359/296, 253; 345/107–108, 105, 111, 84

(56) References Cited

U.S. PATENT DOCUMENTS

| 5,904,790 A | * | 5/1999 | Sheridon .................. 156/83 |
| 5,961,804 A | * | 10/1999 | Jacobson et al. ............ 359/296 |
| 6,072,621 A | | 6/2000 | Kishi et al. .................. 359/296 |
| 6,222,513 B1 | * | 4/2001 | Howard et al. ............... 345/84 |
| 6,300,932 B1 | * | 10/2001 | Albert ......................... 345/107 |
| 6,538,801 B2 | * | 3/2003 | Jacobson et al. ............ 359/296 |
| 2003/0137717 A1 | * | 7/2003 | Albert et al. ............... 359/296 |

FOREIGN PATENT DOCUMENTS

| JP | 49-24696 | 3/1974 |
| JP | 59-34518 | 2/1984 |
| JP | 1-114828 | 5/1989 |
| JP | 2-284124 | 11/1990 |

* cited by examiner

*Primary Examiner*—Jordan M. Schwartz
*Assistant Examiner*—Jessica Stultz
(74) *Attorney, Agent, or Firm*—Fitzpatrick, Cella, Harper & Scinto

(57) ABSTRACT

A display device includes a first substrate and a second substrate disposed opposite to each other, and a display medium including an insulating liquid and electrophoretic colored particles dispersed therein and disposed between the first and second substrates. A first electrode and a second electrode are provided for applying a voltage to the display medium so as to move the colored particles between the first and second electrodes to effect a display depending on a voltage applied to the first and second electrodes. The electrophoretic colored particles are distributed uniformly without localization by incorporating the display medium in a plurality of light-transmissive tubes, and disposing and fixing the plurality of tubes in intimate contact with each other between the first and second substrates.

38 Claims, 57 Drawing Sheets

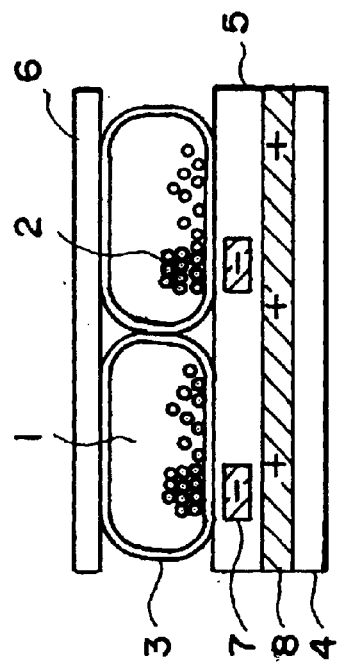
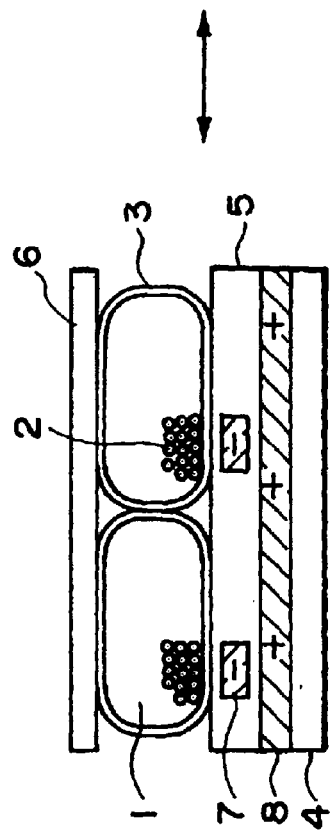
FIG. 7A
FIG. 7B

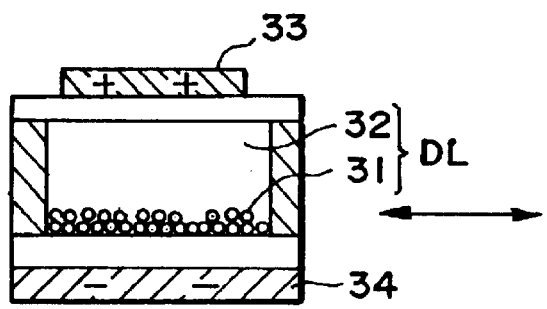
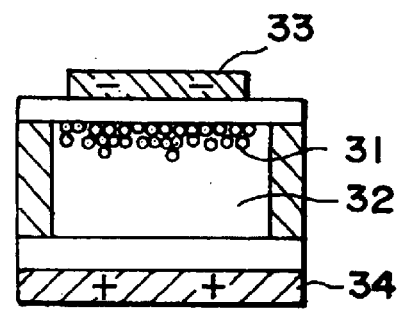
FIG. 13A
PRIOR ART
FIG. 13B
PRIOR ART
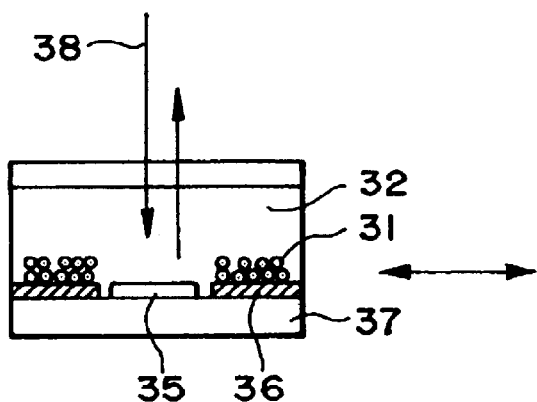
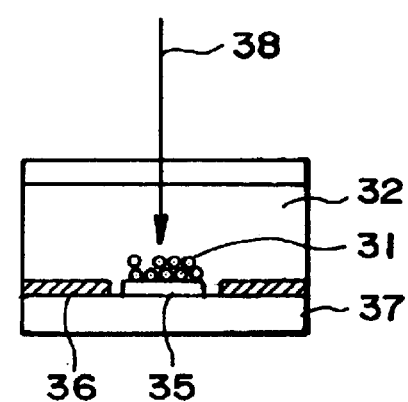
FIG. 14A
PRIOR ART
FIG. 14B
PRIOR ART

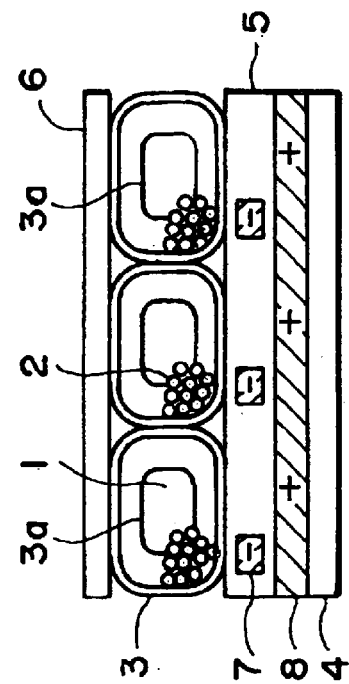
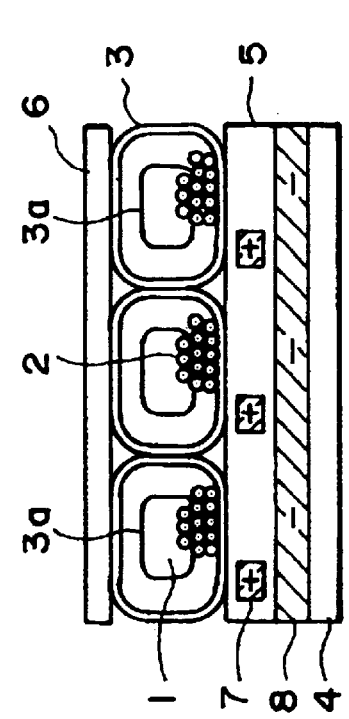

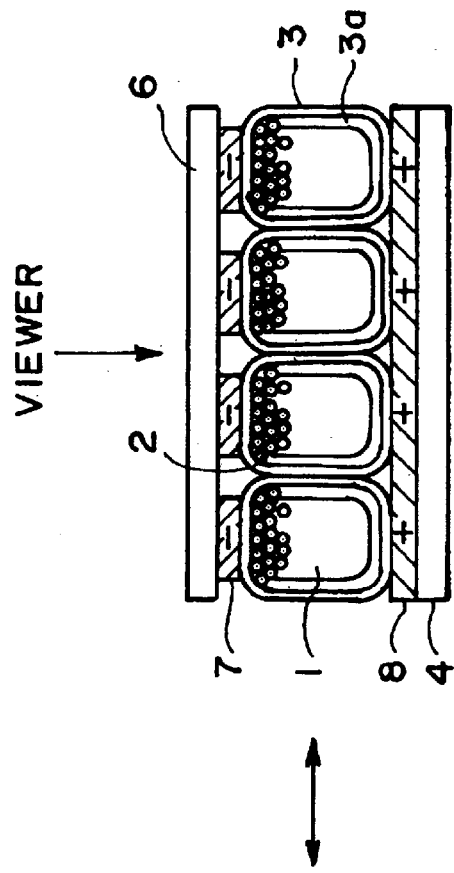
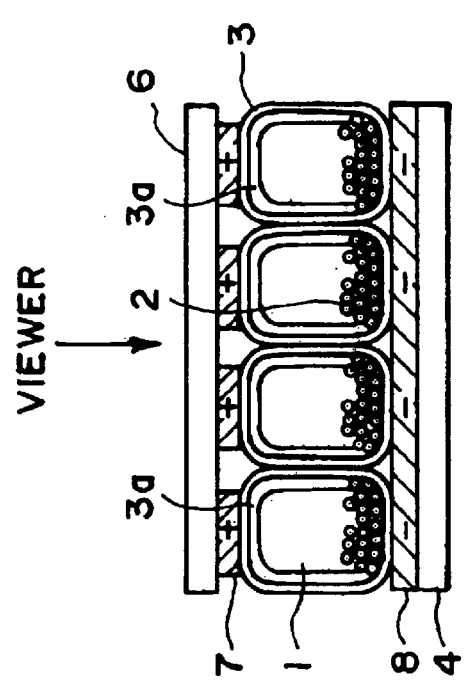

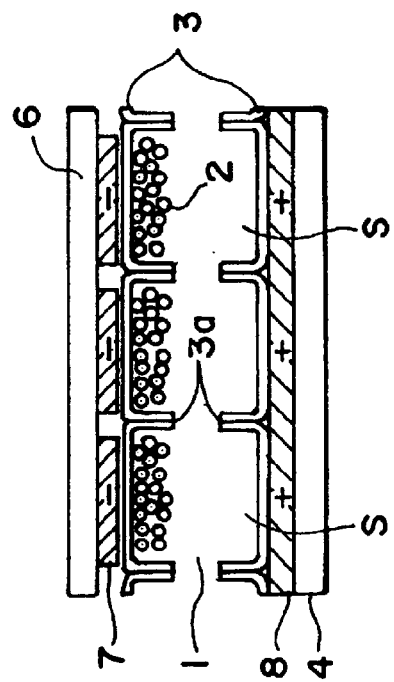
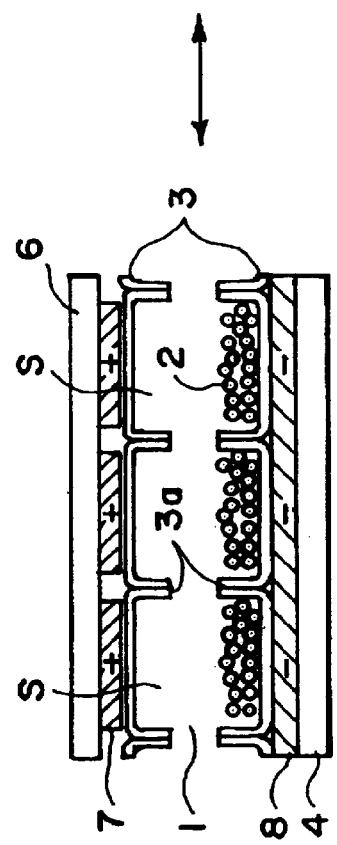

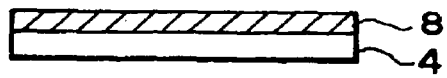
F I G. 37A
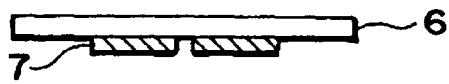
F I G. 37B
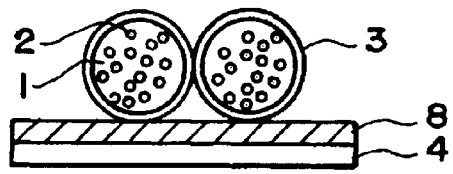
F I G. 37C
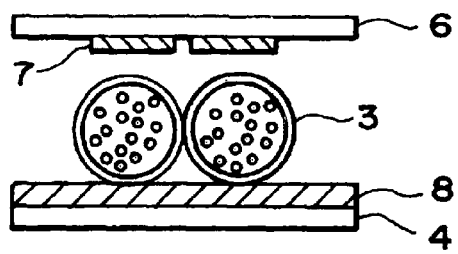
F I G. 37D
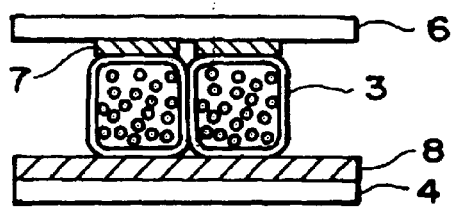
F I G. 37E
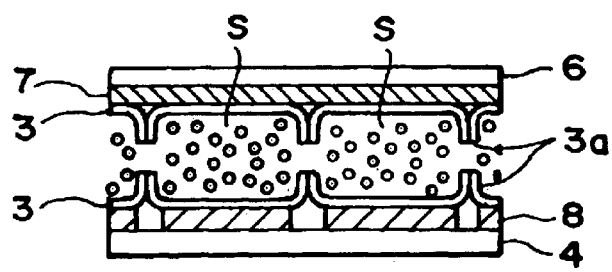
F I G. 37F

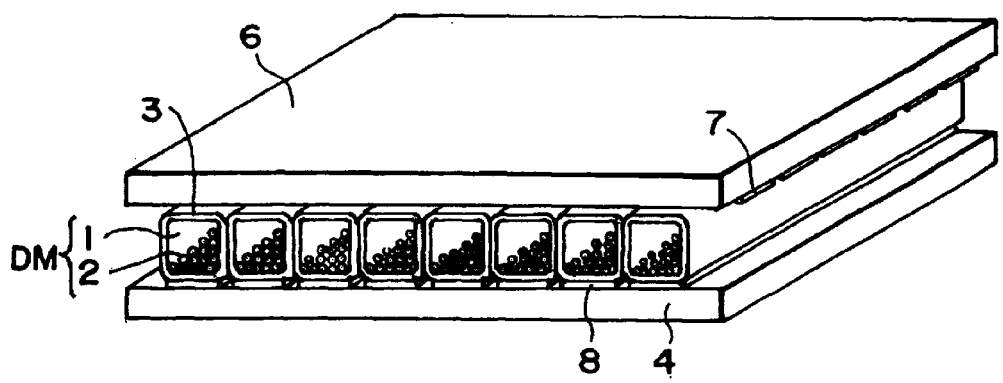
F I G. 39
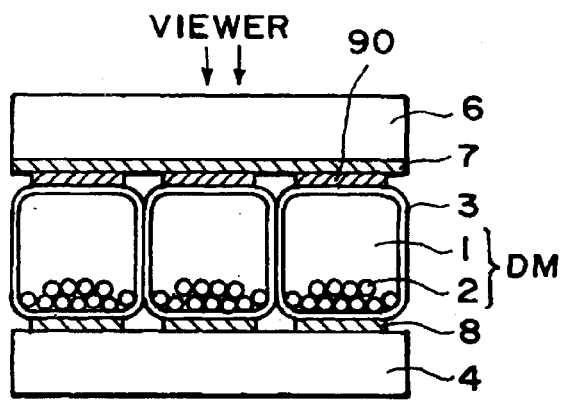
F I G. 40A
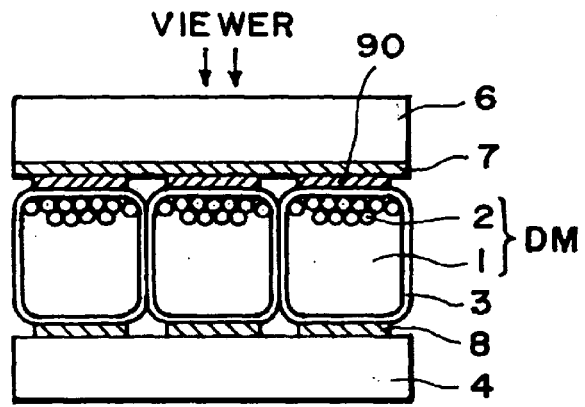
F I G. 40B

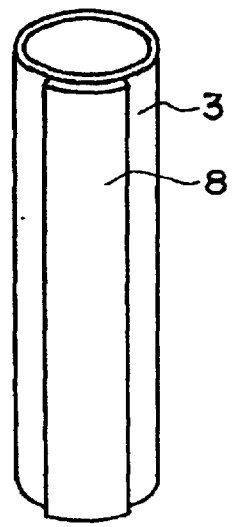
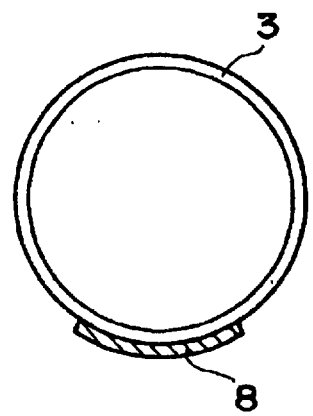
FIG. 41A  FIG. 41B
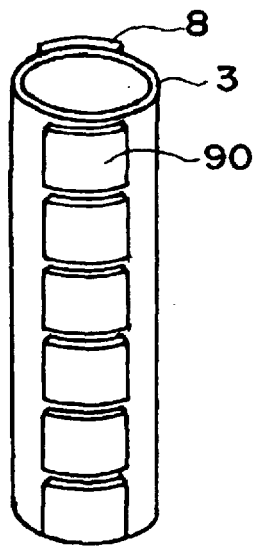
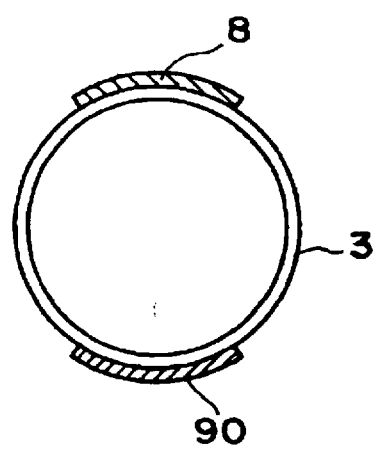
FIG. 41C  FIG. 41D

F I G. 43A
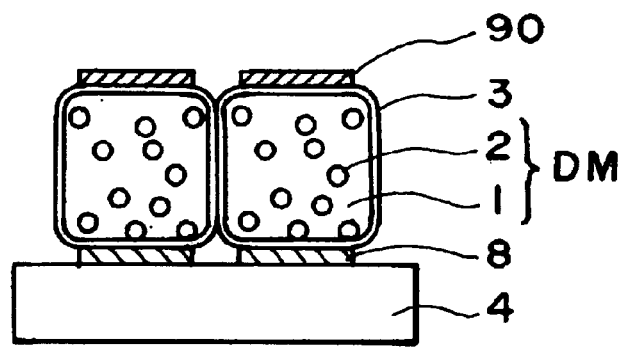
F I G. 43B
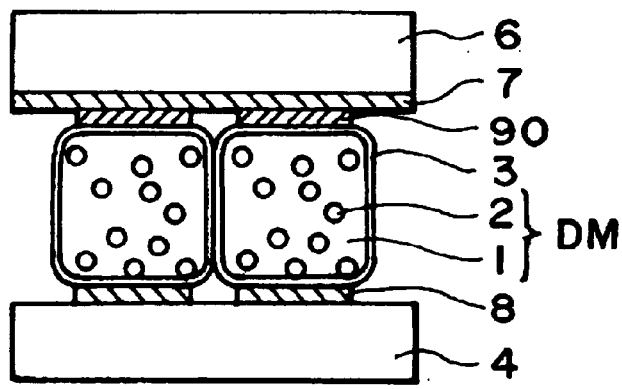
F I G. 43C

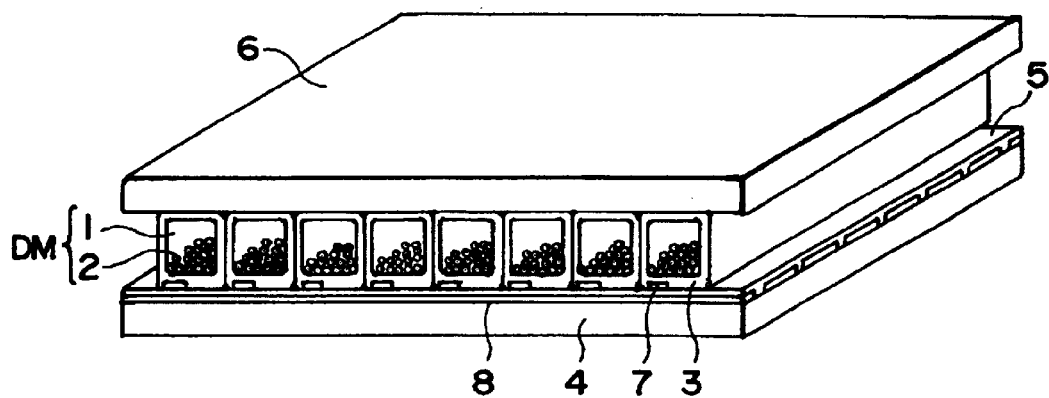
F I G. 44
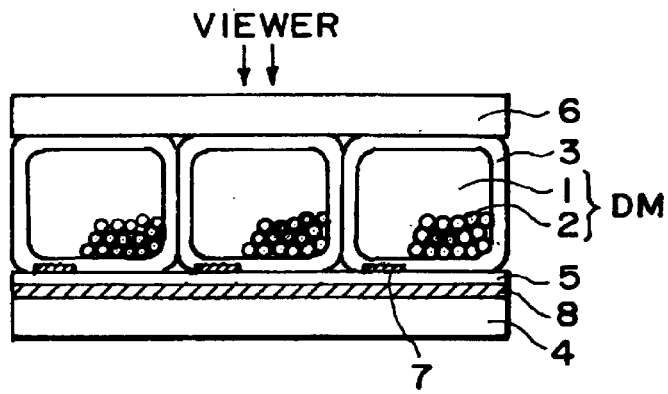
F I G. 45A
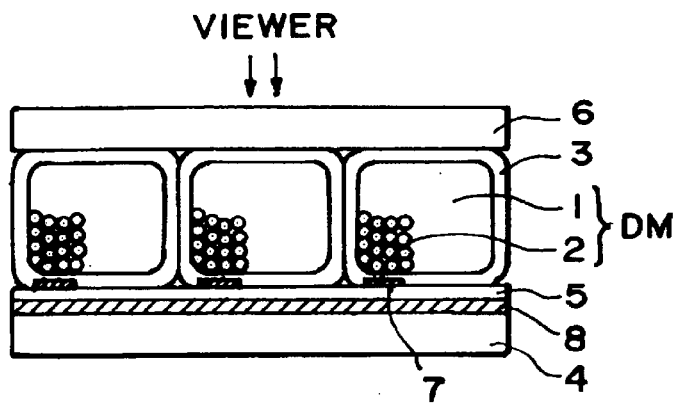
F I G. 45B

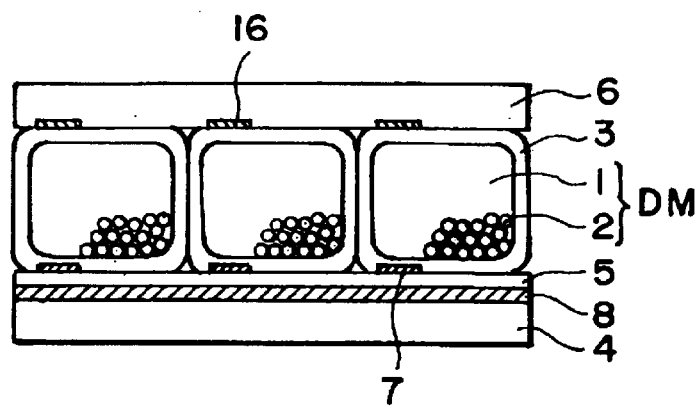
F I G. 46
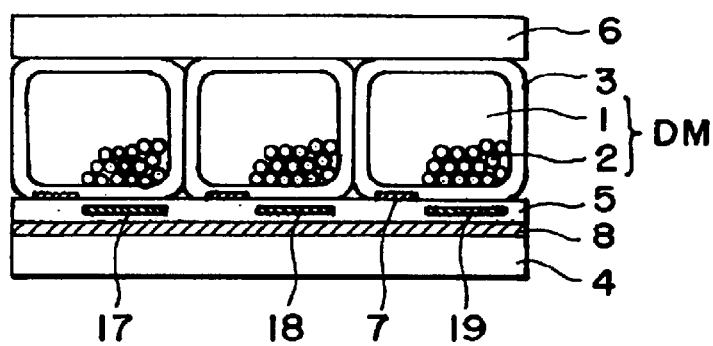
F I G. 47
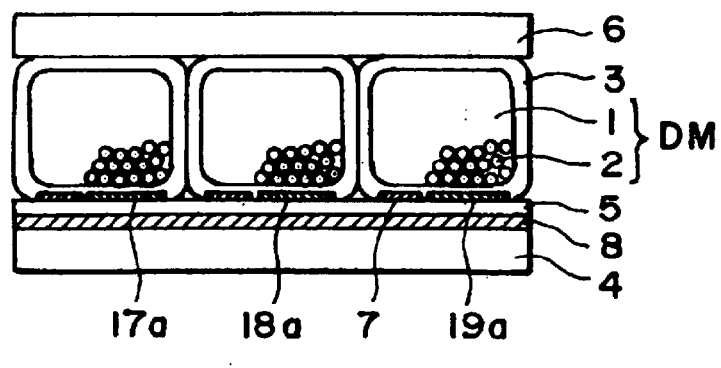
F I G. 48

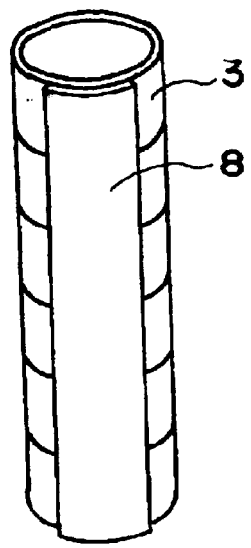 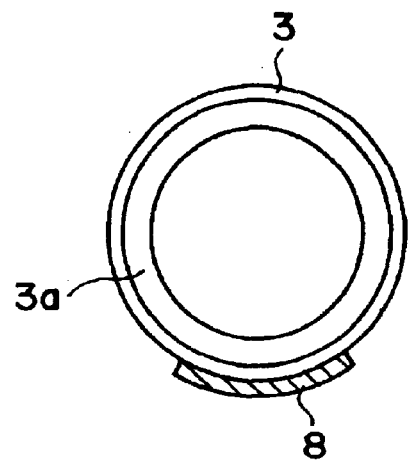
FIG. 57A  FIG. 57B
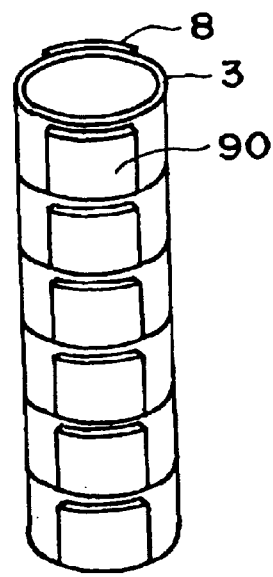 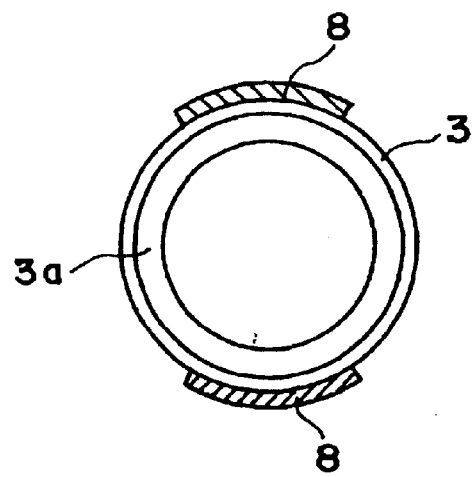
FIG. 57C  FIG. 57D

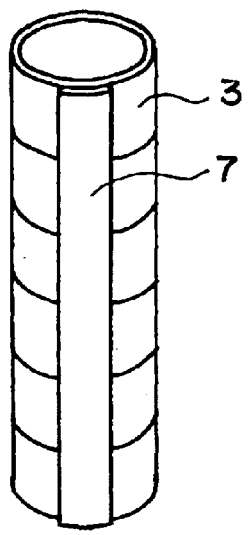
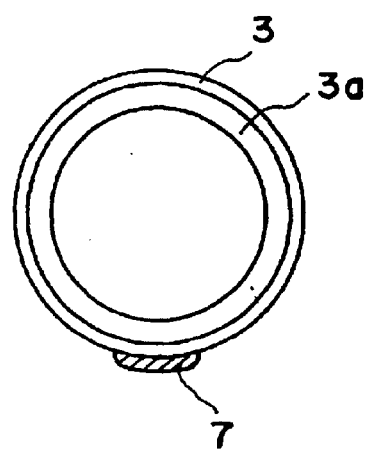
FIG. 67A    FIG. 67B
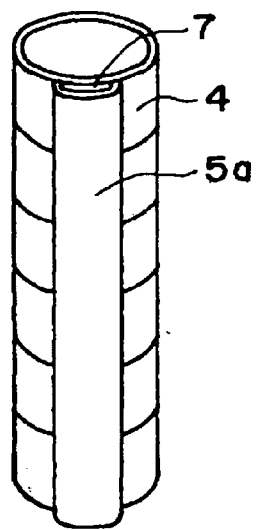
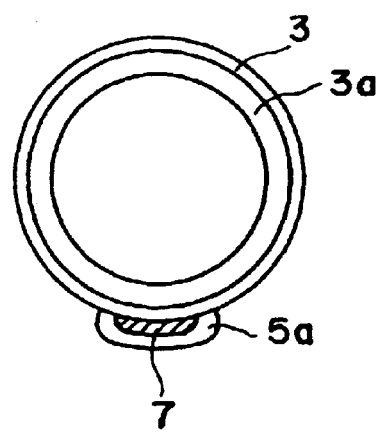
FIG. 67C    FIG. 67D

DISPLAY DEVICE AND PROCESS FOR PRODUCTION THEREOF

FIELD OF THE INVENTION AND RELATED ART

The present invention relates to a display device of the type wherein electrophoretic particles or charged migrating particles are moved to effect a display, and a process for producing such a display device.

In recent years, accompanying the progress of data processing apparatus, there has been an increasing demand for a display device requiring a small power consumption and a small thickness, and extensive study and development have been made on devices satisfying such a demand. Among these, a liquid crystal display device wherein an alignment of liquid crystal molecules is electrically controlled to change optical characteristics has been extensively developed and commercialized as a display device satisfying the demand described above.

However, such liquid crystal display devices are still accompanied with problems of visual load on human eyes, such as difficulty of recognizing characters on display depending on a viewing angle or due to reflection light, and flickering and low luminance of light sources. Accordingly, extensive study is still made for new-types of display devices causing less visual load on human eyes.

Reflection-type display devices are expected from the viewpoints of lower power consumption and less visual load on human eyes. As a type thereof, there has been known an electrophoretic display device. As illustrated in FIGS. 13A and 13B, such an electrophoretic display device, in principle, includes a pair of electrodes 33 and 34 disposed opposite to each other and a dispersion layer DL comprising a mixture of charged electrophoretic particles 31 and an insulating liquid 32. In the display, when a voltage is applied across the dispersion layer DL between the electrodes 33 and 34, the charged electrophoretic particles 31 are attracted toward an electrode of a polarity opposite to the charge polarity thereof.

Incidentally, in such an electrophoretic display device, the electrophoretic particles 31 may be colored, and also the insulating liquid 32 may be colored, e.g., by dyeing, so as to effect a color display. More specifically, when the colored electrophoretic particles 31 are attached to the electrode 33 surface disposed closer to a viewer as shown in FIG. 13B, the colors of the electrophoretic particles 31 is displayed, and on the other hand, when the electrophoretic particles 31 are attached to the electrode 34 surface disposed remoter from the viewer as shown in FIG. 13A, the color of the dyed insulating liquid 32 is displayed.

Another type of electrophoretic display device as illustrated in FIGS. 14A and 14B has been proposed by, e.g., Japanese Laid-Open Patent Application (JP-A) 49-24696, wherein a pair of neighboring electrodes are disposed on one substrate so as to effect a display by moving electrophoretic particles parallel to the substrates. Referring to FIGS. 14A and 14B, the electrophoretic display device includes a transparent electrode 35 and an opaque electrode 36 juxtaposed on one substrate 37.

Now, if the electrophoretic particles 31 are colored in black and the substrate 37 is colored in white, when the electrophoretic particles 31 are attached to the opaque electrode 36 surface as shown in FIG. 14A, external light 38 is transmitted through a transparent electrode 35 and reflected by the white substrate 37, whereby the portion of the transparent electrode 35 substantially looks white. On the other hand, when the electrophoretic particles 31 are attached to the transparent electrode 35 surface as shown in FIG. 14B, the device (or cell) looks black because of little reflection light.

When such an electrophoretic display device is repetitively used for a long period, the density distribution of the electrophoretic particles 31 is liable to be biased or ununiform, thus causing display irregularity. In order to obviate such biased density distribution, it has been proposed to divide the dispersion layer into small sections (cells) by disposing partitioning in walls at a certain interval, e.g., by JP-A 59-34518 and JP-A 2-284124.

Further, JP-A 1-114828 has proposed a method of disposing porous spacers swellable with a dispersion medium, followed by injection of a dispersion system to cause the swelling of the spacers to define discrete small sections. In this method, a plurality of partitioning walls defining discrete small sections are formed substantially simultaneously with injection of the dispersion system, so that separate formation of the partitioning wall is unnecessary.

Incidentally, a type of display device including a plurality of light-transmissive tubes has been proposed by JP-A 49-96694, wherein a plurality of tubes filled with a liquid crystal material are disposed parallel to each other to provide a display device having a uniform thickness and capable of preventing intrusion of moisture and gas from the environment.

However, in such a known electrophoretic display device wherein the dispersion layer is divided into small sections (cells) by forming partitioning walls at certain intervals for obviating ununiform density distribution of electrophoretic particles, the electrophoretic particles have to be evenly distributed to respective cells, but such distribution is not easy. Further, a series of production steps including formation of partitioning walls on a substrate, uniform distribution of a display medium comprising a mixture of electrophoretic particles and an insulating liquid and sealing of the display medium, requires much time and a substantial cost.

Further, in the case of color display using plural colors of electrophoretic particles and/or insulating liquid sealed within cells separated by partitioning walls, the mixing of colors between adjacent cells is liable to be caused during the production process, so that selective filling of electrophoretic particles or insulating liquid of a desired color is difficult and therefore a further difficulty is encountered.

SUMMARY OF THE INVENTION

In view of the state of prior art as described above, a principal object of the present invention is to provide an (electrophoretic) display device capable of reducing display irregularity and yet capable of production at a reduced cost.

According to the present invention, there is provided a display device, comprising: a first substrate and a second substrate disposed opposite to each other, a display medium comprising an insulating liquid and electrophoretic colored particles dispersed therein and disposed between the first and second substrates, and a first electrode and a second electrode for applying a voltage to the display medium so as to move the colored particles between the first and second electrodes to effect a display depending on a voltage applied to the first and second electrodes; wherein
  a plurality of light-transmissive tubes are each filled with the display medium and are disposed in intimate contact with each other between the first and second substrates.

In the display device, both the first electrodes and the second electrodes are disposed on the first substrate, so that the colored particles are moved parallel to the substrates by the voltage applied between the first and second electrodes; or the first electrodes and the second electrodes are disposed on the first substrate and the second substrate, respectively, so that the colored particles are moved in a direction vertical to the substrates by the voltage applied between the first and second electrodes.

Each tube may be provided with inner wall projections disposed at a regular interval in a longitudinal direction so as to obstruct the movement of the colored particles.

According to another aspect of the present invention, there is provided a display device, comprising: a first substrate and a second substrate disposed opposite to each other, a display medium comprising an insulating liquid and electrophoretic colored particles dispersed therein and disposed between the first and second substrates, and first electrodes and second electrodes for applying a voltage to the display medium so as to move the colored particles between a pair of first electrode and second electrode to effect a display depending on a voltage between the pair of first electrode and second electrode, wherein a plurality of light-transmissive tubes are each filled with the display medium and are disposed parallel to each other between the first and second substrates, a plurality of the first electrodes in the form of stripes are disposed between the first substrate and the tubes so that each first electrode extends in alignment with an associated one tube, and the second electrodes are disposed to intersect the first electrodes.

According to still another aspect of the present invention, there is provided a process for producing a display device as described above, comprising:

forming a stripe first electrode on an outer surface of and in a longitudinal direction of a light-transmissive tube comprising an insulating material, filling the tube with a display medium comprising an insulating liquid and electrophoretic colored particles dispersed therein, and disposing and fixing a plurality of the tube between a first substrate and a second substrate, one of which has been provided with second electrodes, so that the first electrode on the tube contacts the first substrate. The process may include an optional step of forming projections at a regular interval in a longitudinal direction of each tube on an inner wall of the tube.

These and other objects, features and advantages of the present invention will become more apparent upon a consideration of the following description of the preferred embodiments of the present invention taken in conjunction with the accompanying drawings, wherein identical numerals are used to denote identical or like members.

BRIEF DESCRIPTION OF THE DRAWINGS

FIGS. 13 (13A and 13B) and 14 (14A and 14B) are sectional views illustrating a structure and an operation principle of two types of prior art electrophoretic display devices.

The other figures relate to various embodiments of the invention as follows:

FIGS. 1 to 12, First embodiment,

FIGS. 15 to 20, Second embodiment,

FIGS. 21 to 31, Third embodiment,

FIGS. 32 to 38, Fourth embodiment,

FIGS. 39 to 43, Fifth embodiment,

FIGS. 44 to 54, Sixth embodiment,

FIGS. 55 to 64, Seventh embodiment, and

FIGS. 65 to 70, Eighth embodiment.

More specifically, FIGS. 1, 15, 21, 32, 39, 44, 55 and 61 are schematic perspective views each illustrating an organization of an electrophoretic display device according to an embodiment of the invention.

FIGS. 2A and 2B, 3A and 3B, 4, 5, 6, 7A and 7B; 16A and 16B, 17, 18; 22A and 22B, 23A and 23B, 24A and 24B, 25, 26, 27A and 27B; 33A and 33B, 34A and 34B, 35, 36; 40A and 40B; 45A and 45B, 46, 47, 48, 49A and 49B; 56A and 56B; 62A and 62B, 63A and 63B, 64, 65A and 65B, and 66A and 66B, are sectional views for illustrating an operation of a display device according to an embodiment of the invention. Among the above, FIGS. 3A and 3B, 23A and 23B, 34A and 34B, and 63A and 63B show longitudinal sections of tubes used in the display devices, and the other figures show cross sections of the tubes.

FIGS. 8A, 8B, 58A and 58B are schematic sectional views for illustrating a manner of filling a tube with a display medium.

FIGS. 9A to 9E, 10A to 10E, 11A to 11E, 12A to 12F; 19A to 19E, 20A to 20E; 28A to 28F, 29A to 29E, 30A to 30E, 31A to 31F; 37A to 37F, 38A to 38E; 42A to 42D, 43A to 43C; 51A to 51D, 52A to 52D, 53A to 53D, 54A to 54D; 59A to 59E, 60A to 60D; 68A to 68E, 69A to 69D, and 70A to 70D, are sets of schematic sectional views, each set illustrating steps involved in a process for producing a display device according to an embodiment of the invention.

FIGS. 41A, 41C, 50A, 57A, 57C, 67A and 67C are schematic perspective views for illustrating a tube provided with an electrode on an outer surface.

FIGS. 41B, 41D, 50B, 50C, 50D, 57B, 57D, 67B and 67D are schematic cross-sectional views of such tubes provided with an electrode on an outer surface.

DESCRIPTION OF THE PREFERRED EMBODIMENTS (First Embodiment)

Figure 1:
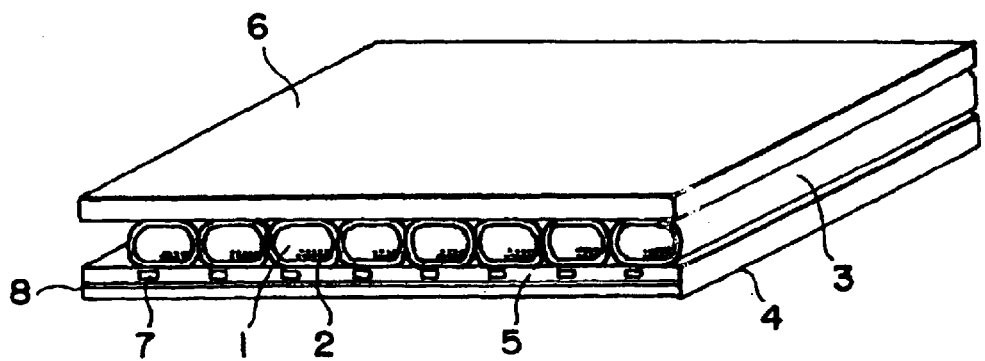
Figure 2A:
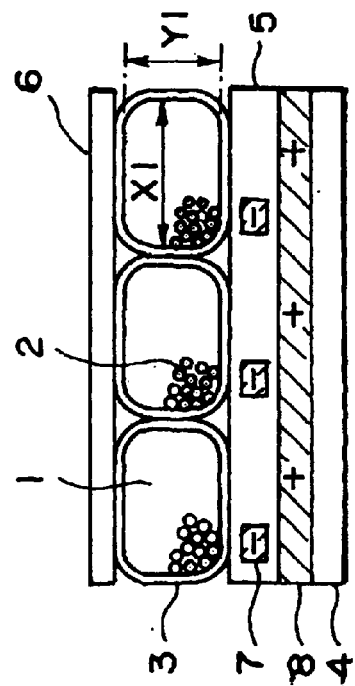
Figure 2B:
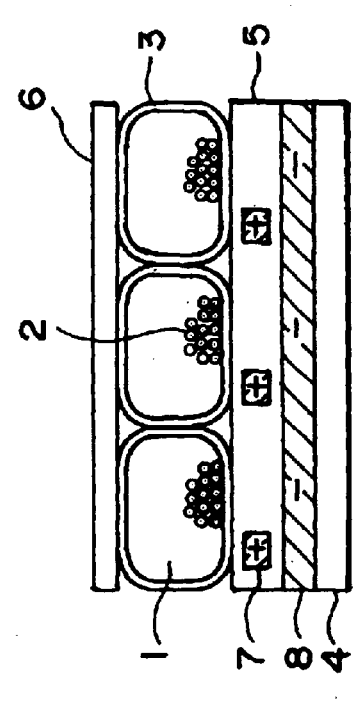

FIG. 1 is a perspective view of an electrophoretic display device according to an embodiment of the present invention, and FIGS. 2A and 2B are partial sectional views thereof for illustrating an operation principle thereof.

Referring to these figures, the display device includes a display medium comprising a transparent insulating liquid 1 and colored electrophoretic particles 2, and light-transmissive tubes 3 each containing the display medium and sandwiched between a first substrate 4 and a second substrate 6. Further, an insulating layer 5 is disposed on the first substrate 4, and the tubes 3 are held between the insulating layer 5 and the second substrate 6. Below the insulating layer 5, second electrodes 7 are locally formed, and first electrodes 8 (only one being shown) are formed further therebelow on the first substrate 4. For convenience of illustration of an inner state, FIG. 1 shows a state of the display device of which the peripheral sealing structure has been removed.

In the display device, the colored electrophoretic particles 2 charged within the transparent insulating liquid 1 are moved horizontally (i.e., in a direction parallel to the extension of the substrate surfaces) between (the positions above) the first electrode 8 and the second electrode 7 within each cell defined by each tube, to effect a display. For example, if the colored particles 2 in the transparent insulating liquid 1 are collected above the first electrodes 8 by application of a voltage to the first electrodes 8 as shown in FIG. 2A, the colored electrophoretic particles 2 and the second electrodes 7 are observed by (or displayed to) a viewer (not shown) facing the second substrate 6.

Figure 8A:
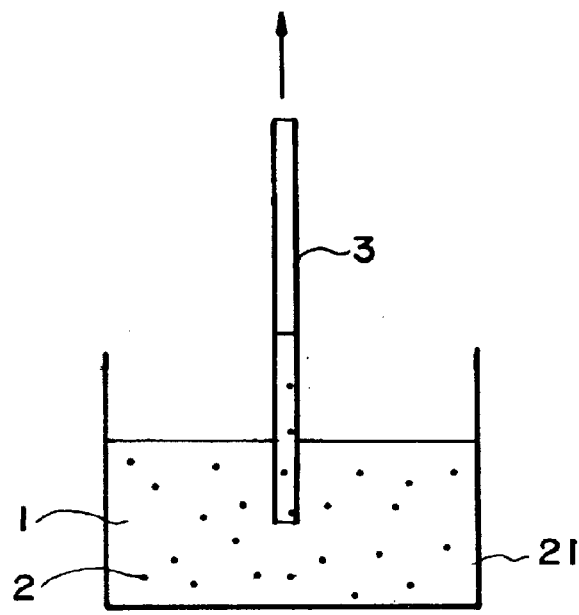
Figure 8B:
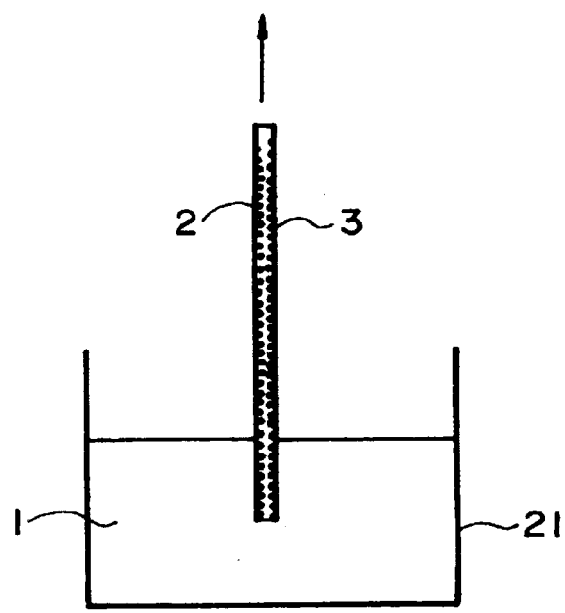

On the other hand, when the colored particles 2 are collected at positions above the first electrodes 8 by reversing the polarities of the voltage applied to the electrodes as shown in FIG. 8B, the colored particles 2 and the color of the insulating layer 5 (or the first electrode 8 or the first substrate 4) are displayed to the viewer.

According to the above-described device structure, a white-and-black display may be performed, e.g., by coloring both the second electrodes 7 and the electrophoretic particles 2 in black and coloring the first electrode 8 in white. Further, it is also possible to effect a color display by appropriately disposing a plurality of tubes containing different colors of electrophoretic particles 2 and transparent insulating liquid 1 and/or disposing a color layer colored in different colors as will be described hereinafter.

Figure 3A:
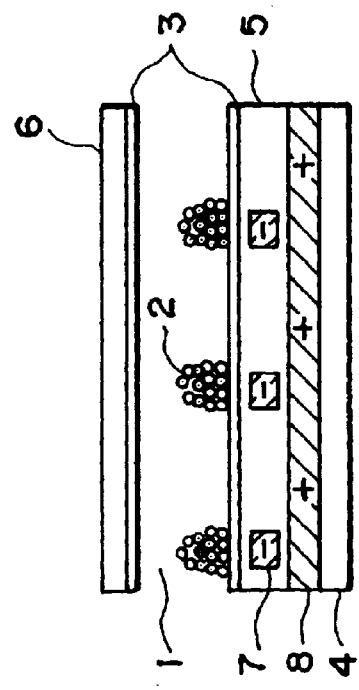
Figure 3B:
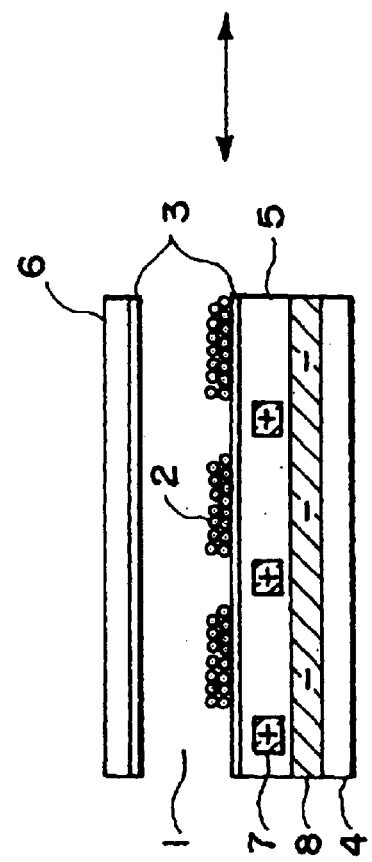

According to one method of arrangement of the tubes 3, the tubes 3 may be disposed to extend parallel to the second electrodes 7 as shown in FIGS. 2A and 2B, and the colored particles 2 are moved transversely in a direction perpendicular to the longitudinal direction of the tubes 3. On the other hand, the tubes 3 may be disposed to extend parallel to the extension direction of stripe-form first electrodes 8 (only one being shown) extending in a direction perpendicular to the second electrodes 7 as shown in FIGS. 3A and 3B. In this arrangement, the colored particles 2 are moved in a longitudinal direction of each tube 3.

Basically, each tube 3 may have an arbitrary sectional shape as far as it does not obstruct the movement of the colored particles 2, inclusive of a circle, an oval and a rectangle with somewhat round corners. However, in order to realize a display which is accompanied with little irregularity and easy-to-see for a viewer, a shape providing a large display region and allowing a uniform movement of the colored particles 2 is desired. For this purpose, it is preferred for a tube 3 to have an inner diameter X1 in a direction parallel to the substrates 4 and 6 and Y1 in a direction perpendicular to the substrates 4 an 6 (as shown in FIG. 2B) satisfying $Y1 \leq X1$.

As briefly mentioned above, in such a display device, a color display may be effected by using plural colors of transparent insulating liquid 1, plural colors of electrophoretic particles 2 and/or a color layer of one or more colors disposed on the first substrate 4.

Some examples of such a display device capable of color display will now be described.

Figure 4:
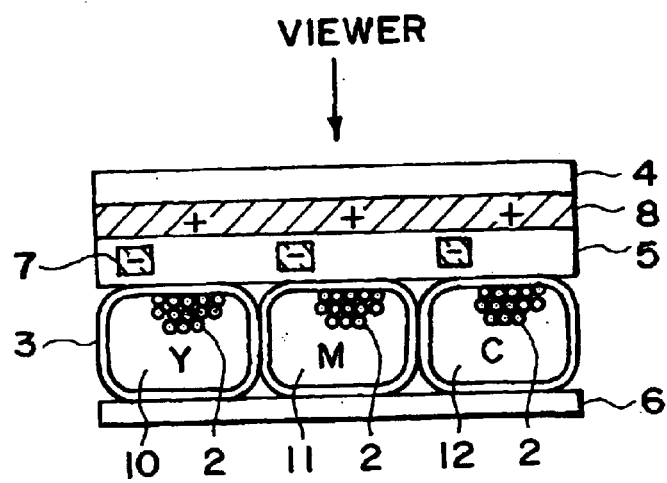

FIG. 4 is a schematic sectional view of a display deice for performing a color display by using plural colors of transparent insulating liquid. Referring to FIG. 4, the display device includes three types (Y, M and C) of tubes 3 containing white electrophoretic particles 2, and transparent insulating liquids 10, 11 and 12 of yellow (Y), magenta (M) and cyan (C), respectively, arranged in a regular manner. Further, the display device is designed to be observed through a first substrate 4 by forming light-transmissive first electrodes 8 thereon.

By using the display device, yellow display may be performed by collecting the white particles 2 on the second electrode 7 in a tube 3 containing a yellow (Y)-colored insulating liquid 10, and collecting the white particles 2 on the first electrode 8 in the other tubes 3 containing a magenta (M)-colored insulating liquid 11 and a cyan (C)-colored insulating liquid 12.

Further, if the white particles 2 in all the tubes 3 containing the Y-, M- and C-colored insulating liquids 10, 11 and 12 are collected on the first electrode 8 in the respective tubes as shown in FIG. 4, white display may be performed. On the other hand, if the white particles in all the tubes 3 are collected on the second electrodes 7 in the respective tubes, a black display may be performed.

Figure 5:
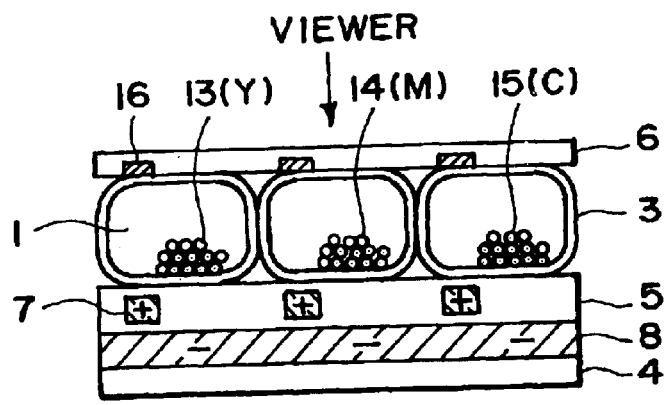

FIG. 5 is a schematic sectional view of a display device for performing a color display by using plural colors of electrophoretic particles. Referring to FIG. 5, the display device includes three type of tubes containing a transparent insulating liquid 1, and electrophoretic particles 13, 14 and 15 of yellow (Y), magenta (M) and cyan (C), respectively arranged in a regular manner. Further, the display device is designed to be observed through a second substrate 6 by using white-colored first electrodes 8 or inserting a white colored layer (not shown) between the first electrodes 8 and second electrodes 7. It is desirable in this case that the second substrate 6 is provided with masking portions 16 colored in, e.g., white or black corresponding to the second electrodes 7 on the first substrate 4.

By using the display device, yellow display may be performed by collecting the yellow (Y) particles 13 on the first electrodes 8 and collecting the magenta (M) and cyan (C) particles 14 and 15 on the second electrodes 7. Further, if all the colored particles 13, 14 and 15 are collected on the first electrodes 8 as shown in FIG. 5, a black display is performed, and on the other hand, if all the colored particles 13, 14 and 15 are collected on the second electrodes 7, a white display is performed.

Figure 6:
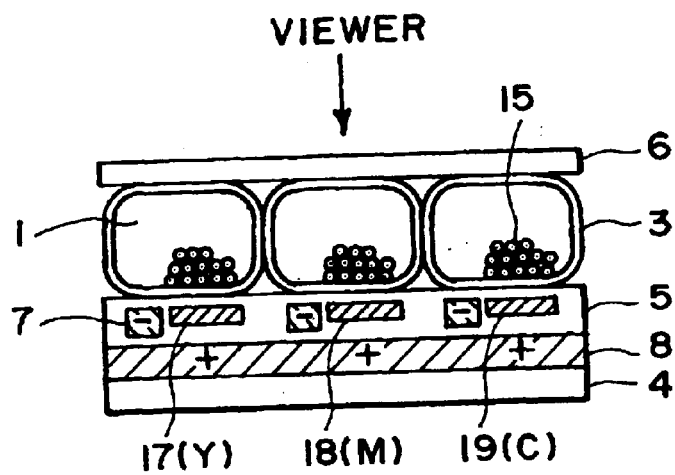

FIG. 6 is a schematic sectional view of a display device for performing a color display by forming colored layers on a first substrate 4. Referring to FIG. 6, the display device includes colored layers 17, 18 and 19 of yellow (Y), magenta (M) and cyan (C), respectively, juxtaposed with associated second electrodes 7 in respective tubes 3.

It is also possible to dispose the colored layers 17(Y), 18(M) and 19(C) between the first substrate 4 and the insulating layer 5, or on the back of the first substrate 4 so far as they can be observed from a viewer. The colored layers can be formed locally or over the entire region at the respective places. It is also possible to dispose a colored or non-colored light-reflection layer (not shown) below the colored layers 17, 18 and 19.

In this embodiment, electrophoretic particles 15 are colored in white, and by moving the white electrophoretic particles 15 similarly as in the device of FIG. 4, respective colors may be displayed as desired.

In the color display devices of FIGS. 4, 5 and 6, the colors of the colored particles 2, 13, 14 and 15, the first electrodes 8 and the colored layers 17, 18 and 19 may be the colors of the materials constituting them, the colors of pigments contained therein, or the colors of the coatings thereon. Each of the colored particles 2, 13, 14 and 15 may comprise a single material, or two or more materials. In the above embodiment, three colors of yellow (Y), magenta (M) and cyan (C) are used, but other arbitrary colors may be used depending on display environment or display pictures. It is also possible to effect a color display by using ultraviolet light or infrared light.

In the display device of this embodiment, the colored particles are moved horizontally, i.e., in a direction parallel to the display surface so that a gradation display of an objective color may be effected. For example, this may be effected, e.g. by moving colored particles 2 from positions above the second electrodes 7 as shown in FIG. 7A partially to positions above the first electrodes 8 as shown in FIG. 7B.

Such a partial movement of colored particles 2 may be effected, e.g., by using a shorter voltage application time or a smaller applied voltage, using a mixture of particles having different chargeabilities, or using a mixture of particles of different sizes.

Next, a process for producing such a display device will be described.

First, a light-transmissive tube 3 is filled with a display medium comprising a transparent insulating liquid 1 and colored electrophoretic particles 2. In this embodiment, the tube 3 may have a circular or elliptical section, and may comprise a polymer, such as acrylic resin, polystyrene, polyethylene terephthalate (PET), polyether-sulfone (PES) or gelatin, or an inorganic material, such as glass or quartz, respectively exhibiting a high transmittance for visible light. It is particularly preferred to use a polymer rich in flexibility. The diameter of the tube may be determined appropriately depending on the size of a display pixel. The tube 3 may preferably have a wall thickness of, e.g., 5–30 $\mu$m, while it can vary depending on the material thereof.

The transparent insulating liquid may comprise a colorless transparent liquid, selected from, e.g., oils, such as silicone oil and olive oil; aromatic hydrocarbons, such as toluene and xylene; aliphatic hydrocarbons inclusive of paraffinic hydrocarbons, such as normal paraffins and isoparaffins; halogenated hydrocarbons and high purity petroleum fractions, which preferably have a low viscosity and provide a stable charge to the electrophoretic particles 2 therein. Among these, silicone oil and isoparaffin may preferably be used. Commercial examples of isoparaffin may include: "Shel-Sol 70, 71 and 72" available from Shell Japan K.K., "Isopar G, H, L and M" available from Exxon Chemical K.K., and "IS Solvent 1620, 2028 and 2835" available from Idemitsu Sekiyu Kagaku K.K. For the purpose of adjustment of specific gravity with the electrophoretic particles 2, a species of insulating liquid having a larger specific gravity may be admixed as desired. For providing a colored insulating liquid 1 for color display, the colorless transparent insulating liquid is colored by dissolving or dispersing a dye or a pigment therein.

The colored electrophoretic particles 2 may comprise a material chargeable in the transparent insulating liquid, examples of which may include titanium oxide (white), aluminum oxide (white), a mixture of a resin such as polyethylene, polystyrene or acrylic resin with a colorant.

Examples of the colorant may include known wide variety of dyes and pigments, inclusive of: carbon black, Phthalocyanine Blue, Indantherene Blue, Peacock Blue, Permanent Red, Lake Red, Rhodamine Lake, Hansa Yellow, Permanent Yellow, and Benzidine Yellow. The colored electrophoretic particles 2 may ordinarily have a particle size (diameter) in a range of 0.1 $\mu$m to 50 $\mu$m, preferably 0.1–10 $\mu$m.

The electrophoretic particles 2 may preferably constitute 0.2–10 wt. %, more preferably 1–5 wt. % of the display medium.

The tube 3 may be filled with the display medium comprising the insulating liquid 1 and the particles 2, e.g., in a manner as illustrated in FIG. 8A wherein one end of a tube 3 is inserted into the display medium comprising the insulating liquid 1 and the particles 2 under sufficient stirring in an appropriate vessel 21, and the other end of the tube 3 is sucked to fill the tube 3 simultaneously with the insulating liquid 1 and the particles 2, or in a manner as illustrated in FIG. 8B wherein the particles 2 are uniformly attached to the inner wall of a tube 3, and then the insulating liquid 1 is introduced into the tube 3.

After filling the tube 3 with the display medium, both ends of the tube 3 are sealed up, e.g., by heating.

Figure 9A:
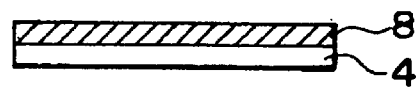

A plurality of tubes 3 each filled with the display medium in the above-described manner may be disposed between a pair of substrates according to a process as illustrated in FIGS. 9A to 9E. First of all, as illustrated in FIG. 9A, first electrodes 8 are formed in a pattern (of, e.g., parallel stripes) on a first substrate 4. The first substrate 4 may comprise a material exhibiting high transmittance to visible light and having high heat-resistance, examples of which may include: films or sheets of polymers, such as polyethylene terephthalate (PET) and polyether-sulfone (PES), and inorganic materials, such as glass and quartz. The first electrodes 8 may comprise any electroconductive material capable of patterning. For providing transparent first electrodes 8, indium tin oxide (ITO) may for example be used.

Figure 9B:
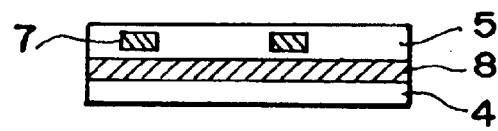

Then, the first electrodes 8 are coated with a lower portion of insulating layer 5, and second electrodes 7 are formed thereon in stripes extending perpendicularly to the first electrodes 8 and further coated with the remaining portion of insulating layer 5 to form a structure as shown in FIG. 9B. The insulating layer 5 may preferably comprise a film free from pinholes, such as highly transparent polyimide or acrylic resin. The second electrodes 7 may comprise a material similar to that of the first electrodes 8.

The first substrate 4 may be colored for a color display as described above, e.g., by utilizing the color of the electrode material or the insulating layer material per se or by disposing a layer of a colored material on the electrodes, the insulating layer or the substrate. It is also possible to mix a colorant or a colored material within the insulating layer.

Figure 9C:
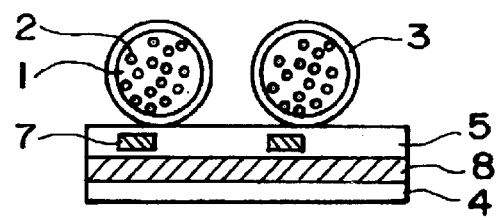

Then, on the insulating layer 5 formed on the first substrate 4, a prescribed number of tubes 3 each filled with the display medium comprising the colored electrophoretic particles 2 and the transparent insulating liquid 1 are disposed as shown in FIG. 9C. In the case of color display, the tubes 3 containing different colors of colored particles 2 or transparent insulating liquid 1 in an appropriately prescribed order, e.g., in the order of yellow (Y), magenta (M) and cyan (C).

Figure 9D:
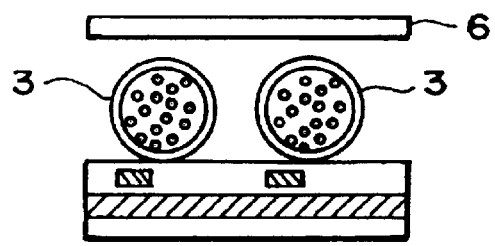
Figure 9E:
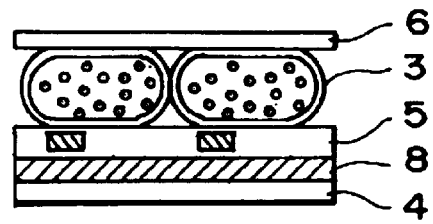

Then, a second substrate 6 is placed above the tubes 3 in alignment with the first substrate 4 as shown in FIG. 9D, and the first and second substrates 4 and 6 are bonded to each other. For the bonding, e.g., a curable acrylic resin optionally diluted with a volatile solvent may be applied in a thin layer on at least one of the first and second substrates 4 and 6. As an alternative method, the structure shown in FIG. 9D installed within an outer frame (not shown) may be heated via the outer frame to bond the first and second substrates 4 and 6 under a slight pressure. In this instance, the tubes 3 are deformed under the a slight pressure (and optionally heat) to provide a laminate structure as shown in FIG. 9E, wherein the tubes 3 are juxtaposed in intimate contact with each other. Further, the structure is provided with a voltage application means for applying voltages between the first and second electrodes 8 and 7, thereby providing an objective display device.

According to this embodiment described above, a plurality of light-transmissive tubes 3 filled with a display medium comprising a transparent insulating liquid 1 and colored electrophoretic particles 2 are arranged and fixed in intimate contact with each other, whereby a uniform dispersion of the electrophoretic particles 2 and the transparent insulating liquid 1 between a pair of substrates required in production of an electrophoretic display device can be easily performed. Further, the time-consuming and troublesome step of formation of partitioning walls on a substrate becomes unnecessary. As a result, electrophoretic display devices can be produced at a reduced cost and an increased yield.

Further, as the colored electrophoretic particles are moved only within a tube 3, the uneven distribution or localization of the colored particles can be reduced to obviate a display irregularity. The above-prepared display device can be used for a binary display, a full-color display and also a gradational display and can realize a display with a large viewing angle and a high contrast.

Some examples according to this embodiment will be described hereinbelow.

EXAMPLE 1

A display device of 5 cm-square in plane size was produced in the following manner through a process as illustrated in FIG. 8A and FIGS. 9A–9E.

First of all, a cylindrical light-transmissive tube 3 of PET having a length of 5 cm, a thickness of 3–8 $\mu$m and an inner diameter of 200 $\mu$m was filled with a display medium which was a 30:1 (by weight)-mixture of a transparent insulating liquid 1 of silicone oil and black electrophoretic particles 2 of a polystyrene-carbon mixture having particle sizes of ca. 1–2 $\mu$m in a manner as illustrate in FIG. 8A, i.e., by dipping one end of the tube 3 into a bath of the display medium under sufficient stirring in a vessel 21 and sucking from the other and the tube 3. After the filling, both ends of the tube 3 were sealed up by heating.

Then, on a light-transmissive first substrate 4 of 200 $\mu$m-thick PET film, an ITO film was formed and patterned into first electrodes 8 in the form of 190 $\mu$m-wide stripes (only one thereof being shown in FIG. 9A) arranged at a pitch of 200 $\mu$m. Then, the first electrodes 8 were coated with a lower half of insulating layer 5 of 4 $\mu$m-thick acrylic resin layer film colored in white with inclusion of titanium oxide fine particles.

Further, on the insulating layer 5, a dark-black colored layer of titanium carbide was formed and patterned by photolithography including dry etching into second electrodes 7 of 50 $\mu$m-wide stripes at a pitch of 200 $\mu$m extending perpendicular to the stripes of first electrodes 8. Further, the second electrodes 7 were coated with an upper half of insulating layer 5 of 2 $\mu$m-thick acrylic (FIG. 9B).

Then, on the first substrate 4 having a structure as shown in FIG. 9B, a plurality of the tubes 3 filled with the display medium of the insulating liquid 1 and the black electrophoretic particles 2 were arranged so that their extending directions were parallel to the extension direction of the second electrodes 7 (FIG. 9C). Then, a light-transmissive second substrate 6 was disposed above the tubes 3 (FIG. 9D), and the substrates 4 and 6 aligned with each other were bonded to each other with an ultraviolet-curable acrylic resin under a slight pressure between the substrates 4 and 6.

As a result, the upper and lower parts of the tubes 3 were made flat by contact with the substrates 6 and 4, and the tubes 3 were disposed in intimate contact with each other, i.e., with no gap between each other (FIG. 9E). Further, the structure was provided with a voltage application means to complete a display device.

The thus-prepared display device was subjected to voltage application of ±50 volts for a display to be observed from the second substrate 6 side. As a result, as the black electrophoretic particles 2 were positively charged in the silicone oil 1, the particles 2 were moved to positions above the first electrodes 8 when the first electrodes 8 were supplied with −50 volts, thus providing a black display state.

On the other hand, when the second electrodes 7 were supplied with −50 volts, the black particles 2 were collected above the dark black-colored second electrodes 7 so that the display device exhibited a grayish white display state. The response speed was 30 msec or shorter. No display irregularity due to localization of the colored particles 2 was observed.

EXAMPLE 2

A display device was prepared through a process as illustrated in FIGS. 10A–10E.

Figure 10A:
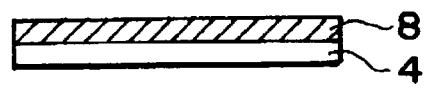
Figure 10B:
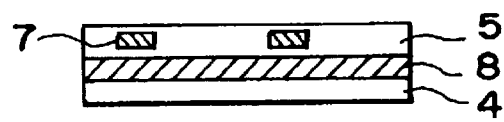

Tubes 3 were filled with the same display medium and in the same manner as in Example 1. Further, a first substrate 4 was provided with first electrodes 8, an insulating layer 5 and second electrodes 7 as shown in FIGS. 10A–10B in the same manner as in Example 1.

Figure 10C:
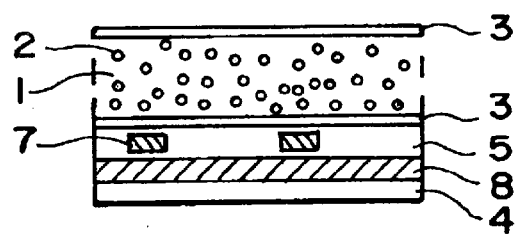
Figure 10D:
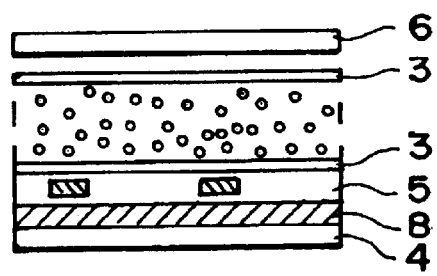
Figure 10E:
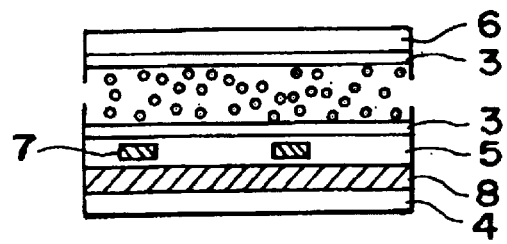

Then, the above-prepared tubes 3 filled with the display medium were arranged in a similar manner as in Example 1 except that they were arranged with their longitudinal directions parallel to the extension direction of the first electrodes 8 (FIG. 10C). Thereafter, a second substrate 6 was disposed thereabove (FIG. 10D) and the substrates 4 and 6 were bonded to each other in the same manner as in Example 1 to form a structure shown in FIG. 10E, which was then provided with voltage application means to complete a display device.

The thus-prepared display device was driven by application of ±50 volts between the electrodes, whereby a display with no display irregularity due to localization of the colored particles was performed at a response speed of 30 msec or shorter.

EXAMPLE 3

A display device was produced in the following manner through a process as illustrated in FIG. 8B and FIGS. 9A–9E.

First of all, cylindrical light-transmissive tubes 3 of polyethylene terephthalate (PET) each having an inner diameter of 200 $\mu$m were filled with three colors of display media comprising three colors of transparent insulating liquid 1 of silicone oil dyed in yellow (Y), magenta (M) and cyan (C), respectively, and white electrophoretic particles 2 of titanium oxide fine powder having particle sizes of ca. 1–2 $\mu$m in a manner as illustrate in FIG. 8B, i.e., by dipping one end of each tube 3 containing white electrophoretic particles 2 uniformly attached to the inner wall thereof into a both of insulating liquid 1 dyed in a prescribed color and introducing the colored insulating liquid 1 by sucking from the other end of the tube 3. After the filling, both ends of each tube 3 were sealed by heating. Thus, three types of tubes 3 containing three colors of insulating liquid 1 were prepared.

Separately, a first substrate 4 was provided with first electrodes 8, an insulating layer 5 and second electrodes 7 as shown in FIGS. 9A–9B in the same manner as in Example 1.

Then, the above-prepared three colors of tubes 3 were arranged with their longitudinal directions parallel to the extension direction of the second electrodes 7 (FIG. 9C). Thereafter, a second substrate 6 was disposed thereabove (FIG. 9D), and the substrates 4 and 6 were bonded to each other in the same manner as in Example 1 to form a structure shown in FIG. 9E, which was then provided with voltage application means to complete a display device.

The thus-prepared display device was driven by application of ±50 volts. As a result, since the white electrophoretic particles 2 of titanium oxide were negatively charged in the silicone oil 1, the white particles 2 were moved to positions above the first electrodes 8 to provide a white display state when the first electrodes 8 were supplied with +50 volts.

On the other hand, when the second electrodes 7 were supplied with +50 volts, the white particles 2 were moved to above the second electrodes 7, the respective colors of the transparent insulating liquid 1 could be observed. The response speed was 30 msec or shorter, and no display irregularity due to localization of the colored particles was observed. Further, by collecting the colored particles 2 above the second electrodes 7 at selected tubes 3, the respective colors of yellow (Y), magenta (M) and cyan (C) could be selectively exhibited to allow a color display.

EXAMPLE 4

A display device was produced in the following manner through a process as illustrated in FIG. 8B and FIGS. 11A–11E.

First of all, cylindrical light-transmissive tubes 3 of PET each having an inner diameter of 200 $\mu$m were filled with three colors of display media comprising a transparent insulating layer 1 of silicone oil and three colors of electrophoretic particles 2 comprising mixtures of polystyrene and colorants of yellow (Y), magenta (M) and cyan (C), respectively, and having particle sizes of ca. 1–2 $\mu$m.

The three types of tubes 3 were each prepared through a filling process as illustrated in FIG. 8B.

Figure 11A:
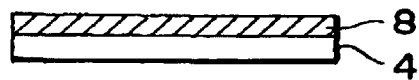
Figure 11B:
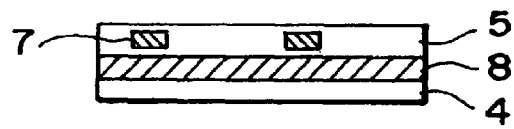

Separately, a first substrate 4 of 200 $\mu$m-thick PET was provided with white-colored first electrodes 8, an insulating layer 5 and 50 $\mu$m-wide black-colored second electrodes 7 of titanium carbonate as shown in FIGS. 11A–11B in a similar manner as in Example 1.

Figure 11C:
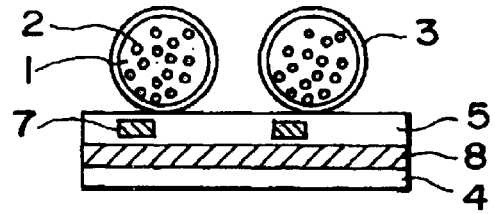
Figure 11D:
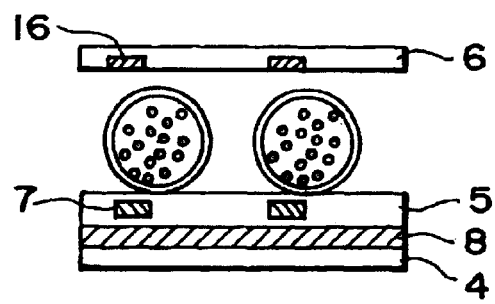
Figure 11E:
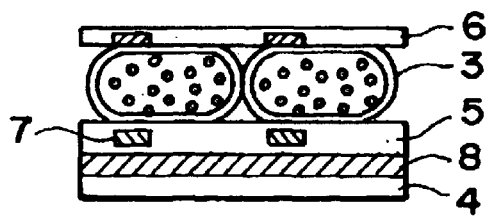

Then, the above-prepared three colors of tubes 3 were arranged with their longitudinal directions parallel to the extension direction of the second electrodes 7 (FIG. 11C). Thereafter, a light-transmissive second substrate 6 provided with masking stripe patterns 16 of dark black-colored titanium carbonate at parts corresponding to the second electrodes 7 was disposed above the first substrate 4 (FIG. 1D), and the substrates 4 and 6 were bonded to each other in the same manner as in Example 1 to form a structure shown in FIG. 1E, which was then provided with voltage application means to complete a display device.

The thus-prepared display device was driven by application of ±50 volts. As a result, since the polystyrene-based electrophoretic particles 13, 14 and 15 of respective colors were positively charged in the silicone oil 1, the colored particles were moved to positions above the first electrodes 8 to provide respective color display states when the first electrodes 8 were supplied with −50 volts.

On the other hand, when the second electrodes 7 were supplied with −50 volts, the colored particles 13, 14 and 15 were moved to above the second electrodes 7, the first electrodes 8 could be observed through the transparent insulating liquid 1 to provide a white display state. The response speed was 30 msec or shorter, and no display irregularity due to localization of the colored particles was observed. Further, by collecting the respective colored particles 2 above the first electrodes 8 at selected tubes 3, the respective colors of yellow (Y), magenta (M) and cyan (C) could be selectively exhibited to allow a color display.

EXAMPLE 5

A display device was prepared in the following manner through a process as illustrated in FIGS. 12A–12F.

Tubes 3 each having an inner diameter of 100 $\mu$m were filled with a display medium comprising the transparent insulating liquid 1 and white particles 2 of titanium oxide, otherwise in the same manner as in Example 1.

Separately, a light-transmissive first substrate 4 of 200 $\mu$m-thick PET film was provided with 90 $\mu$m-wide first electrodes 8 of ITO stripes at a pitch of 100 $\mu$m (FIG. 12A) and an insulating layer 5 of colored transparent polyimide. Further, on the insulating layer 5, a dark black titanium carbonate film was formed and patterned into second electrodes 7 of 30 $\mu$m-wide stripes at a pitch of 100 $\mu$m extending perpendicularly to the stripes of first electrodes 8.

Figure 12A:
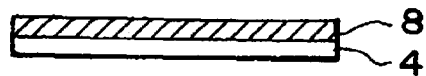
Figure 12B:
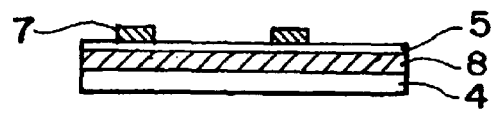
Figure 12C:
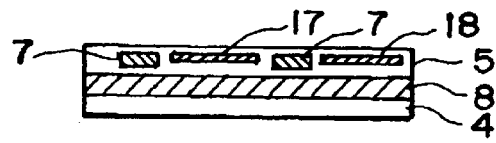
Figure 12D:
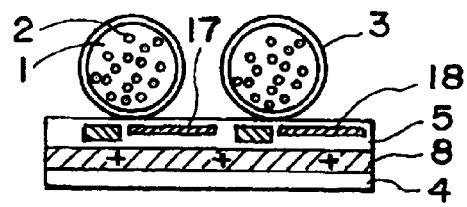
Figure 12E:
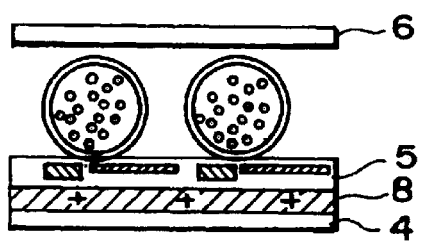
Figure 12F:
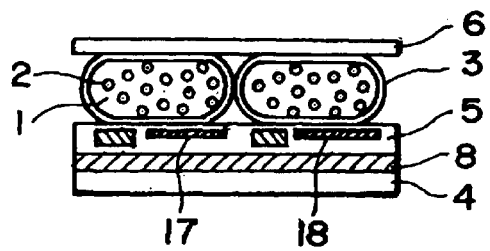

Then, color layers 17 (Y), 18 (M) and 19 (C, not shown) were formed in juxtaposition with the second electrodes 7, and further coated with an upper half of insulating liquid 5 (FIG. 12C). By using the thus-treated first substrate 4, a display device having a structure as shown in FIG. 12F was prepared through steps as shown in FIGS. 12D to 12F otherwise in the same manner as in Example 1.

The thus-prepared display device was driven by application of ±60 volts. The colored particles 2 of titanium oxide was negatively charged in the insulating liquid 1 of silicone oil. As a result, the white particles 2 were collected above the first electrodes 8 to provide a white display state when the first electrodes 8 were supplied with +60 volts.

On the other hand, when the second electrodes 7 were supplied with +60 volts, the white particles 2 were collected above the second electrodes, so that the colored layers 17 and 18 (and 19 not shown) could be observed through the second substrate 6. The response speed was 30 msec or shorter, and no display irregularity due to localization of the colored particles 2 was observed. By forming three types colored layers (17, 18, . . . ) of yellow, cyan and magenta, a color display could be performed.

Further, when the display device was driven at a shorter voltage application period of 5 msec, the reflected light of respective colors could be lowered to nearly a half. Thus, a multi-level gradational display could be performed by selecting various voltage application periods, thus providing a color display device capable of gradational display.

EXAMPLE 6

A display device of 3 cm-square was prepared through similar steps as in Example 1 by using tubes 3 having a length of 3 cm, a thickness of 2–3 $\mu$m and an inner diameter of 30 $\mu$m, colored particles of ca. 0.5–1.0 $\mu$m, 25 $\mu$m-wide first electrodes 8 at a pitch of 30 $\mu$m, and 10 $\mu$m-wide second electrodes 7 at a pitch of 30 $\mu$m.

The thus-prepared display device was driven by application of ±50 volts. As a result of shorter migration distance by using narrower first and second electrodes, the response time could be reduced to 5 msec or shorter with no display irregularity due to localization of the colored electrophoretic particles.

As described above, according to the present invention, a plurality of light-transmissive tubes are filled with a display medium comprising a transparent insulating liquid and colored electrophoretic particles and disposed in intimate contact with each other between first and second substrates, whereby uniform dispersion of colored electrophoretic particles that had been difficult heretofore has been facilitated, thus providing a reduced display irregularity. Further, the time-consuming and troublesome step of forming partitioning walls on a substrate is un necessitated, thus realizing a substantial reduction in production cost.

(Second Embodiment)

Figure 15:
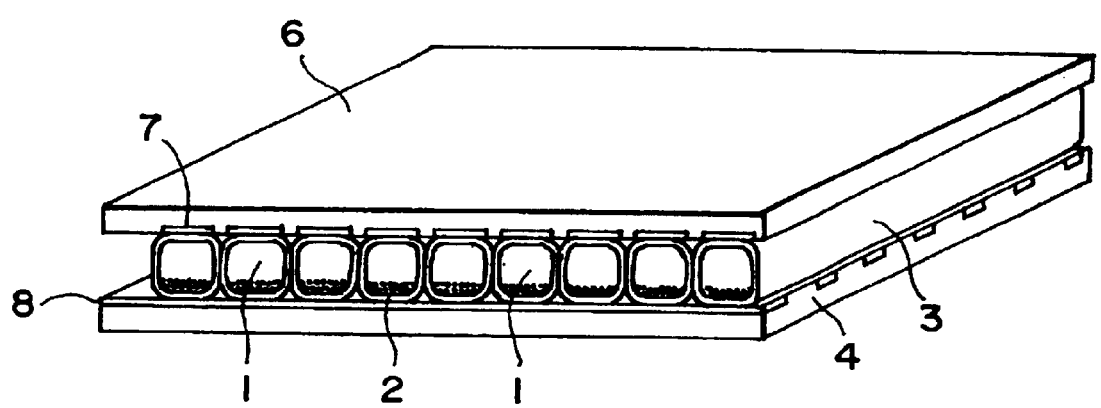
Figure 16A:
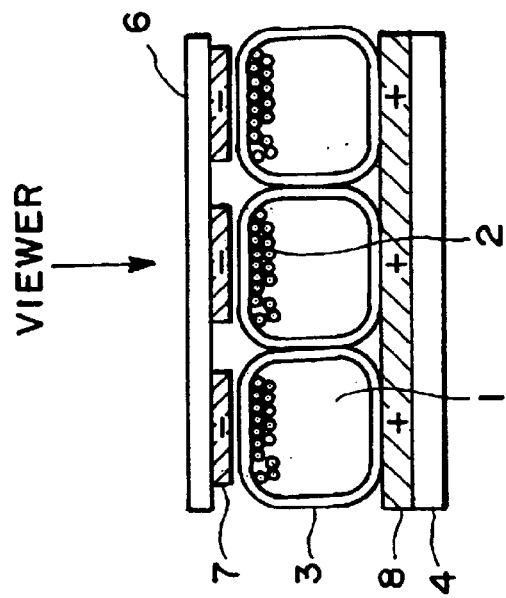
Figure 16B:
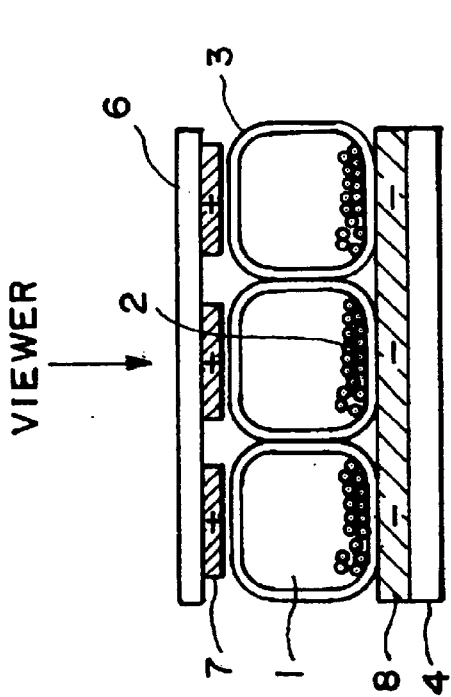

FIG. 15 is a perspective view of an electrophoretic display device according to the embodiment, and FIGS. 16A and 16B are partial sectional views thereof for illustrating an operation principle thereof.

This embodiment is different from First embodiment described with reference to FIGS. 1 to 12 in that light-transmissive second electrodes 7 are formed on a second substrate 6 (FIGS. 15 and 16) instead of a first substrate 4. The other features are substantially identical to those in First embodiment.

Referring to FIGS. 15 and 16, in the display device, colored electrophoretic particles 2 are moved between positions above first electrodes 8 and above second electrodes 7 perpendicularly to substrates 4 and 6. As a result, to a viewer facing the second electrodes 6, the color of an insulating liquid 1 is displayed when the colored particles 2 are collected above the first electrodes 8 as shown in FIG. 16A, and the color of colored particles 2 is displayed when the colored particles 2 are collected on the second electrodes 7. In this arrangement, if the electrophoretic particles 2 are colored in black, and the insulating liquid 1 is colored in white, a white-and-black display can be performed.

Similarly as in First embodiment, a color display is possible also according to this embodiment. Some examples of such a display device capable of color display will now be described.

Figure 17:
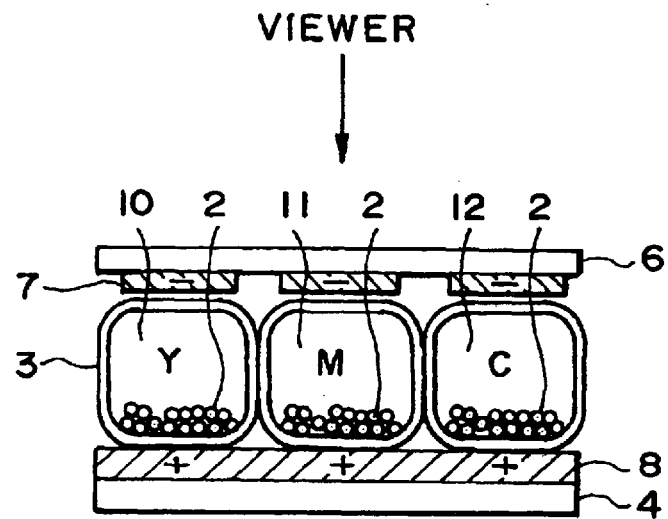

FIG. 17 is a schematic sectional view of a display deice for performing a color display by using plural colors of transparent insulating liquid. Referring to FIG. 17, the display device includes three types (Y, M and C) of tubes 3 containing white electrophoretic particles 2, and transparent insulating liquids 10, 11 and 12 of yellow (Y), magenta (M) and cyan (C), respectively, arranged in a regular manner. Further, the display device is designed to be observed through a second substrate 6 by forming light-transmissive second electrodes 7 thereon.

By using the display device, yellow display may be performed by collecting the white particles 2 on the first electrode 8 in a tube 3 containing a yellow (Y)-colored insulating liquid 10, and collecting the white particles 2 on the second electrode 7 in the other tubes 3 containing a magenta (M)-colored insulating liquid 11 and a cyan (C)-colored insulating liquid 12. Further, if the white particles 2 in all the tubes 3 containing the Y-, M- and C-colored insulating liquids 10, 11 and 12 are collected on the first electrode 8 in the respective tubes as shown in FIG. 17, a black display may be performed. On the other hand, if the white particles 2 in all the tubes 3 are collected on the second electrodes 7 in the respective tubes, a white display may be performed.

Figure 18:
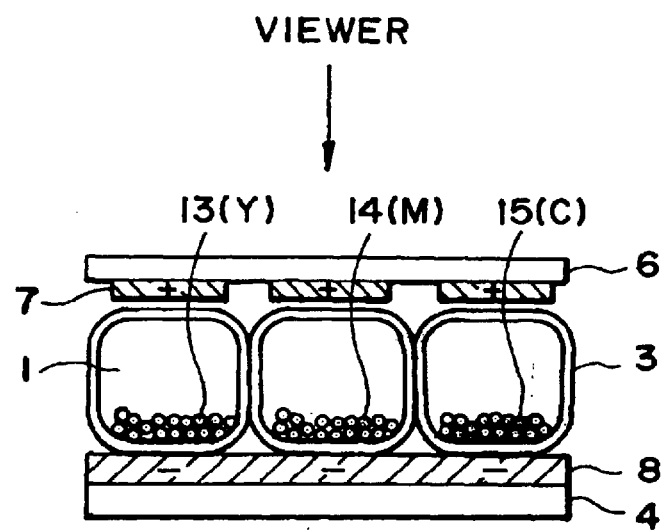

FIG. 18 is a schematic sectional view of a display device for performing a color display by using plural colors of electrophoretic particles. Referring to FIG. 18, the display device incudes three types of tubes containing a white opaque insulating liquid 1, and electrophoretic particles 13, 14 and 15 of yellow (Y), magenta (M) and cyan (C), respectively, arranged in a regular manner. Further, the display device is designed to be observed through a second substrate 6.

By using the display device, yellow display may be performed by collecting the yellow (Y) particles 13 on the second electrodes 7 and collecting the magenta (M) and cyan (C) particles 14 and 15 on the first electrodes 8. Further, if all the colored particles 13, 14 and 15 are collected on the first electrodes 8 as shown in FIG. 18, a white display is performed, and on the other hand, if all the colored particles 13, 14 and 15 are collected on the second electrodes 7, a black display is performed.

The materials and organizations of the insulating liquid 1, colored electrophoretic particles 2, 13, 14 and 15, the tubes 3, the first electrodes 8 and the second electrodes 7 are substantially identical to those used in First embodiment, except that the second electrodes 7 are formed in a larger width comparable to the width of each tube 3.

Except for the above point, the display device according to this embodiment can be produced in a similar manner as in First embodiment, e.g., through a process as shown in FIGS. 19A–19E which substantially corresponds to the process illustrated in FIGS. 9A–9E for First embodiment.

Figure 20A:
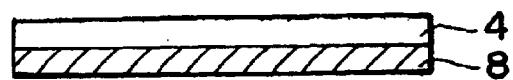
Figure 20B:
Figure 20C:
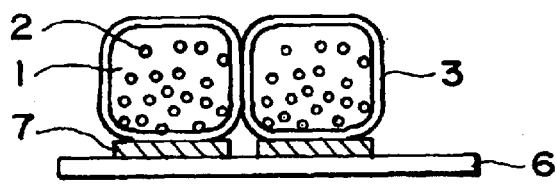
Figure 20D:
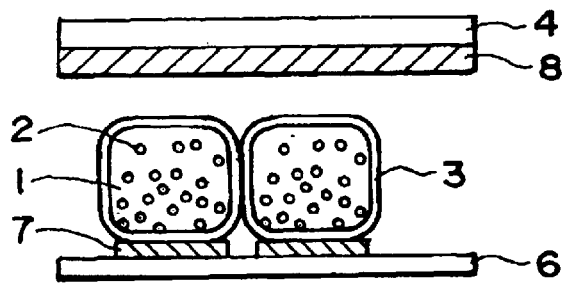
Figure 20E:
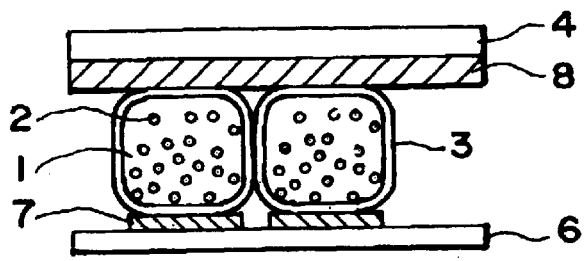

Alternatively, as shown in FIGS. 20A–20E, tubes 3 having a rectangular section may be used and disposed in intimate contact with each other on the second electrodes 7 (FIG. 20C), before bonding of the substrates 4 and 6 to form a stacked structure as shown in FIG. 20E.

Some examples according to this embodiment will be described hereinbelow.

EXAMPLE 7

A 5 $\mu$m-square display device was produced in the following manner through a process as illustrated in FIG. 8A and FIGS. 19A–19E.

First of all, a cylindrical light-transmissive tube 3 of PET having a length of 5 cm, a wall thickness of 5–8 $\mu$m and an inner diameter of 200 $\mu$m was filled with a display medium comprising a 23:1 (by weight) mixture of a white opaque insulating liquid 1 of silicone oil with lipophilic oil-soluble dye dissolved therein and black electrophoretic particles 2 of a polystyrene-carbon mixture having particle sizes of ca. 1–2 $\mu$m in a manner as illustrate in FIG. 8A, i.e., by dipping one end of the tube 3 into a bath of the display medium under sufficient stirring in a vessel 21 and sucking from the other and the tube 3. After the filling, both ends of the tube 3 were sealed up by heating.

Figure 19A:
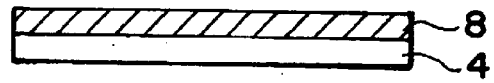
Figure 19B:
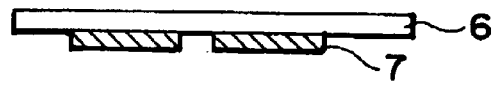

Then, on a first substrate 4 of 200 $\mu$m-thick PET film, a titanium film was formed and patterned into 190 $\mu$m-wide stripe first electrodes 8 at a pitch of 200 $\mu$m in the form of stripes (only one thereof being shown in FIG. 19A). Separately, on a light-transmissive second substrate 6 of 200 $\mu$m-thick PET film, an ITO film was formed and patterned into second electrodes 7 in the form of 190 $\mu$m-wide stripes at a pitch of 200 $\mu$m (FIG. 19B).

Figure 19C:
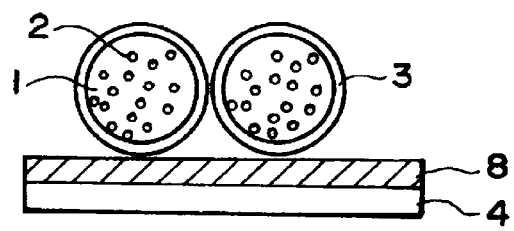
Figure 19D:
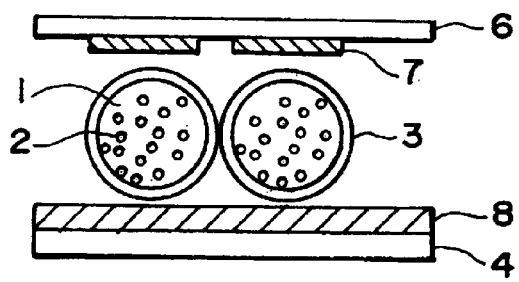

Then, on the first substrate 4 having a structure as shown in FIG. 19A, a plurality of the tubes 3 filled with the display medium of the insulating liquid 1 and the black electrophoretic particles 2 were arranged so that their extending directions were perpendicular to the extension direction of the first electrodes 8 (FIG. 19C). Then, the second substrate 6 having a structure as shown in FIG. 19B was disposed above the tubes 3 (FIG. 19D) so that the extending directions of the first electrodes 8 and second electrodes 7 were perpendicular to each other, and the substrates 4 and 6 aligned with each other were bonded to each other with an ultraviolet-curable acrylic resin under a slight pressure between the substrates 4 and 6.

Figure 19E:
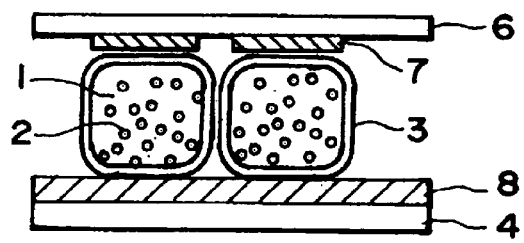

As a result, the upper and lower parts of the tubes 3 were made flat by contact with the substrates 6 and 4, and the tubes 3 were disposed in intimate contact with each other, i.e., with no gap between each other (FIG. 19E). Further, the structure was provided with a voltage application means to complete a display device.

The thus-prepared display device was subjected to voltage application of ±50 volts for a display to be observed from the second substrate 6 side. As a result, as the black electrophoretic particles 2 were positively charged in the silicone oil 1, the particles 2 were moved to positions above the first electrodes 8 when the first electrodes 8 were supplied with −50 volts, thus providing a white display state (FIG. 16A).

On the other hand, when the second electrodes 7 were supplied with −50 volts, the black particles 2 were collected on the second electrodes 7 so that the display device exhibited a black display state (FIG. 16B). The response speed was 30 msec or shorter. No display irregularity due to localization of the colored particles 2 was observed.

EXAMPLE 8

A display device was prepared in the same manner as in Example 7 except for using a blue insulating liquid 1 formed by dissolving a blue oil-soluble dye in silicone oil and colored electrophoretic particles 2 comprising white $TiO_2$ particles having particle sizes of ca. 1–2 µm.

The thus-prepared display device was driven by application of ±50 volts. As a result, since the white electrophoretic particles 2 of titanium oxide were negatively charged in the silicone oil 1, the white particles 2 were moved to positions above the first electrodes 8 (FIG. 16A) to provide a blue display state when the first electrodes 8 were supplied with +50 volts.

On the other hand, when the second electrodes 7 were supplied with +50 volts, the white particles 2 were moved to above the second electrodes 7 (FIG. 16B), thereby providing a white display state. The response speed was 30 msec or shorter, and no display irregularity due to localization of the colored particles was observed.

EXAMPLE 9

A display device was prepared through a process as illustrated in FIGS. 20A–20E.

Tubes 3 of nylon having a nearly 200 µm×200 µm-square cross section with round corners were filled with the same display medium as in Example 7 comprising the white silicone oil and black-colored particles of polystyrene-carbon mixture, and then both ends thereof were heat-sealed.

Then, on a first substrate 4 of 200 µm-thick PET film, a titanium film was formed and patterned into first electrodes 8 of 150 µm-wide stripes (FIG. 20A). Similarly, 150 µm-wide ITO stripes of second electrodes 7 were formed on a light-transmissive second substrate 6 (FIG. 20B).

Then, the above-prepared tubes 3 filled with the display medium were disposed with no spacing between each other on the second electrodes 7 on the second substrate 6 so that a center line of each tube 3 was aligned with that of an associated second electrode 7 (FIG. 20C), and the above-treated first substrate 4 was disposed above the tubes 3 so that the first electrodes 8 and second electrodes 7 were perpendicular to each other (FIG. 20D). Then, the substrates 4 and 6 were bonded to each other with an acrylic resin, thereby providing a structure as shown in FIG. 20E, wherein the tubes 3 were disposed in intimate contact with each other between the substrates 4 and 6. Further, the structure was provided with voltage application means to complete a display device.

The thus-prepared display device was driven in the same manner as in Example 7, whereby a display free from display irregularity due to localization of the colored particles 2 was performed at a response speed of 30 msec or shorter.

EXAMPLE 10

A display device was produced in the following manner through a process as illustrated in FIG. 8B and FIGS. 19A–19E.

First of all, cylindrical light-transmissive tubes 3 of (PET) each having an inner diameter of 200 µm were filled with three colors of display media comprising three colors of transparent insulating liquid 1 of silicone oil dyed in yellow (Y), magenta (M) and cyan (C), respectively, and white electrophoretic particles 2 of titanium oxide fine powder having particle sizes of ca. 1–2 µm in a manner as illustrate in FIG. 8B, i.e., by dipping one end of each tube 3 containing white electrophoretic particles 2 uniformly attached to the inner wall thereof into a both of insulating liquid 1 dyed in a prescribed color and introducing the colored insulating liquid 1 by sucking from the other end of the tube 3. After the filling, both ends of each tube 3 were sealed by heating. Thus, three types of tubes 3 containing three colors of insulating liquid 1 were prepared.

Separately, a first substrate 4 was provided with first electrodes 8, and second electrodes 7 were formed on a second substrate 6 as shown in FIGS. 19A–19B in the same manner as in Example 7.

Then, the above-prepared three colors of tubes 3 were arranged with their longitudinal directions perpendicular to the extension direction of the first electrodes 8 on the first substrate 4 (FIG. 19C). Thereafter, the second substrate 6 having thereon the second electrodes 7 was disposed thereabove so that the first electrodes 8 and the second electrodes 7 were perpendicular to each other (FIG. 19D), and the substrates 4 and 6 were bonded to each other in the same manner as in Example 7 to form a structure shown in FIG. 19E, which was then provided with voltage application means to complete a display device.

The thus-prepared display device was driven by application of ±50 volts. As a result, since the white electrophoretic particles 2 of titanium oxide were negatively charged in the silicone oil 1, the white particles 2 were moved to positions above the first electrodes 8 to display respective colors of the three types of the insulating liquid 1 when the first electrodes 8 were supplied with +50 volts (FIG. 17).

On the other hand, when the second electrodes 7 were supplied with +50 volts, the white particles 2 were moved to above the second electrodes 7, a white display state was exhibited. The response speed was 30 msec or shorter, and no display irregularity due to localization of the colored particles was observed. Further, by collecting the colored particles 2 above the first electrodes 8 at selected tubes 3, the respective colors of yellow (Y), magenta (M) and cyan (C) could be selectively exhibited to allow a color display.

EXAMPLE 11

A display device was produced in the following manner through a process as illustrated in FIG. 8B and FIGS. 19A–19E.

First of all, cylindrical light-transmissive tubes 3 of PET each having an inner diameter of 200 µm were filled with three colors of display media comprising a white insulating liquid 1 of silicone oil dyed with oil-soluble white dye and three colors of electrophoretic particles 2 comprising mixtures of polystyrene and colorants of yellow (Y), magenta (M) and cyan (C), respectively, and having particle sizes of ca. 1–2 µm.

The three types of tubes 3 were each prepared through a filling process as illustrated in FIG. 8B.

Separately, first electrodes 8 were formed on a first substrate 4 (FIG. 19A), and second electrodes 7 were formed on a second substrate 6 (FIG. 19B), respectively, in the same manner as in Example 7.

Then, the above-prepared three colors of tubes 3 were arranged with their longitudinal directions perpendicular to the extension direction of the first electrodes 8 (FIG. 19C). Thereafter, the second substrate 6 provided with the second electrodes 7 was disposed above the first substrate 4 (FIG. 19D), so that the first electrodes 8 and the second electrodes 7 were perpendicular to each other, and the substrates 4 and 6 were bonded to each other in the same manner as in Example 7 to form a structure shown in FIG. 19E, which was then provided with voltage application means to complete a display device.

The thus-prepared display device was driven by application of +50 volts. As a result, since the polystyrene-based electrophoretic particles 13, 14 and 15 of respective colors were positively charged in the silicone oil 1, the colored particles were moved to positions above the first electrodes 8 to provide a white display state due to the color of the white insulating liquid 1 when the first electrodes 8 were supplied with −50 volts (FIG. 18).

On the other hand, when the second electrodes 7 were supplied with −50 volts, the colored particles 13, 14 and 15 were moved to above the second electrodes 7, the respective colors of the colored particles 13(Y), 14(M) and 15(C) were observed. The response speed was 30 msec or shorter, and no display irregularity due to localization of the colored particles was observed. Further, by collecting the respective colored particles 2 above the second electrodes 7 at selected tubes 3, the respective colors of yellow (Y), magenta (M) and cyan (C) could be selectively exhibited to allow a color display.

EXAMPLE 12

A display device was prepared through similar steps as in Example 7 by using tubes 3 having an inner diameter of 30 µm, colored particles of ca. 0.5–1.0 µm and a smaller gap of 25 µm between the substrates 4 and 6.

The thus-prepared display device was driven by application of ±50 volts. As a result of shorter migration distance by using the smaller gap, the response time could be reduced to 5 msec or shorter with no display irregularity due to localization of the colored electrophoretic particles.

According to this embodiment, in addition to the effects of First embodiment, a better display clarity and contrast can be attained due to utilization of vertical movement of the colored particles.

(Third Embodiment)

Figure 21:
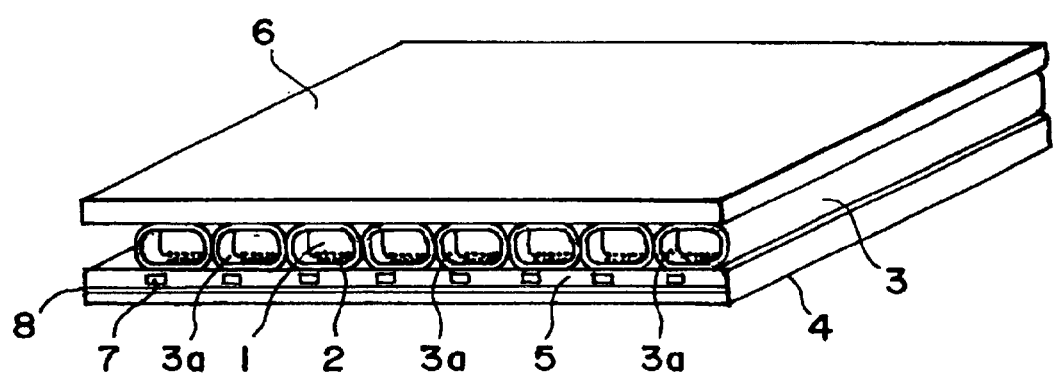

FIG. 21 is a perspective view of an electrophoretic display device according to an embodiment of the present invention, and FIGS. 22A and 22B are partial sectional views thereof for illustrating an operation principle thereof.

This embodiment is different from First embodiment described with reference to FIGS. 1 to 12 in that each tube 3 is provided with a plurality of projections 3a from the inner wall thereof at prescribed intervals for obstructing the movement of colored electrophoretic particles 2 in a longitudinal direction thereof. The other features are substantially identical to those in First embodiment.

Figure 23A:
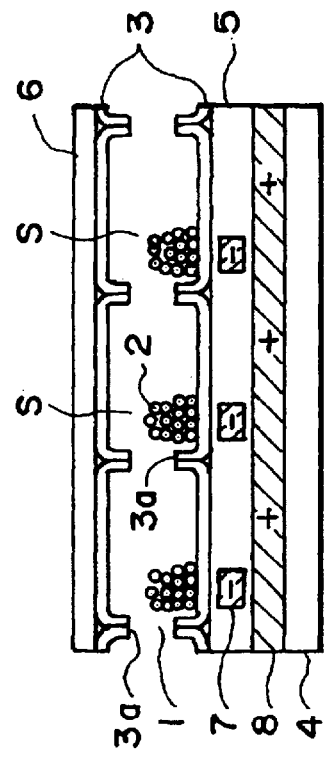
Figure 23B:
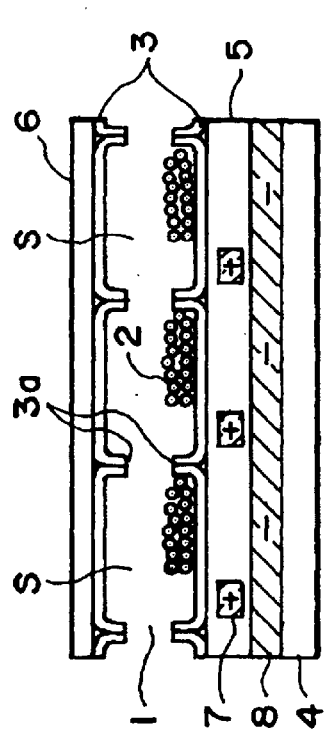

Similarly as in First embodiment, the tubes 3 may be arranged so that their longitudinal direction is parallel to the extension direction of the second electrodes 7 (FIGS. 21 and 22) or parallel to the extension direction of the first electrodes 8 (FIGS. 23A and 23B). According to this embodiment, as shown in FIGS. 21 and 23 and best understood from FIGS. 23A and 23B, each tube 3 is provided a plurality of projections 3a from its inner wall at a prescribed pitch in a longitudinal direction thereof. By provision of such projections 3a along the inner wall of each tube 3, the movement of the charged electrophoretic particles 2 respectively moving in the insulating liquid 1 is confined within a range of space ("moving space") partitioned by adjacent two projections 3a.

By the confinement of the electrophoretic particles 2 within a moving space, the electrophoretic particles 2 can be uniformly distributed in a tube 3 during the production, and the localization of the electrophoretic particles 2 within a tube 2 during long hours of continual operation can be reduced to reduce the display irregularity.

Figure 24A:
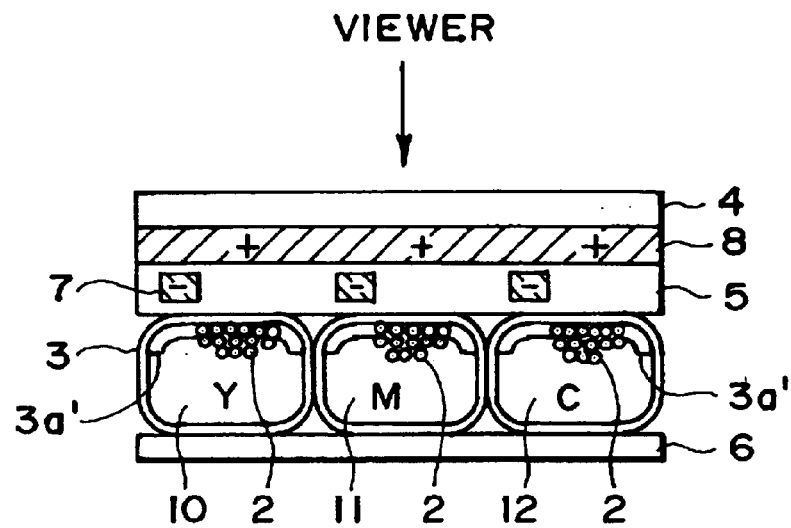
Figure 24B:
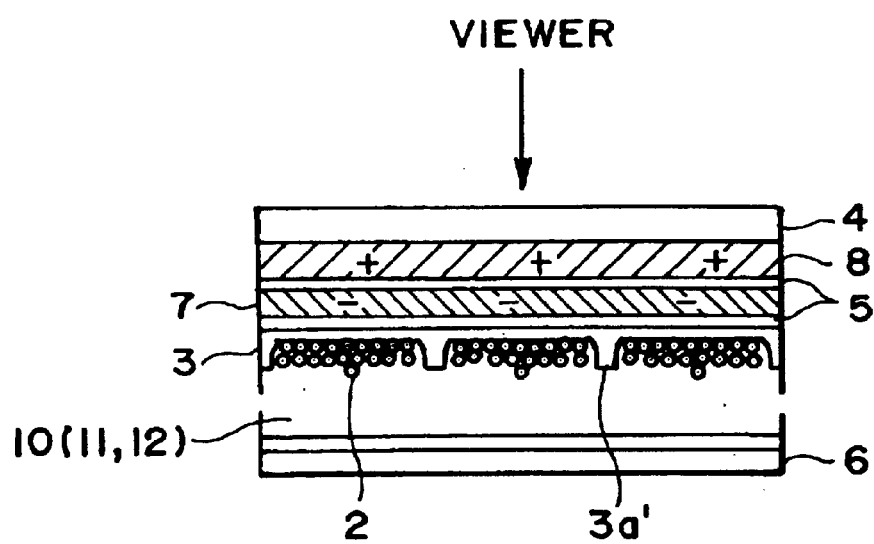

In the examples of FIGS. 21 to 23, each projection 3a is formed over an entire circumference of a tube inner wall, but such a projection can be formed only partially, as far as it is effective for restricting the movement of electrophoretic particles 2 in a longitudinal direction of a tube 3, e.g., only at a side of inner wall close to the first substrate 4 on which the electrodes 7 and 8 (as projections 3a' shown in FIGS. 24A and 24B). Alternately, such projections 3a can be enlarged so as to form closed moving spaces capable of restricting the movement of not only the electrophoretic particles 2 but also the insulating liquid 1.

Such inner projections 3a can be provided to the tubes 3 before or after filling the tubes 3 with the display medium comprising the insulating liquid 1 and the electrophoretic particles 2.

Such projections 3a can be provided to a tube 3 prior to filling with the display medium by constricting or shortening the tube 3 by heating or photo-illumination, or deformation at a prescribed pitch of the tube 3, e.g., by pressing with a pressing tool. The diameter of the tube 3 and the pitch of projections may be determined corresponding to the size of display pixels.

Further, such projections 3a may be provided to a tube 3 after filling with the display medium, e.g., pressing the tube 3 onto the first substrate or electrodes thereon provided with projections, by pressing the tube 3 with a patterned pressing tool, or by physically twisting the tube 3.

Figure 25:
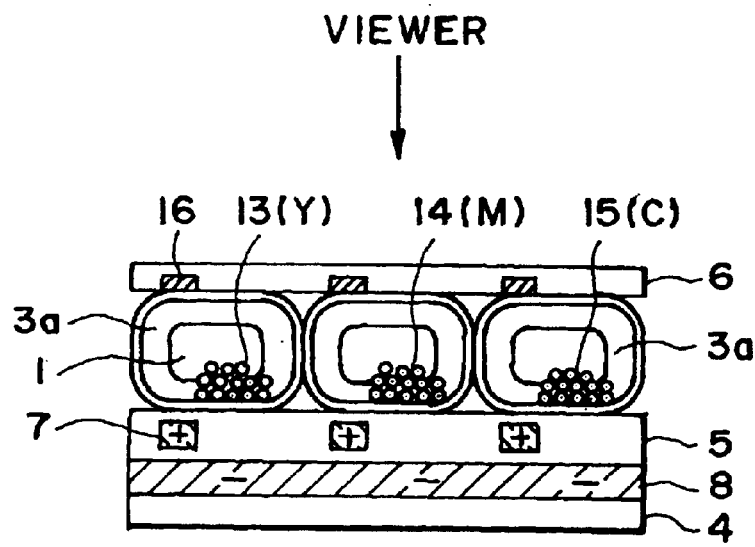
Figure 26:
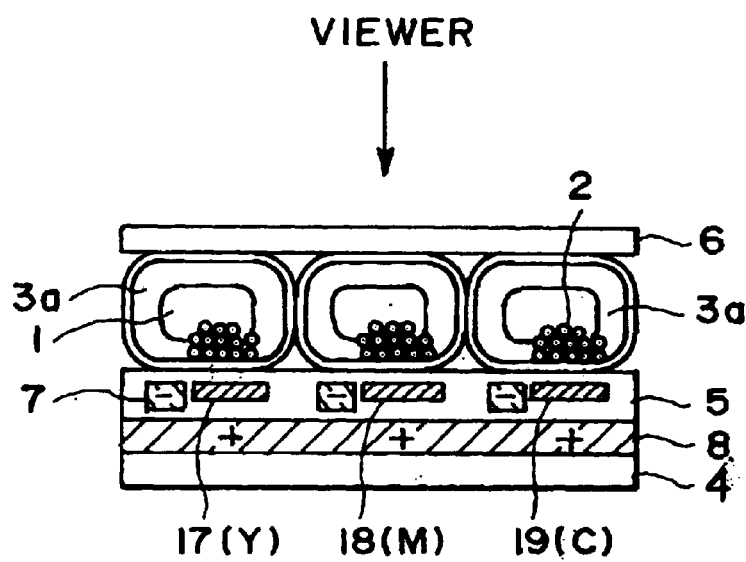
Figure 27A:
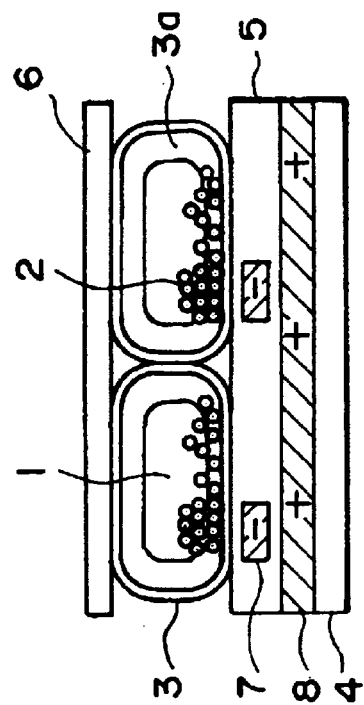
Figure 27B:
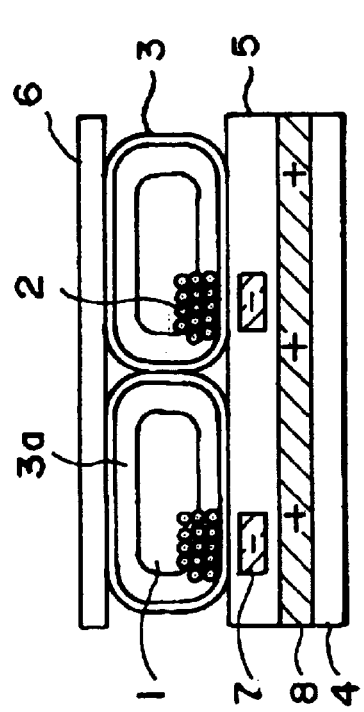

The display device according to this embodiment may be used for color display similarly as in First embodiment as shown in FIGS. 24–26 (corresponding to FIGS. 4–6 for First embodiment) and or gradational display as shown in FIGS. 27A and 27B (corresponding to FIGS. 7A and 7B for First embodiment).

The display device according to this embodiment may be produced by using tubes 3 already provided with or not provided with the inner wall projections 3a as mentioned above.

First of all, the display device may be produced by using tubes 3 already provided with inner wall projections 3 through a process as illustrated in FIGS. 28A to 28F in a similar manner as described with reference to FIGS. 9A to 9E with respect to First embodiment.

Figure 28A:
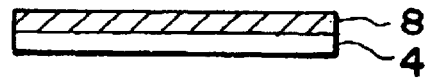
Figure 28B:
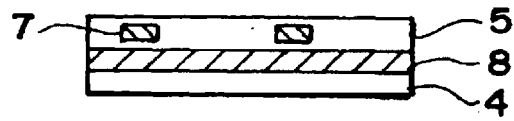
Figure 28C:
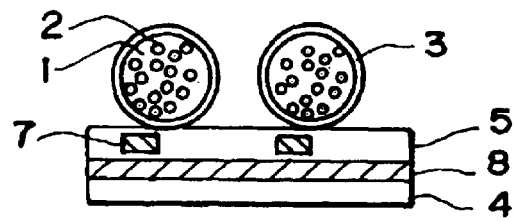
Figure 28D:
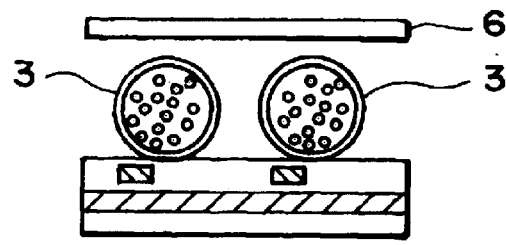
Figure 28E:
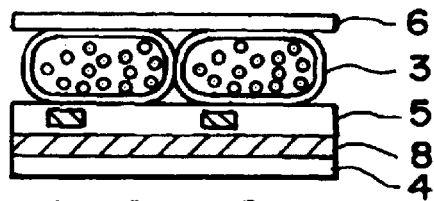

In the structure shown in FIG. 28E, when the first substrate 4 and the second substrate 6 are bonded to each other, the projections 3a are not fully deformed to form a complete partitioning wall, thus allowing a communication between adjacent moving spaces S. However, it is also possible to cause such a full deformation to form complete partitions and provide closed moving spaces S. In any case, the localization of the electrophoretic particles due to movement along the longitudinal direction within each tube can be effectively obstructed.

Then, a device production process wherein tubes 3 filled with the display medium comprising the insulating liquid 1 and the electrophoretic particles 2 are provided with inner wall projections 3a during the device production process will now be described with reference to FIGS. 29A to 29E. The tubes 3 subjected to this device production process can have been provided with some inner wall projections.

Figure 29A:
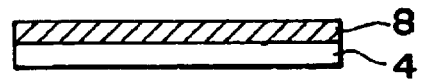
Figure 29B:
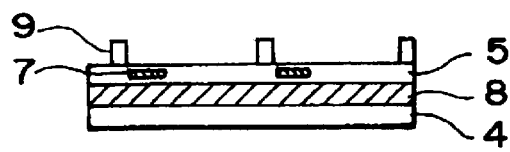

Referring to FIGS. 29A and 29B, a first substrate 4 is provided with first electrodes 8, second electrodes 7 and an insulating layer 5 in the same manner as in First embodiment described with reference to FIGS. 10A and 10B (i.e., similarly as FIGS. 9A and 9B), and then projections 9 for providing inner wall projections 3a to the tubes 3 are formed on the insulating layer 5. The projections 9 may comprise a similar material as the insulating layer 5 for convenience of production but need not comprise an insulating material. It is also possible to provide a part of the first electrodes 8 and/or second electrodes 7 with a projecting structure. The shape and position of the projection may be appropriately determined depending on the specification of the inner wall projections 3a.

Figure 29C:
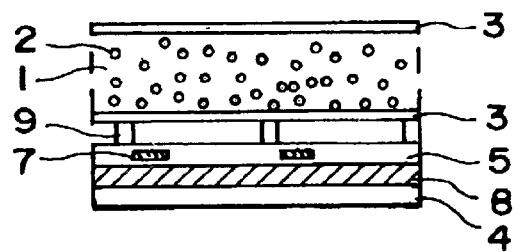
Figure 29D:
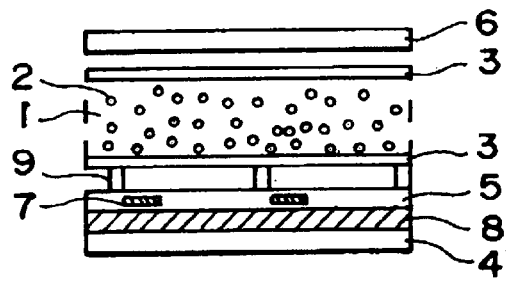
Figure 29E:
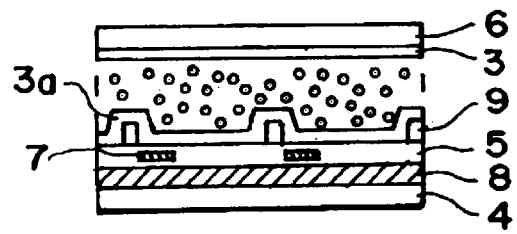

Then, on the first substrate 4 provided with the projections 9, the tubes 3 filled with the display medium comprising the insulating liquid 1 and the electrophoretic particles 2 are arranged (FIG. 29C), a second substrate 6 is disposed above the tubes 3 in alignment with the first substrate 4 (FIG. 29D), and the structure shown in FIG. 29D installed within an outer frame (not shown) is heated via the outer frame to bond the substrates 4 and 6 while deforming the tube 3 to provide inner wall projections 3a on the first substrate 4 side (FIG. 29E).

In the above example shown in FIGS. 29A–29E, the projections 9 for providing tube inner wall projections 3a are formed only on the first substrate 4, but such projections can also be formed on the second substrate 6. Further, as a result of the bonding of the substrates within an outer frame, the upper and lower portions of a tube 3 can partially contact each other or form a closed partition.

Instead of the above-mentioned processes, the tubes 3 filled with the display medium can be provided with such inner wall projections at regular intervals, e.g., by forming a pressing tool provided with inner projections or by physically twisting the tubes. As a result, the tube inner wall is provided with periodical constricted sectional portions, by pressing or twisting, which may be regarded as inner wall projections according to this embodiment. In these cases, the constricted portions can close the tube 3 thereat. In the case of press-forming for providing such projections, the tubes 3 may preferably comprise a material having a softening point which is lower than the temperatures causing denaturation of the insulating liquid 1 and the electrophoretic particles 2.

Except for the above points, the insulating liquid 1, the electrophoretic particles 2 and the tubes 3 may comprise identical materials as in First embodiment. The tubes 3 may be filled with the display medium comprising the insulating liquid 1 and the electrophoretic particles 2 in similar manners as in First embodiment as illustrated in FIGS. 8A and 8B. Further, the display device according to this embodiment may be driven for white-black display, color display and/or gradational display in similar manners as in First embodiment except that the localization of the electrophoretic particles 2 is better suppressed due to better suppression of movement of the electrophoretic particles 2 in the longitudinal direction within each tube 3 due to provision of the inner wall projections 3a.

Some specific examples according to this embodiment will be described hereinafter.

EXAMPLE 13

A display device of 5 cm-square in planar size was prepared through a process as illustrated in FIGS. 8A and 28A–28F.

A cylindrical light-transmissive tube 3 of PET having a length of 5 cm, a wall thickness of 10–15 $\mu$m and an inner diameter of 200 $\mu$m was locally periodically heated by causing heat shrinkage to be provided with inner wall projections 3a at a pitch of 180 $\mu$m providing constricted inner wall diameters of 100–150 $\mu$m. The tube 3 was then filled with a display medium comprising a 25:1 (by weight)-mixture of a transparent insulating liquid 1 of silicone oil and black electrophoretic particles 2 of a polystyrene-carbon mixture having particle sizes of ca. 1–2 $\mu$m in a manner as illustrate in FIG. 8A, i.e., by dipping one end of the tube 3 into a bath of the display medium under sufficient stirring in a vessel 21 and sucking from the other and the tube 3. After the filling, both ends of the tube 3 were sealed up by heating.

Then, on a light-transmissive first substrate 4 of 200 $\mu$m-thick PET film, an aluminum film was formed and patterned into first electrodes 8 in the form of 190 $\mu$m-wide stripes at a pitch of 200 $\mu$m (only one thereof being shown in FIG. 28A). Then, the first electrodes 8 were coated with a lower half of insulating layer 5 of 4 $\mu$m-thick acrylic resin film colored in white with inclusion of titanium oxide fine particles.

Further, on the insulating layer 5, a dark-black colored layer of titanium carbide was formed and patterned by photolithography including dry etching into second electrodes 7 of 50 $\mu$m-wide stripes at a pitch of 200 $\mu$m extending perpendicular to the stripes of first electrodes 8. Further, the second electrodes 7 were coated with an upper half of insulating layer 5 of 2 $\mu$m-thick acrylic resin (FIG. 28B).

Then, on the first substrate 4 having a structure as shown in FIG. 28B, a plurality of the tubes 3 provided with the inner wall projections 3a (not seen in FIG. 28C) and filled with the display medium of the insulating liquid 1 and the black electrophoretic particles 2 were arranged so that their extending directions were parallel to the extension direction of the second electrodes 7 (FIG. 28C). Then, a light-transmissive second substrate 6 was disposed above the tubes 3 (FIG. 28D), and the substrates 4 and 6 aligned with each other were bonded to each other with an ultraviolet-curable acrylic resin under a slight pressure between the substrates 4 and 6.

Figure 28F:
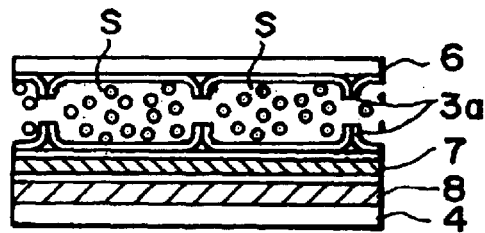

As a result, the upper and lower parts of the tubes 3 were made flat by contact with the substrates 6 and 4, and the tubes 3 were disposed in intimate contact with each other, i.e., with no gap between each other (FIG. 28E). Along with the deformation of the tubes 3, the vertical distance between the upper and lower portions of each inner wall projection 3a was narrowed to provide moving spaces S within which the movement of the electrophoretic particles 2 were substantially confined to form a structure as shown in FIG. 28F (and also in FIG. 28E). Further, the structure was provided with a voltage application means to complete a display device.

The thus-prepared display device was subjected to voltage application of +50 volts for a display to be observed from the second substrate 6 side. As a result, as the black electrophoretic particles 2 were positively charged in the silicone oil 1, the particles 2 were moved to positions above the first electrodes 8 when the first electrodes 8 were supplied with −50 volts, thus providing a black display state.

On the other hand, when the second electrodes 7 were supplied with −50 volts, the black particles 2 were collected above the dark black-colored second electrodes 7 so that the display device exhibited a grayish white display state. The response speed was 30 msec or shorter. No display irregularity due to localization of the colored particles 2 was observed.

EXAMPLE 14

A display device was prepared through a process as illustrated in FIGS. 8B and 29A–29E.

A cylindrical light-transmissive tube 3 identical to the one used in Example 13 provided with no inner wall projections was filled with the same display medium as in Example 13 but in a manner as illustrated in FIG. 8B, i.e., by dipping one end of the tube 3 containing black electrophoretic particles 2 uniformly attached to the inner wall thereof into a bath of transparent insulating liquid 1 and introducing the colored insulating liquid 1 by sucking from the other end of the tube 3. After the filling, both ends of the tube 3 were sealed by heating. Thus, a plurality of tubes 3 containing the display medium were prepared.

Separately, a first substrate 4 was provided with first electrodes 8 (FIG. 29A), and second electrodes 7 and an insulating layer 5 in the same manner as in Example 13, and then further provided with 30 μm-high and 15 μm-wide stripe-shaped projections 9a of acrylic resin arranged at a pitch of 300 μm in parallel with the second electrodes 7 (FIG. 29B). Then, the above-prepared tubes 3 filled with the display medium were arranged on the first substrate 4 with their extension directions perpendicular to the extension directions of the projections 9 (FIG. 29C). Thereafter, a second substrate 6 was disposed thereabove (FIG. 29D) and the substrates 4 and 6 were bonded to each other in the same manner as in Example 13 to form a structure shown in FIG. 29E. Thus, the tubes 3 were disposed in intimate contact with each other and with their upper and lower surfaces made flat and in intimate contact with the second substrate 6 and the first substrate 4 while the lower surface was provided with inner wall projections 3a corresponding to the projections 9 to form moving sections (FIG. 29E). The structure was then provided with voltage application means to complete a display device.

The thus-prepared display device was driven by application of ±50 volts between the electrodes, whereby a display with no display irregularity due to localization of the colored particles was performed at a response speed of 30 msec or shorter.

EXAMPLE 15

A color display device was prepared through a process as illustrated in FIGS. 28A–28E.

Cylindrical light-transmissive tubes 3 of PET were provided with inner wall projections 3a in the same manner as in Example 13, and then filled with three colors of display media comprising three colors of transparent insulating liquid 1 of silicone oil dyed in yellow (Y), magenta (M) and cyan (C), respectively, and white electrophoretic particles 2 of titanium oxide fine powder having particle sizes of ca. 1–2 μm. After the filling, both ends of each tube 3 were sealed by heating. Thus, three types of tubes 3 containing three colors of insulating liquid 1 were prepared.

Separately, a first substrate 4 was provided with first electrodes 8, an insulating layer 5 and second electrodes 7 as shown in FIGS. 28A–28B in the same manner as in Example 13.

Then, the above-prepared three colors of tubes 3 were arranged with their longitudinal directions parallel to the extension direction of the second electrodes 7 (FIG. 28C). Thereafter, a second substrate 6 was disposed thereabove (FIG. 28D), and the substrates 4 and 6 were bonded to each other in the same manner as in Example 13 to form a structure shown in FIG. 28E. At this time, the upper and lower portion of each projection 3a were made closer to each other to form a structure as shown in FIG. 28E having moving sections S. The structure was then provided with voltage application means to complete a display device.

The thus-prepared display device was driven by application of ±50 volts. As a result, since the white electrophoretic particles 2 of titanium oxide were negatively charged in the silicone oil 1, the white particles 2 were moved to positions above the first electrodes 8 to provide a white display state when the first electrodes 8 were supplied with +50 volts.

On the other hand, when the second electrodes 7 were supplied with +50 volts, the white particles 2 were moved to above the second electrodes 7, the respective colors of the transparent insulating liquid 1 could be observed. The response speed was 30 msec or shorter, and no display irregularity due to localization of the colored particles was observed. Further, by collecting the colored particles 2 above the second electrodes 7 at selected tubes 3, the respective colors of yellow (Y), magenta (M) and cyan (C) could be selectively exhibited to allow a color display.

EXAMPLE 16

A display device was produced in the following manner through a process as illustrated in FIG. 8B and FIGS. 30A–30E.

First of all, cylindrical light-transmissive tubes 3 of PET each having an inner diameter of 200 μm were filled with three colors of display media comprising a transparent insulating layer 1 of silicone oil and three colors of electrophoretic particles 2 comprising mixtures of polystyrene and colorants of yellow (Y), magenta (M) and cyan (C), respectively, and having particle sizes of ca. 1–2 μm.

The three types of tubes 3 were each prepared through a filling process as illustrated in FIG. 8B. Further, the tubes 3 were each provided with inner wall projections at a pitch of 200 μm by means of a pressing tool.

Figure 30A:
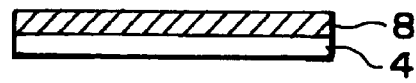
Figure 30B:
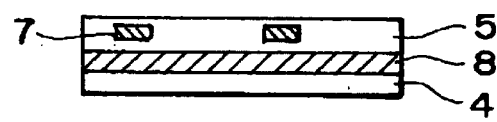

Separately, a first substrate 4 of 200 μm-thick PET was provided with white-colored first electrodes 8, an insulating layer 5 and 50 μm-wide second electrodes 7 of titanium carbonate as shown in FIGS. 30A–30B in a similar manner as in Example 13.

Figure 30C:
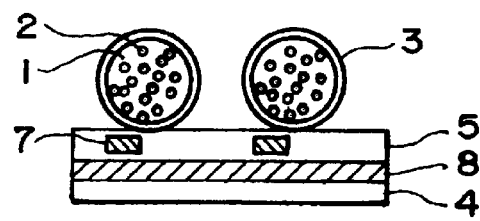
Figure 30D:
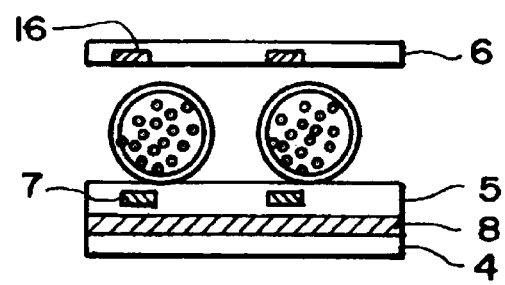
Figure 30E:
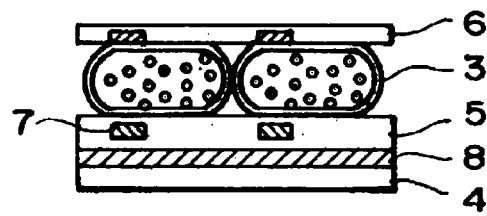

Then, the above-prepared three colors of tubes 3 were arranged with their longitudinal directions parallel to the extension direction of the second electrodes 7 (FIG. 25 and FIG. 30C). Thereafter, a light-transmissive second substrate 6 provided with masking stripe patterns 16 of dark black-colored titanium carbonate at parts corresponding to the second electrodes 7 was disposed above the first substrate 4 (FIG. 30D), and the substrates 4 and 6 were bonded to each other in the same manner as in Example 13 to form a structure shown in FIG. 30E, further provided with inner wall projections 3a (not shown). The structure was then provided with voltage application means to complete a display device.

The thus-prepared display device was driven by application of ±50 volts. As a result, since the polystyrene-based electrophoretic particles 13, 14 and 15 of respective colors were positively charged in the silicone oil 1, the colored particles were moved to positions above the first electrodes 8 to provide respective color display states when the first electrodes 8 were supplied with −50 volts.

On the other hand, when the second electrodes 7 were supplied with −50 volts, the colored particles 13, 14 and 15 were moved to above the second electrodes 7, the first electrodes 8 could be observed through the transparent insulating liquid 1 to provide a white display state. The response speed was 30 msec or shorter, and no display irregularity due to localization of the colored particles was observed. Further, by collecting the respective colored particles 2 above the first electrodes 8 at selected tubes 3, the respective colors of yellow (Y), magenta (M) and cyan (C) could be selectively exhibited to allow a color display.

EXAMPLE 17

A display device was prepared in the following manner through a process as illustrated in FIGS. 31A–31F.

Tubes 3 (already provided with inner wall projections 3a) each having an inner diameter of 100 μm were filled with a display medium comprising the transparent insulating liquid 1 and white particles 2 of titanium oxide, otherwise in the same manner as in Example 13.

Separately, a light-transmissive first substrate 4 of 200 μm-thick PET film was provided with first electrodes 8 of ITO stripes (FIG. 31A) and an insulating layer 5 of colored transparent polyimide. Further, on the insulating layer 5, a dark black titanium carbonate film was formed and patterned into second electrodes 7 of 30 μm-wide stripes extending perpendicularly to the stripes of first electrodes 8.

Figure 31A:
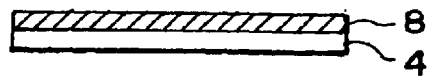
Figure 31B:
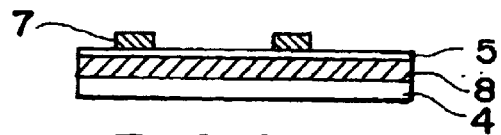
Figure 31C:
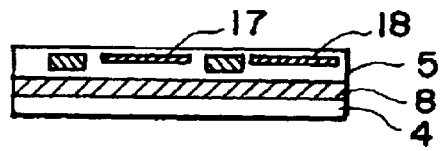
Figure 31D:
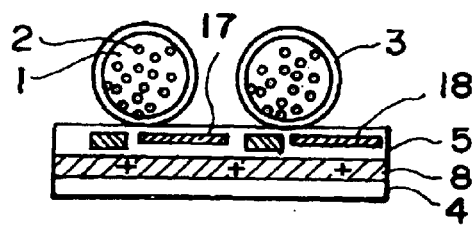
Figure 31E:
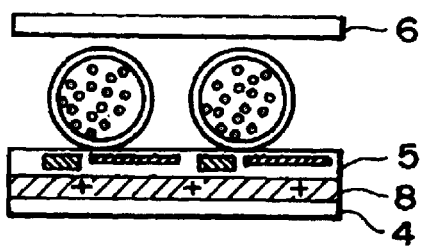
Figure 31F:
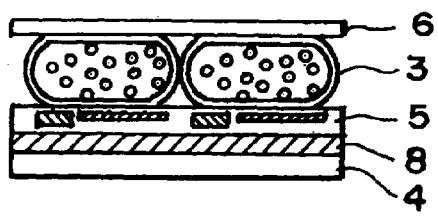

Then, color layers 17 (Y), 18 (M) and 19 (C, not shown) were formed in juxtaposition with the second electrodes 7, and further coated with an upper half of insulating liquid 5 (FIG. 31C). By using the thus-treated first substrate 4, a display device having a structure as shown in FIG. 31F was prepared through steps as shown in FIGS. 31D to 31F otherwise in the same manner as in Example 13.

The thus-prepared display device was driven by application of ±60 volts. The colored particles 2 of titanium oxide was negatively charged in the insulating liquid 1 of silicone oil. As a result, the white particles 2 were collected above the first electrodes 8 to provide a white display state when the first electrodes 8 were supplied with +60 volts.

On the other hand, when the second electrodes 7 were supplied with +60 volts, the white particles 2 were collected above the second electrodes, so that the colored layers 17 and 18 (and 19) could be observed through the second substrate 6. The response speed was 30 msec or shorter, and no display irregularity due to localization of the colored particles 2 was observed. By forming three types colored layers (17, 18, . . . ) of yellow, cyan and magenta, a color display could be performed.

Further, when the display device was driven at a shorter voltage application period of 5 msec, the reflected light of respective colors could be lowered to nearly a half. Thus, a multi-level gradational display could be performed by selecting various voltage application periods, thus providing a color display device capable of gradational display.

EXAMPLE 18

A display device was prepared through similar steps as in Example 13 by using tubes 3 having an inner diameter of 30 μm, colored particles of ca. 0.5–1.0 μm and second electrodes 7 in a smaller width of 10 μm.

The thus-prepared display device was driven by application of ±50 volts. As a result of shorter migration distance by using narrower second electrodes 7, the response time could be reduced to 5 msec or shorter with no display irregularity due to localization of the colored electrophoretic particles.

According to this embodiment, similar performances as in First embodiment are attained except that the localization of electrophoretic particles 2 is better suppressed due to obstruction of the movement of the particles in a longitudinal direction of each tube 3.

(Fourth Embodiment)

Figure 32:
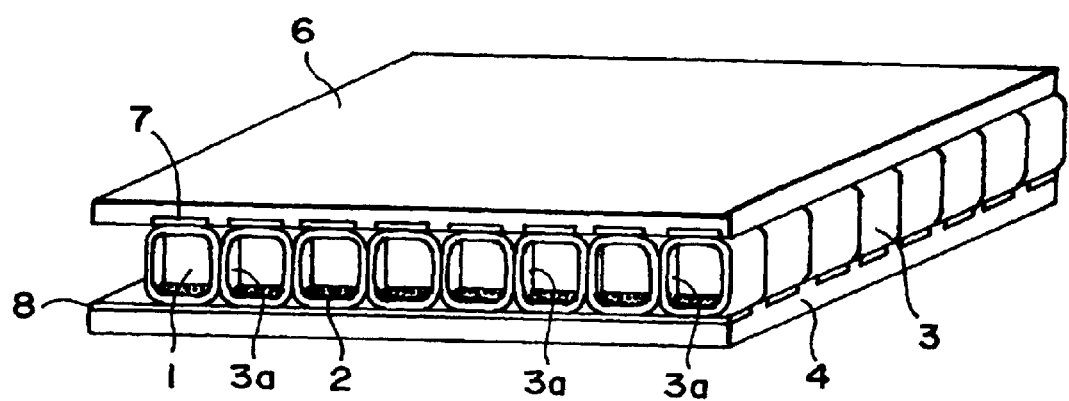

FIG. 32 is a perspective view of an electrophoretic display device according to an embodiment of the present invention, and FIGS. 33A and 33B are partial sectional views thereof for illustrating an operation principle thereof.

This embodiment is different from Third embodiment described with reference to FIGS. 21 to 31 in that light-transmissive second electrodes 7 are formed on a second substrate 6 (FIGS. 32 and 33) instead of a first substrate 4. The other features are substantially identical to those in Third embodiment.

As a result, this embodiment is different from First embodiment described with reference to FIGS. 1 to 12 in the above-described point and in that each tube 3 is provided with a plurality of projections 3a from the inner wall thereof at prescribed intervals for obstructing the movement of colored electrophoretic particles 2 in a longitudinal direction thereof. The other features are substantially identical to those in First embodiment.

As a result, this embodiment provides combined features of Second embodiment and Third embodiment compared with First embodiment. Thus, the display device according to this embodiment is operated in similar manners as in Second embodiment as illustrated in FIGS. 32–36 corresponding to FIGS. 15–18 for Second embodiment, and may be produced through processes as illustrated in FIGS. 37 and 38 corresponding to FIGS. 19 and 20 for Second embodiment, i.e., in similar manners as in First embodiment with appropriate modifications described with respect to Second and Third embodiments.

Some specific examples according to this embodiment will be described below.

EXAMPLE 19

A display device was prepared through a process as illustrated in FIGS. 8A and 37A–37F.

A cylindrical light-transmissive tube 3 of PET having an inner diameter of 200 μm was locally periodically heated by causing heat shrinkage to be provided with inner wall projections 3a at a pitch of 180 μm providing constricted inner wall diameters of 100–150 μm. The tube 3 was then filled with a display medium comprising a white opaque insulating liquid 1 of silicone oil dyed with oil-soluble white dye and black electrophoretic particles 2 of a polystyrene-carbon mixture having particle sizes of ca. 1–2 μm in a manner as illustrate in FIG. 8A, i.e., by dipping one end of the tube 3 into a bath of the display medium under sufficient stirring in a vessel 21 and sucking from the other end of the tube 3. After the filling, both ends of the tube 3 were sealed up by heating.

Then, on a light-transmissive first substrate 4 of 200 μm-thick PET film, a titanium film was formed and patterned into first electrodes 8 in the form of stripes (only one thereof being shown in FIG. 37A). Separately, on a light-transmissive second substrate 6 of 200 μm-thick PET film, an ITO film was formed and patterned into second electrodes 7 in the form of stripes (FIG. 37B).

Then, on the first substrate 4 having a structure as shown in FIG. 37B, a plurality of the above-prepared tubes 3 provided with the inner wall projections 3a (not shown in FIG. 37C) and filled with the display medium of the white insulating liquid 1 and the black electrophoretic particles 2 were arranged so that their extending directions were perpendicular to the extension direction of the first electrodes 8 (FIG. 37C). Then, the light-transmissive second substrate 6 provided with the second electrodes 7 was disposed above the tubes 3 (FIG. 37D), and the substrates 4 and 6 were bonded to each other with an ultraviolet-curable acrylic resin under a slight pressure between the substrates 4 and 6.

As a result, the upper and lower parts of the tubes 3 were made flat by contact with the substrates 6 and 4, and the tubes 3 were disposed in intimate contact with each other, i.e., with no gap between each other (FIG. 37E). Along with the deformation of the tubes 3, the vertical distance between the upper and lower portions of each inner wall projection 3a was narrowed to provide moving spaces S within which the movement of the electrophoretic particles 2 were substantially confined to form a structure as shown in FIG. 37F (and also in FIG. 37E). Further, the structure was provided with a voltage application means to complete a display device.

The thus-prepared display device was subjected to voltage application of ±50 volts for a display to be observed from the second substrate 6 side. As a result, as the black electrophoretic particles 2 were positively charged in the silicone oil 1, the particles 2 were moved to positions above the first electrodes 8 when the first electrodes 8 were supplied with −50 volts, thus providing a white display state (FIG. 33A).

On the other hand, when the second electrodes 7 were supplied with −50 volts, the black particles 2 were collected on the second electrodes 7 so that the display device exhibited a black display state (FIG. 33B). The response speed was 30 msec or shorter. No display irregularity due to localization of the colored particles 2 was observed.

EXAMPLE 20

A display device was prepared through a process as illustrated in FIGS. 8B and 38A–38E.

Figure 38A:
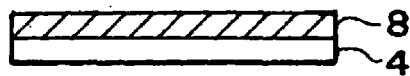
Figure 38B:
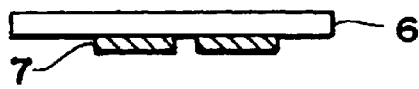
Figure 38C:
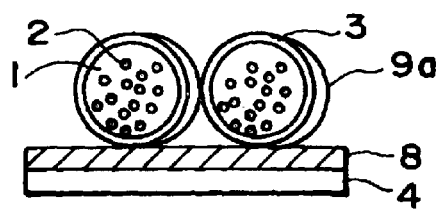
Figure 38D:
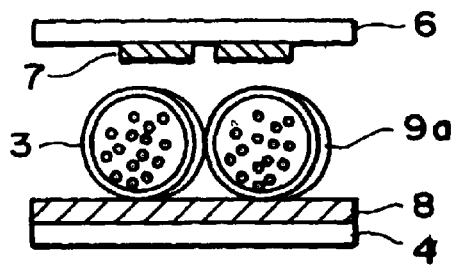

Cylindrical tube 3 of 200 µm in diameter not provided with inner wall projections were each provided with maximum 30 µm-high projections 9a along an external side thereof at a longitudinal pitch of 300 µm (as shown in FIG. 38C). Then, the tubes 3 were filled with the same display medium comprising the white insulating liquid 1 and black colored particles 2 as used in Example 19 in a manner as illustrated in FIG. 8B, i.e., by dipping one end of each tube 3 containing the black electrophoretic particles 2 uniformly attached to the inner wall thereof into a bath 21 of the white insulating liquid 1 and introducing the white insulating liquid 1 by sucking from the other end of the tube 3. After the filling, both ends of each tube 3 were sealed by heating.

Separately, first electrodes 8 were formed on a first substrate 4 (FIG. 38A), and second electrodes 7 were formed on a second substrate 6 (FIG. 38B), respectively, in the same manner as in Example 19. Further, the above-prepared tubes 3 filled with the display medium and provided with external projections 9a were arranged on the first substrate 4 provided with first electrodes 8 with their extension directions perpendicular to the stripe first electrodes 8 (FIG. 38C).

Figure 38E:
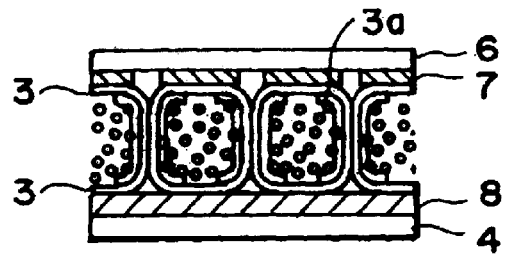

Thereafter, the second substrate 6 provided with the second electrodes 7 was disposed above the tubes 3 so that the first electrodes 8 and second electrodes 7 were perpendicular to each other (FIG. 38D), and the substrates 4 and 6 were bonded to each other in the same manner as in Example 19 to form a structure shown in FIG. 38E. Thus, the tubes 3 were disposed in intimate contact with each other and with their upper and lower surfaces made flat and in intimate contact with the second substrate 6 and the first substrate 4. At the same time, each tube 3 was provided with inner wall projections 3a by pressing with the external projections 9a of an adjacent tube 3 to form a structure shown in FIG. 38E. The structure was then provided with voltage application means to complete a display device.

The thus-prepared display device was driven by application of ±50 volts between the electrodes in the same manner as in Example 19, whereby a display with no display irregularity due to localization of the colored particles was performed at a response speed of 30 msec or shorter.

EXAMPLE 21

A display device was produced in the following manner through a process as illustrated in FIGS. 37A–37F.

First of all, cylindrical light-transmissive tubes 3 of PET having an inner diameter of 200 µm provided with inner wall projections 3a by locally periodical heating at a pitch of 200 µm and were filled with three colors of display media comprising three colors of transparent insulating liquid 1 of silicone oil dyed in yellow (Y), magenta (M) and cyan (C), respectively, and white electrophoretic particles 2 of titanium oxide fine powder having particle sizes of ca. 1–2 µm. After the filling, both ends of each tube 3 were sealed by heating. Thus three types of tubes 3 containing three colors of insulating liquid 1 were prepared.

Separately, a first substrate 4 was provided with first electrodes 8, and second electrodes 7 were formed on a second substrate 6, as shown in FIGS. 37A–37B, in the same manner as in Example 19.

Then, the above-prepared three colors of tubes 3 were arranged with their longitudinal directions perpendicular to the extension direction of the first electrodes 8 on the first substrate 4 (FIG. 37C). Thereafter, the second substrate 6 having thereon the second electrodes 7 was disposed thereabove so that the first electrodes 8 and the second electrodes 7 were perpendicular to each other (FIG. 37D), and the substrates 4 and 6 were bonded to each other in the same manner as in Example 19 to form a structure shown in FIG. 37E. At this time, the upper and lower portions of each projection 3a were made closer to each other to form a structure as shown in FIG. 37F having moving sections S. The structure was then provided with voltage application means to complete a display device.

Figure 35:
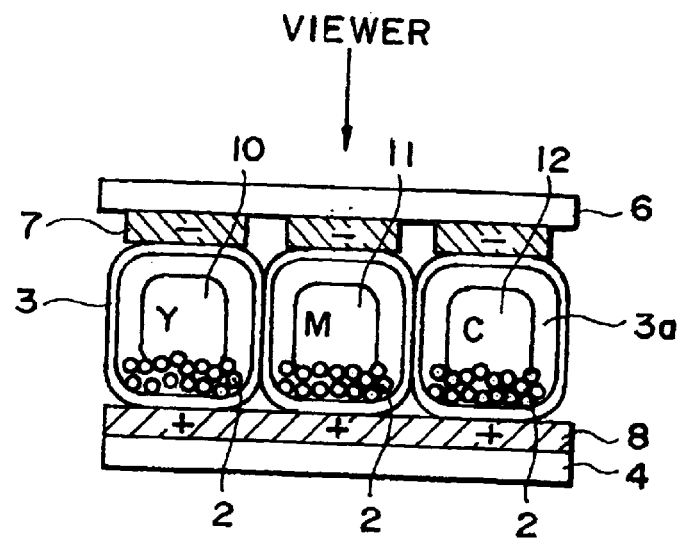

The thus-prepared display device was driven by application of ±50 volts. As a result, since the white electrophoretic particles 2 of titanium oxide were negatively charged in the silicone oil 1, the white particles 2 were moved to positions above the first electrodes 8 to display respective colors of the three types of the insulating liquid 1 when the first electrodes 8 were supplied with +50 volts (FIG. 35).

On the other hand, when the second electrodes 7 were supplied with +50 volts, the white particles 2 were moved to above the second electrodes 7, a white display state was exhibited. The response speed was 30 msec or shorter, and no display irregularity due to localization of the colored particles was observed. Further, by collecting the colored particles 2 above the first electrodes 8 at selected tubes 3, the respective colors of yellow (Y), magenta (M) and cyan (C) could be selectively exhibited to allow a color display.

EXAMPLE 22

A display device was produced in the following manner through a process as illustrated in FIG. 8B and FIGS. 37A–37F.

First of all, cylindrical light-transmissive tubes 3 of PET each having an inner diameter of 200 µm were filled with three colors of display media comprising a white insulating layer 1 of silicone oil dyed with oil-soluble white dye and three colors of electrophoretic particles 2 comprising mixtures of polystyrene and colorants of yellow (Y), magenta (M) and cyan (C), respectively, and having particle sizes of ca. 1–2 µm.

The three types of tubes 3 were each prepared through a filling process as illustrated in FIG. 8B, and were further provided with inner wall projections 3a at a pitch of 200 µm.

Separately, first electrodes 8 were formed on a first substrate 4 (FIG. 37A), and second electrodes 7 were formed on a second substrate 6 (FIG. 37B), respectively, in the same manner as in Example 19.

Then, the above-prepared three colors of tubes 3 were arranged with their longitudinal directions perpendicular to the extension direction of the first electrodes 8 (FIG. 37C). Thereafter, the second substrate 6 provided with the second electrodes 7 was disposed above the first substrate 4 (FIG. 37D), so that the first electrodes 8 and the second electrodes 7 were perpendicular to each other, and the substrates 4 and 6 were bonded to each other in the same manner as in Example 19 to form a structure shown in FIG. 37E. At this time, the upper and lower portions of each projection 3a were made closer to each other to form a structure a shown in FIG. 37F having moving sections S. The structure was then provided with voltage application means to complete a display device.

Figure 36:
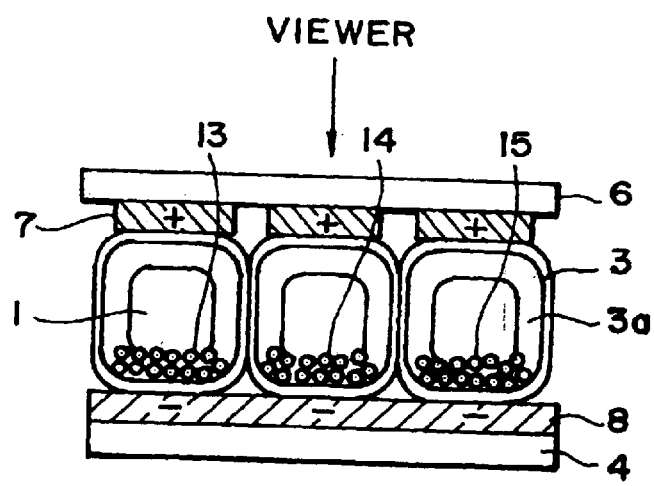

The thus-prepared display device was driven by application of ±50 volts. As a result, since the polystyrene-based electrophoretic particles 13, 14 and 15 of respective colors were positively charged in the silicone oil 1, the colored particles were moved to positions above the first electrodes 8 to provide a white display state due to the color of the white insulating liquid 1 when the first electrodes 8 were supplied with −50 volts (FIG. 36).

On the other hand, when the second electrodes 7 were supplied with −50 volts, the colored particles 13, 14 and 15 were moved to above the second electrodes 7, the respective colors of the colored particles 13(Y), 14(M) and 15(C) were observed. The response speed was 30 msec or shorter, and no display irregularity due to localization of the colored particles was observed. Further, by collecting the respective colored particles 2 above the second electrodes 7 at selected tubes 3, the respective colors of yellow (Y), magenta (M) and cyan (C) could be selectively exhibited to allow a color display.

EXAMPLE 23

A display device was prepared through similar steps as in Example 19 by using tubes 3 having an inner diameter of 30 µm, colored particles of ca. 0.5–1.0 µm and a smaller gap of 25 µm between the substrates 4 and 6.

The thus-prepared display device was driven by application of ±50 volts. As a result of shorter migration distance by using the smaller gap, the response time could be reduced to 5 msec or shorter with no display irregularity due to localization of the colored electrophoretic particles.

According to this embodiment, in addition to the effects of First embodiment, it is possible to attain the effect of allowing a display based on vertical movement of electrophoretic particles 2 and also the effect of reducing the localization of the electrophoretic particles 2 due to suppression of movement thereof in a longitudinal direction of tubes by provision of inner wall projections.

(Fifth Embodiment)

FIG. 39 is a schematic perspective view of an electrophoretic display device according to this embodiment, and FIGS. 40A and 40B are partial sectional views thereof for illustrating an operation principle thereof.

This embodiment is structurally similar as Second embodiment in that mutually intersecting first electrodes 8 and second electrodes 7 respectively in the form of stripes are disposed close to first substrate 4 and a second substrate 6, respectively, for allowing an electrophoretic display by movement of electrophoretic particles 2 vertically to the substrates. In this embodiment, however, each first electrode 8 is disposed along a tube 3 filled with a display medium, and the second electrodes 7 are disposed on the second substrate 6 so as to contact the tubes 3, optionally via electroconductive films 90 formed in advance on the tubes 3, for ensuring the vertical movement between the opposing parts of the first electrodes 8 and second electrodes 7 forming pixels between the first substrate 4 and second electrode 6.

More specifically, the display device shown in FIGS. 39 and 40 includes a plurality of light-transmissive tubes 3 filled with a display medium DM comprising an insulating liquid 1 and electrophoretic articles 2 and disposed between a first substrate 4 and a second substrate 6. Along an external side wall of each light-transmissive tube 3, a stripe-form first electrode 8 is disposed and stripe-form second electrodes 7 are disposed on the second substrate 6 so as to perpendicularly intersect the first electrodes 8, thereby forming a matrix electrode structure for driving a matrix of pixels each composed of the display medium DM and a pair of the opposing first electrode 8 and second electrode 7 sandwiching the display medium.

The first electrodes 8 are disposed in contact with the first substrate 4. The parts on the tube 3 contact with the second electrodes 7 may be provided with electroconductive films 90 so as to improve an electrical contact between the films 90 and the second electrodes 7 and thereby ensure the movement of the electrophoretic particles 2.

In this embodiment, a pair of first electrode 8 and second electrode 7 are disposed opposite to each other, so that the electrophoretic particles 2 are moved between the electrodes vertically to the substrates 4 and 6 to effect an electrophoretic display. For example, if the electrophoretic particles 2 are collected on the first electrodes 8 by voltage application between the first electrodes 8 and the second electrodes 7, the color of the insulating liquid 1 is observed to a viewer on the second substrate 6 side as shown in FIG. 40A. On the other hand, if the electrophoretic particles 2 are collected on the second electrodes 7 by application of a reverse polarity-voltage, the color of the particles 2 is observed to the viewer. As a result, if the particles 2 are colored in black and the insulating liquid 1 is colored in white, a white-black binary display becomes possible.

Depending on selection of the viewer's side, the second substrate 6 and second electrodes 7 thereon are made light-transmissive as shown in FIGS. 40A and 40B, or the first substrate 4 and first electrodes 8 thereon are made light-transmissive if the device is observed from the first substrate 4 side.

By using plural colors of insulating liquid 1 and/or electrophoretic particles 2, a color display may be possible similarly as in Second embodiment.

The display device shown in FIGS. 39 and 40 may be produced in the following manner through a process as illustrated in FIGS. 41A–41D, FIGS. 42A–42D and FIG. 8A or 8B.

First of all, a first electrode 8 of a stripe form in a prescribed width is formed along a generatrix of a cylindrical tube 3 as shown in FIGS. 41A (perspective view) and 41B (sectional view). It is preferred that the tube 3 is further provided with electroconductive films 90 at parts thereof contacting the second electrodes 7 along a side opposite to the first electrode 8 as shown in FIGS. 41C (perspective view) and 41D (sectional view). The width of the first electrode 8 and the sizes of the films 90 may be determined depending on the prescribed pixel size in consideration of the tube 3 diameter.

The tube 3 may have a shape of a cylinder (as shown in FIGS. 41A–41B) or a rectangle (as incorporated in the device of FIGS. 39–40) and comprise a material selected as described with reference to First embodiment.

The first electrode 8 and electroconductive films 9 formed on the tube 3 may comprise a metal, such as Al, Au, Pt, Ag, Ni, Ti or Cr, or a transparent metal oxide, such as ITO (indium tin oxide), ZnO or $SnO_2$, for providing transparent electroconductive films, and may be formed on the tube 3 by vacuum evaporation, sputtering, ion plating, etc., followed by patterning, e.g., by photolithography, as desired.

The tube 3 provided with the first electrode 8 and electroconductive films 90 may be filled with the display medium DM in the same manner as in First embodiment described with reference to FIGS. 8A and 8B. Uniform distribution within a tube 3 and uniform attachment onto the inner wall thereof of the electrophoretic particles 2 may be assisted if a voltage is applied to the first electrode 8 during the filling step. The display medium DM may comprise an insulating liquid 1 and colored electrophoretic particles 2 similar to those described with reference to First embodiment.

Instead of the above-mentioned sequence of formation of the first electrode 8 and the electroconductive films 9 on the tube 3, followed by filling of the tube 3 with the display medium, it is possible to first effect the filling of the tube 3 with the display medium, followed by formation of the electrode 8 and the films 90 on the tube 3.

By using a plurality of the above-prepared tubes 3 provided with the first electrode 8 and the electroconductive films 90 and filled with the display medium DM, a display device as shown in FIGS. 39 and 40 may be produced in the following manner through a process as illustrated in FIGS. 42A–42D.

Figure 42A:

First, a second substrate 6 is provided with stripe second electrodes 7 as shown in FIG. 42A similarly as the formation of the first electrodes 8 on the first substrate 4 in FIG. 9A for First embodiment.

Figure 42B:
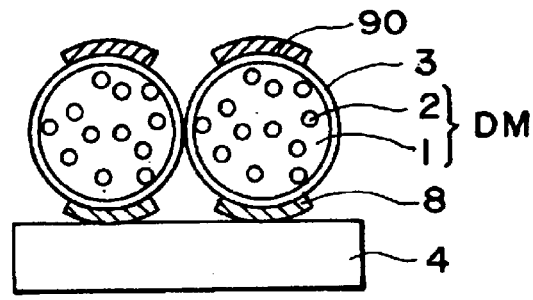

Then, as shown in FIG. 42B, the above-prepared tubes 3 filled with the display medium DM are arranged on a first substrate 4 so that the first electrodes 8 formed thereon contact the first substrate 4. As desired, a supporting member composed of, e.g., silicone resin or acrylic resin may be disposed between adjacent tubes 3 or between a tube 3 and a first substrate 4 or a second substrate 6.

In the case of color display, the tubes 3 containing different colors of display medium DM as by inclusion of different colors of electrophoretic particles 2 or different colors of insulating liquid 1 may be arranged in a prescribed order, e.g., an order of yellow (Y), magenta (M) and cyan (C).

Figure 42C:
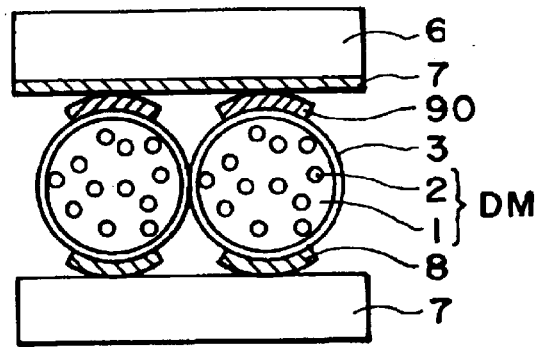
Figure 42D:
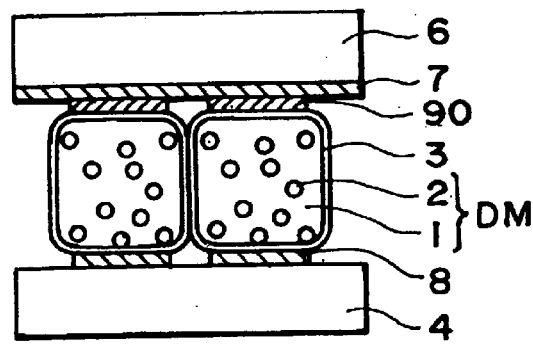
Figure 49A:
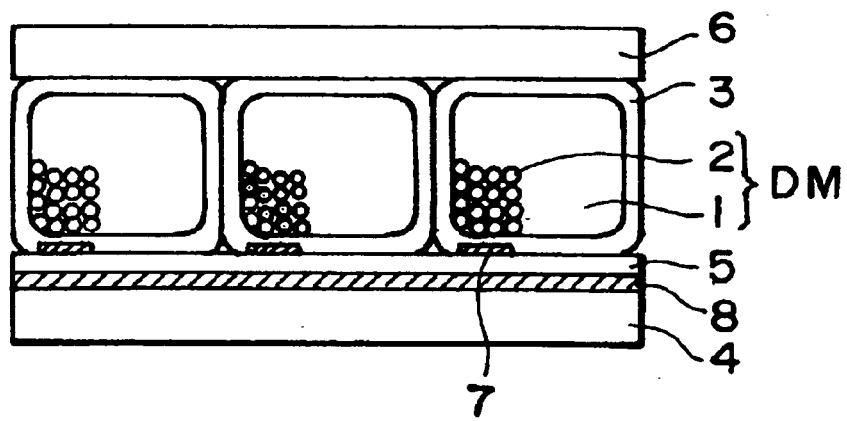
Figure 49B:
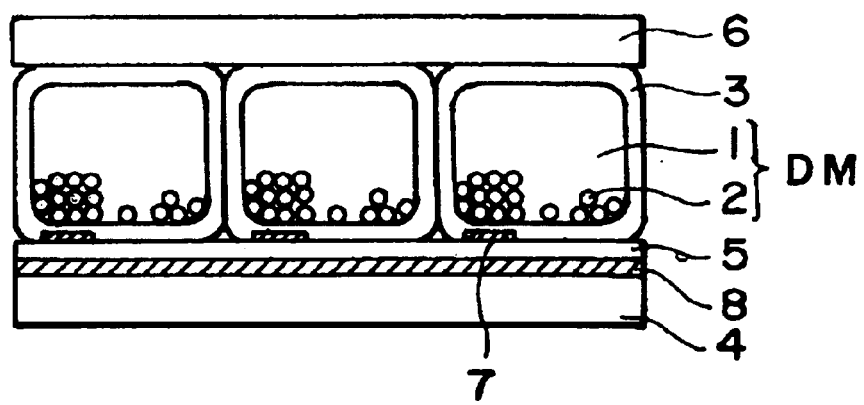

Then, as shown in FIG. 42C, the second substrate 6 provided with the second electrodes 7 is disposed above and in alignment with the tubes 3 so that the first electrodes 8 on the tubes 3 and the second electrodes 7 on the second substrate 6 are perpendicular to each other. Then, by hardening the above-mentioned supporting member (not shown) of silicone resin or acrylic resin, if used, or/and by hardening a photocurable or heat-curable adhesive (not shown) applied at a peripheral part of the structure shown in FIG. 42C, the first substrate 4 and the second substrate 6 are bonded to each other under a slight pressure. At this time, the tubes 3 are deformed corresponding to a set spacing between the substrates 4 and 6, whereby the tubes 3 are disposed in intimate contact with each other to form a structure shown in FIG. 42D. (Incidentally, in case where the tubes 3 are formed of a material with little deformability, the tubes 3 may be provided with a sectional shape as shown in FIG. 42D prior to the bonding step shown in FIG. 42C as will be described with reference to FIGS. 43A–43D for an example hereinafter. The use of such tubes 3 having a rectangular section may facilitate the arrangement of the tubes 3 on the first substrate 4.)

Finally, the structure shown in FIG. 42D is provided with a means (not shown) for applying voltages between the first electrodes 8 and the second electrodes to complete a display device as shown in FIGS. 39 and 40.

According to this embodiment, in addition to the effects attained in Second embodiment, it is possible to reduce a positional deviation between the opposing first electrodes 8 and second electrodes 7, thus reducing a display irregularity caused by such a positional deviation.

Some specific examples according to this embodiment will be described hereinbelow.

EXAMPLE 24

A display device was produced in the following manner through a process as illustrated in FIGS. 42A–42D.

On an outer surface of and along a longitudinal generatrix of a 10 $\mu$m-thick light-transmissive cylindrical tube 3 of PET having an inner diameter of 200 $\mu$m, a 300 nm-thick and 150 $\mu$m-wide stripe of Al first electrode 8 was formed by vacuum evaporation.

The tube 3 was then filled with a display medium DM comprising a white insulating liquid 1 of silicone oil dyed with an oil-soluble white dye and 3 wt. % of black electrophoretic particles 2 of a polystyrene-carbon mixture having particle sizes of 1–2 $\mu$m in a manner as illustrated in FIG. 8A, i.e., by dipping one end of the tube 3 into a bath of the display medium DM under sufficient stirring in a vessel 21 and sucking from the other end of the tube 3. After the filling, both ends of the tube 3 were sealed up by heating.

Separately, on a light-transmissive second substrate 6 of 200 $\mu$m-thick PET film, a 300 nm-thick ITO film was formed and patterned by photolithography including dry etching to form second electrodes 7 of 150 $\mu$m-wide stripes at a pitch of 200 $\mu$m (FIG. 42A).

Then, a plurality of the above-prepared tubes 3 each provided with a first electrode 8 and filled with the display medium DM were arranged on a first substrate 4 of 200 $\mu$m-thick PET film so that the first electrodes 8 thereon contacted the first substrate 4 (FIG. 42B but with no film 90).

Then, the above-prepared second substrate 6 provided with the second electrodes 7 (FIG. 42A) was placed on the tubes 3 so that the second electrodes 7 contacted the tubes 3 and the second electrodes 7 were perpendicular to the second electrodes 8 and the second substrate 6 was positionally aligned with the first substrate 4 (FIG. 42C). Further, a casting polypropylene-type heat-curable adhesive was applied between the substrates at peripheries of the stacked structure, which was then installed within a PET-made outer frame (not shown) and heated at 100° C. via the outer frame while setting a gap between the substrates 4 and 6 at 140 $\mu$m. As a result, the upper and lower parts of the tubes 3 were made flat by contact with the substrates 6 and 4, the tubes 3 were disposed in intimate contact with each other to produce a structure as shown in FIG. 42D (but with no films 90). Further, the structure was provided with a voltage application means to provide a display device.

The thus-prepared display device was subjected to a display operation to be observed from the second substrate 6 side by voltage application of ±50 volts between the first and second electrodes 8 and 7. In this example, the black particles 2 were positively charged in the insulating liquid 1 of silicone oil and moved toward an electrode supplied with a negative voltage. As a result, the black particles 2 were moved to the first electrodes 8 to provide a white display state when the first electrodes were supplied with −50 volts (FIG. 40A). On the other hand, the black particles 2 were moved to the second electrodes 7 to provide a black display state when the second electrodes 7 were supplied with −50 volts (FIG. 40B). The response time was 30 msec or shorter. No display irregularity due to localization of the colored particles 2 was observed.

EXAMPLE 25

A display device was prepared in the same manner as in Example 24 except for using a display medium DM comprising a blue insulating liquid 1 formed by dissolving oil-soluble dye in silicone oil and 3 wt. % white particles 2 of $TiO_2$ having particle sizes of 1–2 $\mu$m.

The thus-prepared display device was subjected to voltage application of ±50 volts for observation from the second substrate 6 side. As the white particles 2 were negatively charged in the silicone oil 1, the particles 2 were moved to the first electrodes 8 to provide a blue display state when the first electrodes were supplied with +50 volts and moved to the second electrodes 7 to provide a white display state when the second electrodes 7 were supplied with +50 volts. The response time was 30 msec or shorter, and no display irregularity due to localization of the colored particles 2 was observed.

EXAMPLE 26

A display device was prepared in the same manner as in Example 24 except for forming the first electrode 8 as a 300 nm-thick ITO stripe film by sputtering on the tube 3 and forming the second electrodes 7 of 300 nm-thick Ag films on the second substrate 6.

The thus-prepared display device was subjected to voltage application of ±50 volts for observation from the second substrate 6 side. As the black particles 2 were positively charged in the silicone oil 1, the particles 2 were moved to the first electrodes 8 to provide a white display state when the first electrodes were supplied with −50 volts and moved to the second electrodes 7 to provide a black display state when the second electrodes 7 were supplied with −50 volts. The response time was 30 msec or shorter, and no display irregularity due to localization of the colored particles 2 was observed.

EXAMPLE 27

A display device was produced in the following manner through a process as illustrated in FIGS. 43A–43C.

On an outer side in a longitudinal direction of a light-transmissive tube 3 of 10 $\mu$m-thick PET film having a square section of 200 $\mu$m×200 $\mu$m with round corners, a 300 nm-thick and 150 $\mu$m-wide stripe of Al first electrode 8 was formed by vacuum evaporation. Further, on the opposite side of the tube 3 with respect to the Al electrode side, 300 nm-thick ITO films 90 of 150×150 $\mu$m-square were formed at a pitch of 200 $\mu$m along a longitudinal direction of the tube 3.

The tube 3 was filled with the same display medium DM as used in Example 24, and a plurality of the tubes 3 thus prepared were arranged in contact with each other on the same first substrate 4 as in Example 24 (FIG. 43B). Further thereon, the same second electrode 6 provided with second substrates 7 as in Example 24 (FIG. 43A) was placed so that the second substrates 7 contacted the ITO films 90 formed on the tubes 3. Further, the stacked structure after alignment of the substrates 4 and 6 and application of an adhesive was installed within an outer frame and heated for bonding of the substrates in the same manner as in Example 24 to provide a structure as shown in FIG. 43C. The structure was further provided with a voltage application means to complete a display device.

The thus-prepared display device was subjected to a display operation in the same manner as in Example 24, whereby a good display free from display irregularity due to localization of the colored particles 2 was performed at a response time of 30 msec or shorter.

EXAMPLE 28

A display device was produced in the following manner through a process as illustrated in FIGS. 42A–42D.

On an outer surface of and along a longitudinal generatrix of a 10 $\mu$m-thick light-transmissive cylindrical tube 3 of PES having an inner diameter of 200 $\mu$m, a 300 nm-thick and 100 $\mu$m-wide stripe of ITO first electrode 8 was formed.

A plurality of tubes 3 thus-treated were then filled with three colors of display media DM comprising three colors of insulating liquid 1 of silicone oil dyed with oil-soluble dyes of yellow, magenta and cyan, respectively, and 3 wt. % of white electrophoretic particles 2 of titanium oxide having particle sizes of 1–2 $\mu$m in a manner as illustrated in FIG. 8B, i.e., by dipping one end of each tube 3 containing white electrophoretic particles 2 uniformly attached to the inner wall thereof into a bath of insulating liquid 1 dyed in a prescribed color and introducing the colored insulating liquid 1 by sucking from the other end of the tube 3. After the filling, both ends of each tube 3 were sealed by heating. Thus three types of tubes 3 containing three colors of insulating liquid 1 were prepared.

Separately, on a light-transmissive second substrate 6 of 200 $\mu$m-thick PET film, a 300 nm-thick ITO film was formed and patterned by photolithography including dry etching to form second electrodes 7 of 150 $\mu$m-wide stripes at a pitch of 200 $\mu$m (FIG. 42A).

Then, the above-prepared three colors of tubes 3 each also provided with a first electrode 8 were arranged in a prescribed order on a first substrate 4 of 200 $\mu$m-thick PET film so that the first electrodes 8 thereon contacted the first substrate 4 (FIG. 42B but with no film 90).

Then, the above-prepared second substrate 6 provided with the second electrodes 7 (FIG. 42A) was placed on and in alignment with the above-prepared first substrate 4 on which the tubes 3 were arranged, and the substrates 4 and 6 were bonded to each other in the same manner as in Example 24 to provide a structure as shown in FIG. 42D (but with no film 90), which was then provided with a voltage application means to complete a display device.

The thus-prepared display device was subjected to voltage application of ±50 volts for observation from the second substrate 6 side. As the white particles 2 were negatively charged in the silicone oil 1, the particles 2 were moved to the first electrodes 8 to display the respective colors of the insulating liquids when the first electrodes were supplied with +50 volt and moved to the second electrodes 7 to provide a white display state when the second electrodes 7 were supplied with +50 volts. Accordingly, by changing a combination of voltages applied to the first electrode 8 and the second electrode 7 at respective pixels, a color display could be performed as combinations of yellow, magenta and cyan. The response time was 30 msec or shorter, and no display irregularity due to localization of the colored particles 2 was observed.

EXAMPLE 29

A display device was prepared in the same manner as in Example 28 except for using three colors of display media comprising a white insulating liquid 1 of dyed silicone oil and three colors of 1 to 2 μm-dia. electrophoretic particles 2 formed as mixtures of polystyrene and one of yellow, magenta and cyan colorants.

The thus-prepared display device was subjected to voltage application of ±50 volts for observation from the second substrate 6 side. As the colored particles 2 were positively charged in the silicone oil 1, the particles 2 were moved to the first electrodes 8 to display a white display state when the first electrodes were supplied with −50 volt and moved to the second electrodes 7 to display the respective colors of the colored particles 2 when the second electrodes 7 were supplied with −50 volts. Accordingly, by changing a combination of voltages applied to the first electrode 8 and the second electrode 7 at respective pixels, a color display could be performed as combinations of yellow, magenta and cyan. The response time was 30 msec or shorter, and no display irregularity due to localization of the colored particles 2 was observed.

EXAMPLE 30

A display device was prepared through similar steps as in Example 24 by using tubes 3 having an inner diameter of 30 μm, a smaller gap of 25 μm between the substrates 4 and 6, and colored particles of ca. 0.5–1.0 μm.

The thus-prepared display device was driven by application of ±50 volts. As a result of shorter migration distance by using a narrower gap, the response time could be reduced to 5 msec or shorter with no display irregularity due to localization of the colored electrophoretic particles.

According to this embodiment, similar effects as in Second embodiment can be attained while simplifying the processing of the substrates. Further the possibility of positional deviation between the first and second electrodes is reduced to allow less display irregularity.

(Sixth Embodiment)

FIG. 44 is a schematic perspective view of an electrophoretic display device according to this embodiment, and FIGS. 45A and 45B are partial sectional views thereof for illustrating an operation principle thereof.

This embodiment is different from Fifth embodiment in that the first electrodes 8 are disposed on the first substrate 4, and the second electrodes 7 are each disposed on the first substrate 4 side of and along a longitudinal direction of one of the tubes 3 and extend perpendicularly to and in lamination with the first electrodes 8 via an insulating layer 5 formed over the first electrodes 8.

In this embodiment, the first electrodes 8 and the second electrodes 7 are both arranged close to the first substrate 4, and as a result of voltage application between these electrodes, the colored electrophoretic particles 2 are moved between these electrodes, i.e., horizontally with respect or in parallel to the substrates 4 and 6 to effect an electrophoretic display.

The display principle is substantially identical to the one explained with reference to First embodiment as illustrated in FIGS. 44 to 49 corresponding to FIGS. 1 to 7 for First embodiment. For a better display quality, a masking pattern 16 may be formed (FIG. 46), and for color display, arbitrary color layers 17, 18 and 19 (FIGS. 47 and 48) may be formed, respectively, similarly as in First embodiment.

In order to ensure an electricity supply to the second electrodes 7 formed on the tubes 4, it is possible to form an electroconductive films (not shown, like ones denoted by numeral 90 in figures for Fifth embodiment) on the first substrate 4 in a form insulated from the first electrodes 8. As the display device is driven by voltage supply to the first and second electrodes 8 and 7, the form and size of a second electrode 7 may be determined based on a balance with a first electrode for a pixel concerned. The size of a second electrode 7 can be smaller or larger than a first electrode 8 for each pixel. The second electrode 7 may have a width and a thickness appropriately determined based on specification of a desired display device.

Figure 50A:
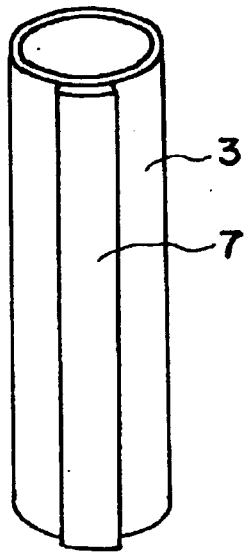
Figure 50B:
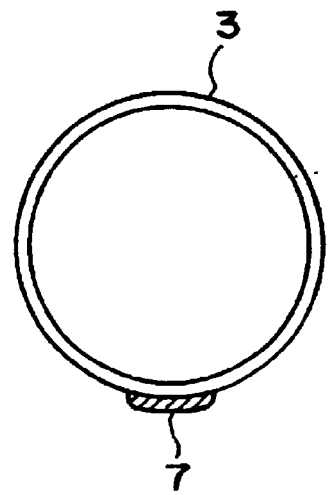
Figure 50C:
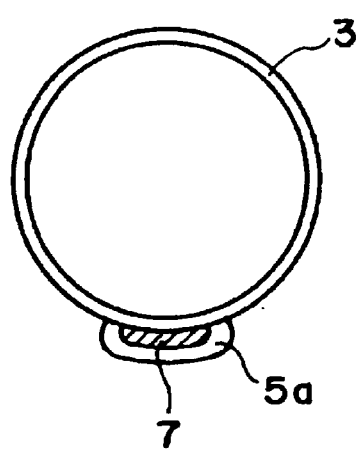

The display device according to this embodiment may be produced through processes as illustrated in FIGS. 51–53 similarly as in Fifth embodiment except that a relatively narrow second electrode 7 (instead of a first electrode 8 is formed on a tube 3) (FIGS. 50A and 50B). It is also possible to form an insulating layer 5a in advance on an outer side of the second electrodes 7 as shown in FIG. 50C at parts contacting the first electrodes 8 on the first substrate 4. The insulating layer 5a may be formed of, e.g., a transparent insulating material capable of forming pinhole-free films, such as polyimide and polyethylene terephthalate. The insulating layer 5a is formed in order to prevent an electrical connection between the first electrodes 8 on the first substrate 4 and the second electrode 7 formed on an outer surface of the tube 3. Accordingly, the insulating layer 5a can be formed around an entire circumference of the tube 3 while it can depend on other design factors. Alternatively, such insulating layer 5a may be omitted if an insulating layer 5 is formed over the first electrodes 8 as shown in FIG. 44.

Figure 50D:
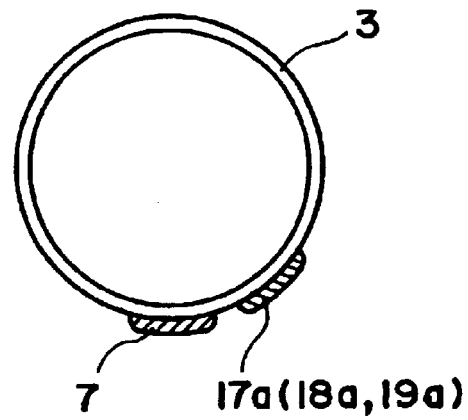

Further, in order to provide a display device as shown in FIG. 48 provided with color layers 17a, 18a and 19a, such a color layer 17a (or 18a or 19a) may be disposed as a stripe parallel to a stripe second electrode 7 on an outer surface of a tube 3 as shown in FIG. 50D.

The other features and materials for the respective members of the display device according to this embodiment are similar to those described with reference to First and Fifth embodiments.

Some specific examples according to this embodiment will be described below.

EXAMPLE 32

A display device having a structure as shown in FIGS. 44 and 45 was produced in the following manner through a process as illustrated in FIGS. 51A–51D.

On an outer surface of and along a longitudinal generatrix of a 10 μm-thick light-transmissive cylindrical tube 3 of PET having an inner diameter of 200 μm, a 300 nm-thick and 50 μm-wide stripe of Al second electrode 8 was formed by vacuum evaporation.

The tube 3 was then filled with a display medium DM comprising a transparent insulating liquid 1 of silicone oil and 3 wt. % of black electrophoretic particles 2 of a polystyrene-carbon mixture having particle sizes of 1–2 μm in a manner as illustrated in FIG. 8A. After the filling, both ends of the tube 3 were sealed up by heating.

Figure 51A:
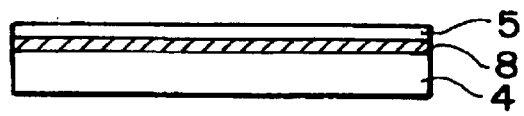

Separately, on a light-transmissive first substrate 4 of 200 μm-thick PET film, a 300 nm-thick ITO film was formed and patterned by photolithography including dry etching to form second electrodes 8 of 150 μm-wide stripes at a pitch of 200 μm, which were then coated with a 30 μm-thick white insulating layer 5 of PET colored with $TiO_2$ fine particles (FIG. 51A).

Figure 51B:
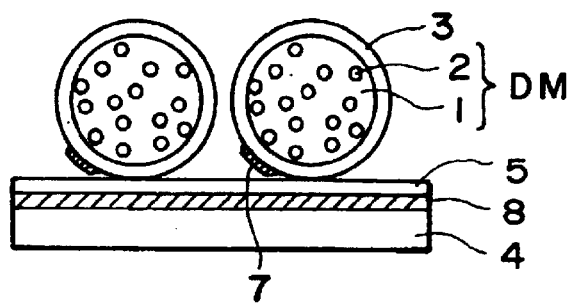

Then, a plurality of the above-prepared tubes 3 each provided with a second electrode 7 and filled with the display medium DM were arranged on the first substrate 4 so that the tubes 3 were perpendicular to the first electrodes 8 and the second electrodes 7 thereon contacted the insulating layer 5 on the first substrate 4 (FIG. 51B).

Figure 51C:
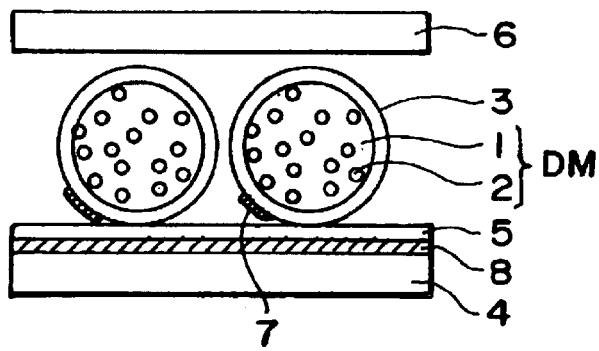
Figure 51D:
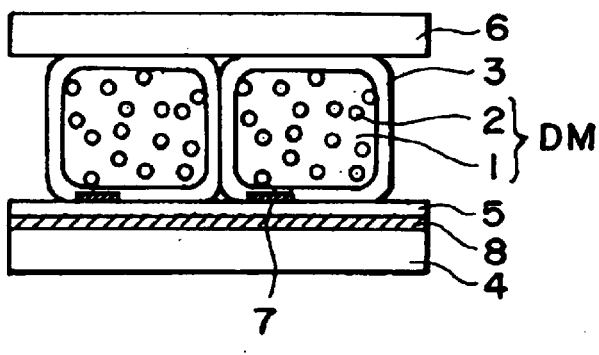

Then, a second substrate 6 of 200 $\mu$m-thick PET film was placed on the tubes 3 and positionally aligned with the first substrate 4 (FIG. 51C). Further, a casting polypropylene-type heat-curable adhesive was applied between the substrates at peripheries of the stacked structure, which was then installed within a PET-made outer frame (not shown) and heated at 100° C. via the outer frame while setting a gap between the substrates 4 and 6 at 140 $\mu$m. As a result, the upper and lower parts of the tubes 3 were made flat by contact with the substrates 6 and 4, the tubes 3 were disposed in intimate contact with each other to produce a structure as shown in FIG. 51D. Further, the structure was provided with a voltage application means to provide a display device.

The thus-prepared display device was subjected to a display operation to be observed from the second substrate 6 side by voltage application of ±50 volts between the first and second electrodes 8 and 7. In this example, the black particles 2 were positively charged in the insulating liquid 1 of silicone oil and moved toward an electrode supplied with a negative voltage. As a result, the black particles 2 were moved to the first electrodes 8 to provide a black display state when the first electrodes were supplied with −50 volts (FIG. 45A). On the other hand, the black particles 2 were moved to the second electrodes 7 to provide a grayish white display state when the second electrodes 7 were supplied with −50 volts (FIG. 45B). The response time was 30 msec or shorter. No display irregularity due to localization of the colored particles 2 was observed.

EXAMPLE 33

A display device was prepared though a process as illustrated in FIGS. 52A–52D.

A PET tube 3 of 200 $\mu$m was provided with a 50 $\mu$m-wide second electrode 7 of Al in the same manner as in Example 32 and the Al second electrode 7 was further coated with a 5 $\mu$m-thick and 100 $\mu$m-wide insulating layer 5a of PET at a pitch of 200 $\mu$m along the length of the tube 3. The tube 3 was then filled with the same display medium DM as used in Example 32.

Figure 52A:
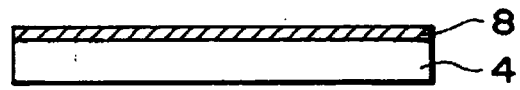
Figure 52B:
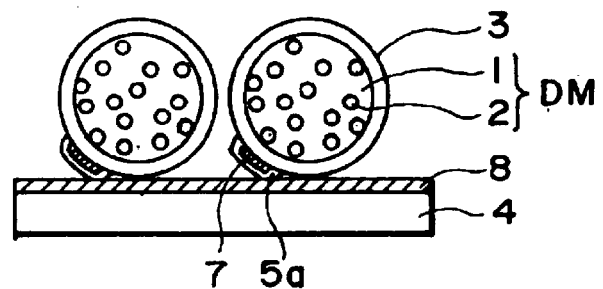
Figure 52C:
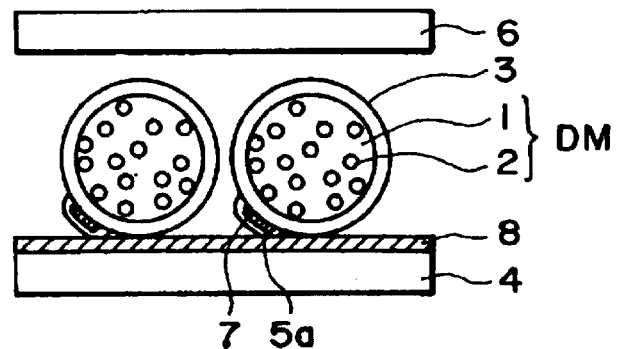
Figure 52D:
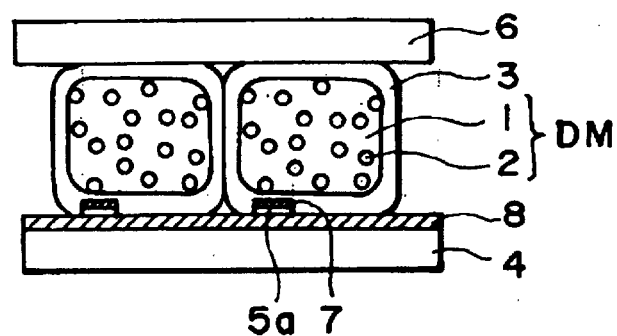

Separately, a first substrate 4 identical to the one used in Example 32 was provided with first electrodes 8 of ITO stripes (FIG. 52A) in the same manner as in Example 32. Thereon, a plurality of the above-processed tubes 3 were arranged so as to be perpendicular to the first electrodes 8 and so that the second electrodes 7 contacted the first substrate 4 via the insulating layer 5a, and a second substrate 6 identical to the one used in Example 32 was further disposed thereon (FIG. 52C). Thereafter, the structure was installed within an outer frame and subjected to bonding of the substrates 4 and 6, followed by provision of a voltage application means, in the same manner as in Example 32.

The thus-prepared display device was subjected to a display by application of ±50 volts in the same manner as in Example 32, whereby good display free from display irregularity due to localization of the colored particles was performed at a response time of 30 msec or shorter.

EXAMPLE 34

A color display device having an organization as illustrated in FIGS. 45A and 45B was prepared though a process as illustrated in FIGS. 51A–51D.

A PES tube 3 of 200 $\mu$m was provided with a 50 $\mu$m-wide second electrode 7 of Al in the same manner as in Example 32. A plurality of the tubes 3 thus treated were then filled with three colors of display media DM comprising three colors of silicone oil dyed with oil-soluble dyes of yellow, magenta and cyan, respectively, and 3 wt. % of white particles 2 of $TiO_2$ having particle sizes of 1–2 $\mu$m by a method as illustrated in FIG. 8B, whereby three types of tubes 3 containing three colors of electrophoretic particles 2 were prepared.

Separately, a first substrate 4 identical to the one used in Example 32 was provided with 50 $\mu$m-wide first electrodes 8 of ITO stripes and further coated with a 5 $\mu$m-thick transparent polyimide layer 5 otherwise in the same manner as in Example 32. Thereon, the above-processed three colors of tubes 3 were arranged so as to be perpendicular to the first electrodes 8 and so that the second electrodes 7 contacted the insulating layer 5 on the first substrate 4 (FIG. 51B), and a second substrate 6 identical to the one used in Example 32 was further disposed thereon (FIG. 51C). Thereafter, the structure was installed within an outer frame and subjected to bonding of the substrates 4 and 6, followed by provision of a voltage application means, in the same manner as in Example 32.

The thus-prepared display device was subjected to voltage application of ±50 volts for observation from the first substrate 4 side. As the white particles 2 were negatively charged in the silicone oil 1, the particles 2 were moved to the first electrodes 8 to provide a white display state when the first electrodes were supplied with +50 volt and moved to the second electrodes 7 to display the respective colors of the colored insulating liquids 1 when the second electrodes 7 were supplied with +50 volts. Accordingly, by changing a combination of voltages applied to the first electrode 8 and the second electrode 7 at respective pixels, a color display could be performed as combinations of yellow, magenta and cyan. The response time was 30 msec or shorter, and no display irregularity due to localization of the colored particles 2 was observed.

EXAMPLE 35

A color display device having an organization as illustrated in FIG. 46 was prepared through a process similar to the one illustrated in FIGS. 51A–51D.

Three colors of display media DM were prepared as mixtures of an insulating liquid 1 of silicone oil and 1 to 2 $\mu$m-dia. colored particles comprising polystyrene in mixture with colorants of yellow, magenta and cyan, respectively. A plurality of tubes 3 each provided with a second electrode 7 were separately filled with the above three colors of display media DM otherwise in the same manner as in Example 33 to prepare three types of tubes.

Separately, a first substrate 4 of 200 $\mu$m-thick PET film was coated with a white layer containing $TiO_2$ particles (not shown), and further provided thereon with first electrodes 8 of 300 nm-thick and 150 $\mu$m-wide ITO stripes at a pitch of 200 $\mu$m and a 5 $\mu$m-thick transparent polyimide insulating layer 5 (close to FIG. 51A).

On the thus-processed first substrate 4, the above-prepared three colors of the tubes 3 each provided with a second electrode 7 were arranged in a prescribed order so that the second electrodes 7 thereon were perpendicular to the first electrodes 8 and contacted the insulation layer 5 on the first substrate 4 (FIG. 51B).

Separately, on a second substrate 6 of 200 $\mu$m-thick PET film, a dark black-colored 300 nm-thick titanium carbide film was formed and patterned by photolithography including dry etching to form masking stripes 16 (FIG. 46) corresponding to second electrodes 7. The thus-treated second substrate 6 was disposed on the tubes 3 arranged on the first substrate 4 with the masking stripes 16 downward so as to be aligned with the second electrodes 7 after deformation of the tubes 3 (close to FIG. 51C). Then, the structure was installed within an outer frame, bonding of the substrates and provision of a voltage application means in the same manner as in Example 32 to complete a display device.

The thus-prepared display device was subjected to voltage application of ±50 volts for observation from the second substrate 6 side. As the colored particles 2 were positively charged in the silicone oil 1, the particles 2 were moved to the first electrodes 8 to display the respective colors of the colored particles 2 when the first electrodes were supplied with −50 volt and moved to the second electrodes 7 to display a white color of the first electrodes 8 when the second electrodes 7 were supplied with +50 volts. Accordingly, by changing a combination of voltages applied to the first electrode 8 and the second electrode 7 at respective pixels, a color display could be performed as combinations of yellow, magenta and cyan. The response time was 30 msec or shorter, and no display irregularity due to localization of the colored particles 2 was observed.

EXAMPLE 36

A color display having an organization of FIG. 47 was prepared through a process as illustrated in FIGS. 53A–53D.

Tubes 3 each provided a second electrode 7 and filled with a display medium were formed in the same manner as in Example 32 except for using a display medium comprising a insulating liquid 1 of silicone oil and 3 wt. % of 1 to 2 $\mu$m-dia. white colored particles 2 of $TiO_2$.

Figure 53A:
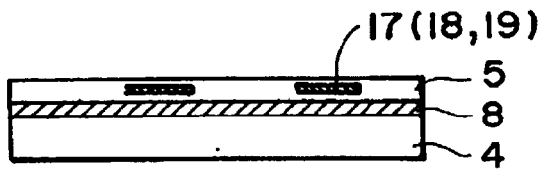

Separately, a first substrate 4 identical to the one used in Example 32 was provided with stripe first electrodes 8 of ITO and coated with a 5 $\mu$m-thick transparent polyimide layer (as a lower half of 5), on which colored layers 17, 18 and 19 of yellow, magenta and cyan respectively in the form of stripes were formed in a prescribed order and so as to extend perpendicularly to the first electrodes 8 and then further coated with a 5 $\mu$m-thick transparent polyimide layer (upper half of 5), thereby providing a structure of processed first substrate 4 as shown in FIG. 53A.

Figure 53B:
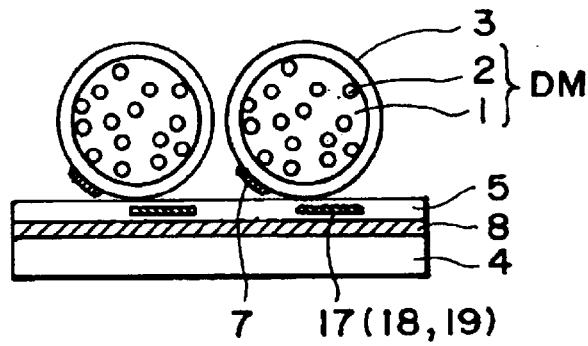
Figure 53C:
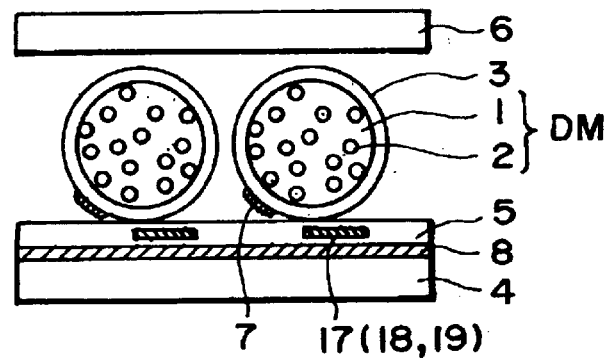

Then, the above-prepared tubes 3 each provided with a second electrode 7 and filled with a display medium were arranged on the above-processed first substrate 4 so that each second electrodes 7 thereon was parallel to the color stripes 17 (18, 19) and disposed between adjacent color stripes 17 (18, 19) (FIG. 53B).

Figure 53D:
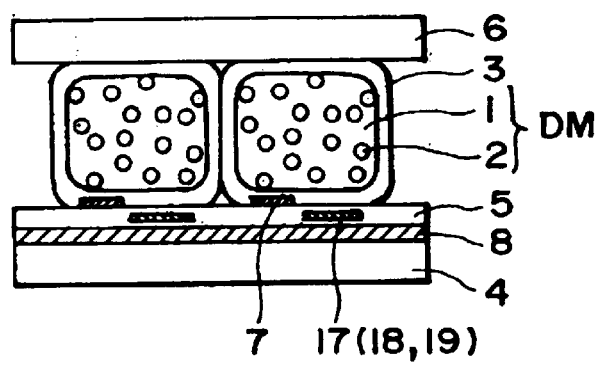

Then, a second substrate 6 identical to the one used in Example 32 was placed thereover (FIG. 53C), and the structure was installed within an outer frame, bonding of the substrates 4 and 6, and provision of a voltage application means in the same manner as in Example 32 to provide a display device having a structure as shown in FIG. 47 (FIG. 53D).

The thus-prepared display device was subjected to voltage application of ±60 volts for observation from the second substrate 6 side. As the white particles 2 were negatively charged in the silicone oil 1, the particles 2 were moved to the first electrodes 8 to provide a white display state (as shown in FIG. 47) when the first electrodes were supplied with +60 volt and moved to the second electrodes 7 to display the respective colors of the color layers 17, 18 and 19 when the second electrodes 7 were supplied with +50 volts. Accordingly, by changing a combination of voltages applied to the first electrode 8 and the second electrode 7 at respective pixels, a color display could be performed as combinations of yellow, magenta and cyan. The response time was 30 msec or shorter, and no display irregularity due to localization of the colored particles 2 was observed.

EXAMPLE 37

A color display device having an organization as shown in FIG. 48 was prepared through a process as illustrated in FIGS. 54A–54D.

Three tubes 3 each provided with a second electrode 7 similarly as in Example 32 were further provided with one of three color layers 17a (yellow), 18a (magenta) and 19a (cyan), respectively. The thus-obtained three colors of tubes 3 were further filled with the same display medium as in Example 36 comprising a transparent insulating liquid 1 of insulating liquid 1 and white colored particles 2.

Figure 54A:
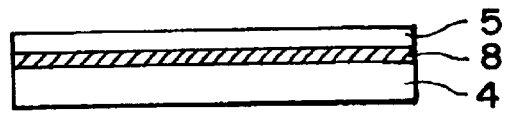
Figure 54B:
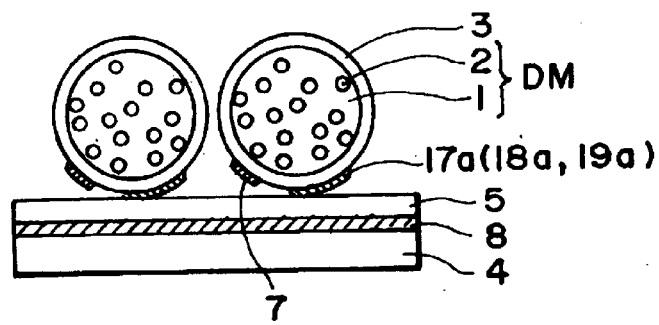
Figure 54C:
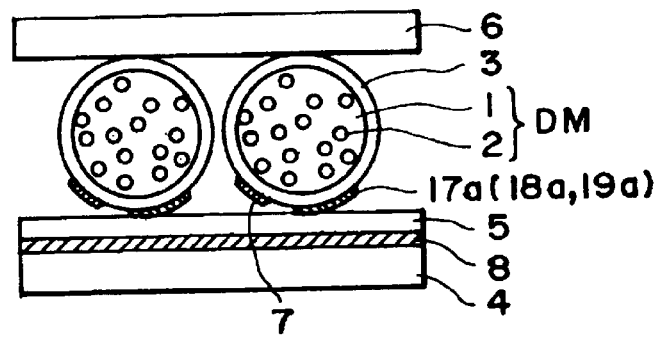
Figure 54D:
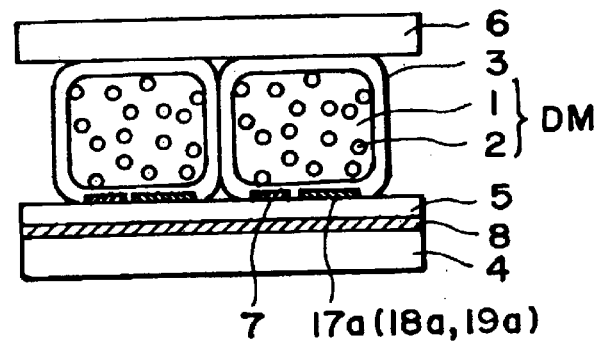

Separately, a first substrate 4 identical to the one used in Example 32 was provided with stripe first electrodes 8 and a transparent insulating layer 5 (FIG. 54A) in the same manner as in Example 32. The above-prepared three colors of tubes 3 were arranged thereon in a prescribed order of color layers 17a, 18a and 19a (FIG. 54B), a second substrate 6 identical to the one used in Example 32 was placed thereover (FIG. 54C), and the structure was installed within an outer frame, bonding of the substrates 4 and 6, and provision of a voltage application means in the same manner as in Example 32 to provide a display device having a structure as shown in FIG. 48 (FIG. 54D).

The thus-prepared display device was subjected to voltage application of ±60 volts for observation from the second substrate 6 side. As the white particles 2 were negatively charged in the silicone oil 1, the particles 2 were moved to the first electrodes 8 to provide a white display state (as shown in FIG. 48) when the first electrodes were supplied with +60 volt and moved to the second electrodes 7 to display the respective colors of the color layers 17a, 18a and 19a) when the second electrodes 7 were supplied with +60 volts. Accordingly, by changing a combination of voltages applied to the first electrode 8 and the second electrode 7 at respective pixels, a color display could be performed as combinations of yellow, magenta and cyan. The response time was 30 msec or shorter, and no display irregularity due to localization of the colored particles 2 was observed.

EXAMPLE 38

A display device was prepared through similar steps as in Example 32 by using tubes 3 having an inner diameter of 30 $\mu$m, colored particles of ca. 0.5–1.0 $\mu$m and first electrodes 8 and second electrodes 7 in smaller widths of 20 $\mu$m and 10 $\mu$m, respectively.

The thus-prepared display device was driven by application of ±50 volts. As a result of shorter migration distance by using narrower electrodes, the response time could be reduced to 5 msec or shorter with no display irregularity due to localization of the colored electrophoretic particles.

According to this embodiment, the effects of First and Fifth embodiments can be attained in combination.

(Seventh Embodiment)

Figure 55:
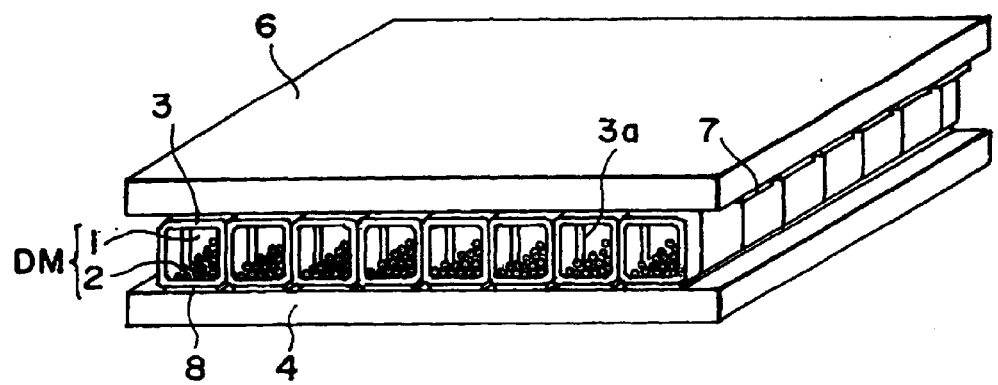
Figure 56A:
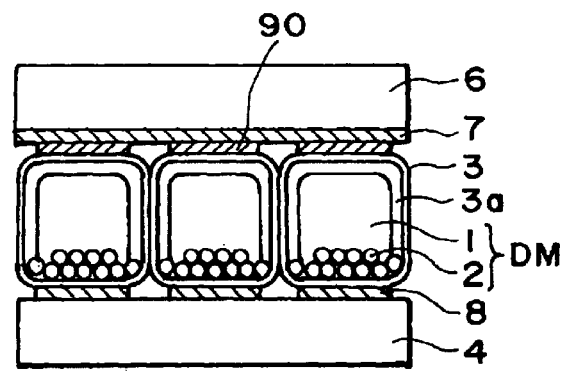
Figure 56B:
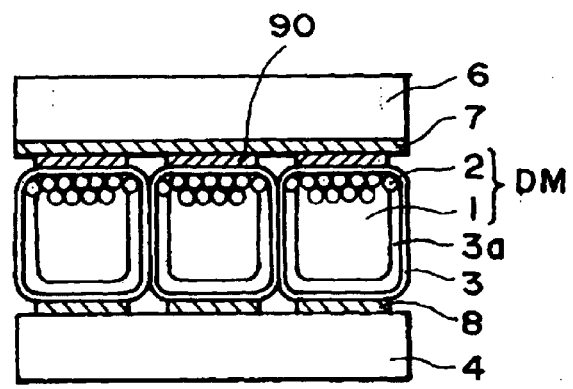

FIG. 55 is a schematic perspective view of an electrophoretic display device according to this embodiment, and FIGS. 56A and 56B are partial sectional views thereof for illustrating an operation principle thereof.

This embodiment illustrated in FIGS. 55–60 is different from Fifth embodiment described with reference to FIGS.

39 to 43 in that each tube 3 is provided with a plurality of projections 3a from the inner wall thereof at prescribed intervals for obstructing the movement of colored electrophoretic particles 2 in a longitudinal direction thereof. The other features are substantially identical to those in Fifth embodiment.

Some specific examples according to this embodiment will be described hereinbelow.

EXAMPLE 39

A display device was prepared through a process as illustrated in FIGS. 58A and 59A–59E.

A cylindrical light-transmissive tube 3 of 10 μm-thick PET film having an inner diameter of 200 μm was locally periodically heated by causing heat shrinkage to be provided with inner wall projections 3a at a pitch of 180 μm providing constricted inner wall diameters of 100–150 μm. On an outer surface of and along a longitudinal generatrix of the tube 3, a 200 nm-thick and 100 μm-wide Al first electrode 8 was formed by vacuum evaporation (FIGS. 57A and 57B).

Figure 58A:
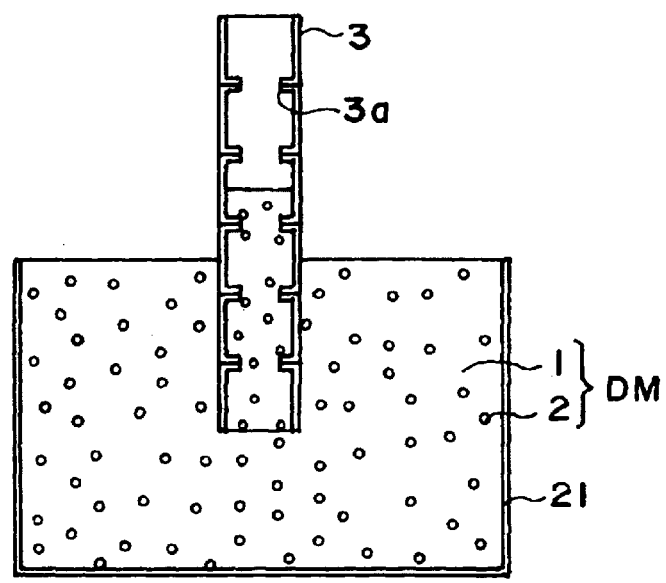

The thus-processed tube 3 was then filled with a display medium DM comprising a white insulating liquid 1 of silicone oil dyed with an oil-soluble white dye and 3 wt. % of black electrophoretic particles 2 of a polystyrene-carbon mixture having particle sizes of 1–2 μm in a manner as illustrated in FIG. 58A, i.e., by dipping one end of the tube 3 having inner wall projections 3a into a bath of the display medium DM under sufficient stirring in a vessel 21 and sucking from the other end of the tube 3. After the filling, both ends of the tube 3 were sealed up by heating.

Figure 59A:
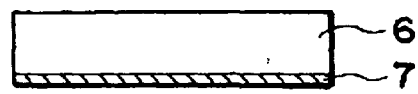

Separately, on a light-transmissive second substrate 6 of 200 μm-thick PET film, a 300 nm-thick ITO film was formed and patterned by photolithography including dry etching to form second electrodes 7 of 140 μm-wide stripes at a pitch of 150 μm (FIG. 59A).

Figure 59B:
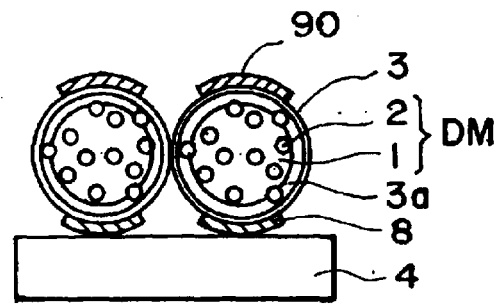

Then, a plurality of the above-prepared tubes 3 each provided with a first electrode 8 and filled with the display medium DM were arranged on a first substrate 4 of 200 μm-thick PET film so that the first electrodes 8 thereon contacted the first substrate 4 (FIG. 59B but with no film 90).

Figure 59C:
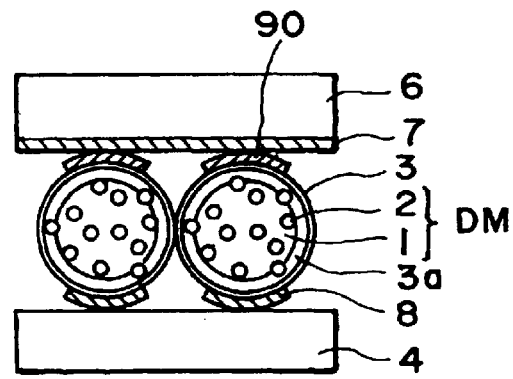
Figure 59D:
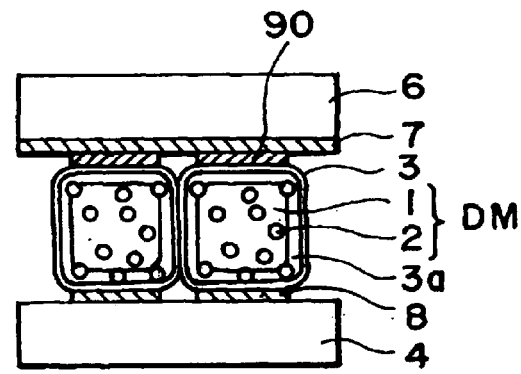
Figure 59E:
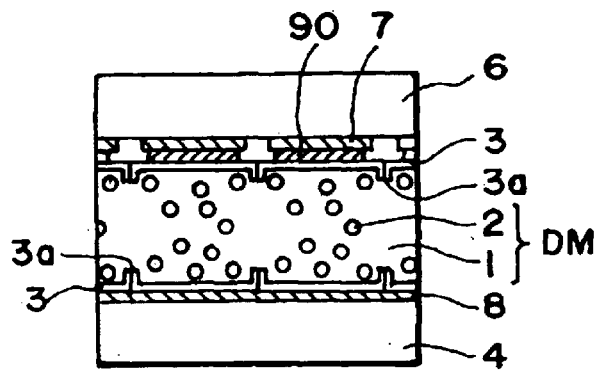

Then, the above-prepared second substrate 6 provided with the second electrodes 7 (FIG. 59A) was placed on the tubes 3 so that the second electrodes 7 contacted the tubes 3 and the second electrodes 7 were perpendicular to the second electrodes 8 and the second substrate 6 was positionally aligned with the first substrate 4 (FIG. 59C). Further, a casting polypropylene-type heat-curable adhesive was applied between the substrates at peripheries of the stacked structure, which was then installed within a PET-made outer frame (not shown) and heated at 100° C. via the outer frame while setting a gap between the substrates 4 and 6 at 140 μm. As a result, the upper and lower parts of the tubes 3 were made flat by contact with the substrates 6 and 4, the tubes 3 were disposed in intimate contact with each other to produce a structure as shown in FIGS. 59D and 59E (but with no films 90). Further, the structure was provided with a voltage application means to provide a display device.

The thus-prepared display device was subjected to a display operation to be observed from the second substrate 6 side by voltage application of ±50 volts between the first and second electrodes 8 and 7. In this example, the black particles 2 were positively charged in the insulating liquid 1 of silicone oil and moved toward an electrode supplied with a negative voltage. As a result, the black particles 2 were moved to the first electrodes 8 to provide a white display state when the first electrodes were supplied with −50 volts (FIG. 56A). On the other hand, the black particles 2 were moved to the second electrodes 7 to provide a black display state when the second electrodes 7 were supplied with −50 volts (FIG. 56B). The response time was 30 msec or shorter. No display irregularity due to localization of the colored particles 2 was observed.

EXAMPLE 40

A display device was prepared through a process as illustrated in FIG. 58B and FIGS. 60A–60D.

On an outer surface of and along a longitudinal generatrix of a cylindrical light-transmissive tube 3 of 10 μm-thick PET film having an inner diameter of 100 μm used in Example 39, a 10 μm-thick and 100 μm-wide stripe first electrode 8 of Ag paste was formed by printing. Further, at parts free from the first electrode 8 on the outer surface of the tube 3, 30 μm-high external projections 9b of PET were formed at a pitch of 300 μm along a longitudinal generatrix of the tube 3. Then, the tube 3 was filled with the same display medium DM as used in Example 39 in a manner illustrated in FIG. 58B, i.e., by dipping one end of the tube 3 containing black electrophoretic particles 2 attached to the inner wall thereof into a bath 21 of the white-dyed insulating liquid 1 and introducing the white insulating liquid 1 by sucking the other end of the tube 3. After filling both ends of the tube 3 were sealed by heating.

Figure 60A:
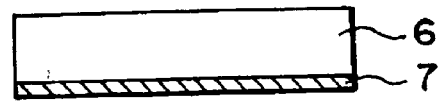
Figure 60B:
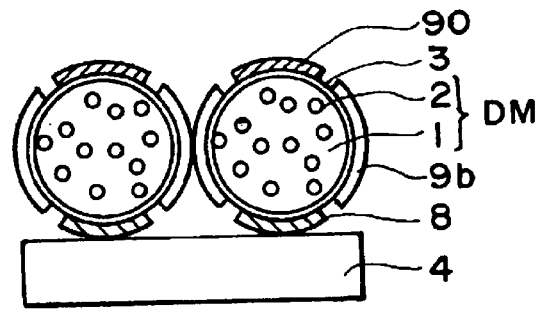
Figure 60C:
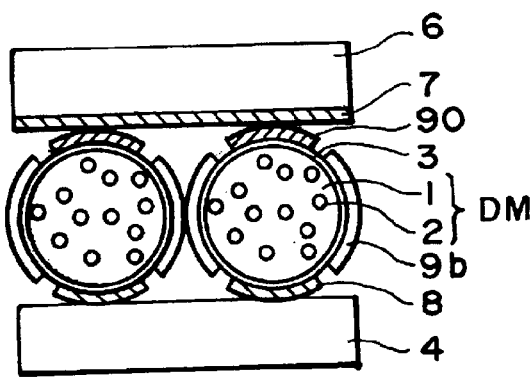
Figure 60D:
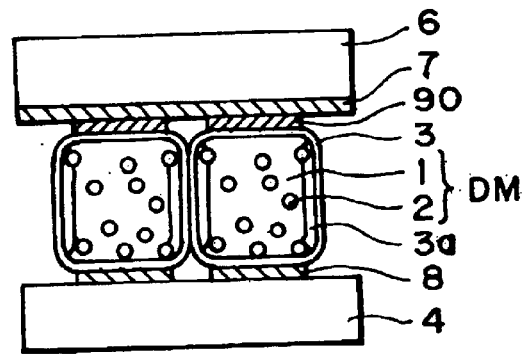

After providing a second substrate 6 with second electrodes 7 similarly as in Example 39 (FIG. 60A), a plurality of the tubes 3 process in the above-described manner were arranged in contact with each other on a first substrate 4 identical to the one used in Example 39 so that the first electrodes 8 on the tubes 3 contacted the first substrate 4 (FIG. 60B but with no films 90), and the above-prepared second substrate 6 provided with the second electrodes 7 were placed thereon so that the second electrodes 7 contacted the tubes 3 (FIG. 60C but with no films 90).

The structure was then installed in an outer frame, and the substrates 4 and 6 were bonded to each while setting a gap of 200 μm therebetween under heating similarly as in Example 39. As a result, the tubes 3 were disposed in intimate contact with each and with their upper and lower surfaces made flat and in intimate contact with the second substrate 6 and first substrate 4 while the side walls were provided with inner projections 3a by pressing with the outer projections 9b provided on the tubes 3.

The thus-prepared display device was subjected to a display operation in the same manner as in Example 39, whereby a good display free from display irregularity due to localization of the colored particles was realized at a response time of 30 msec or shorter.

EXAMPLE 41

A display device was produced in the following manner through a process similar to the one illustrated in FIGS. 43A–43C.

A light-transmissive tube 3 of 8 μm-thick PET film having a square section of 200 μm×200 μm with round corners was locally periodically heated for causing heat shrinkage to be provided with 30 μm-high circumferential inner wall projections 3a at a pitch of 250 μm in the longitudinal direction of the tube 3. On an outer side in the longitudinal direction of the tube 3, a 300 nm-thick and 100 μm-wide stripe of ITO first electrode 8 was formed by ion plating. Further, on the opposite side of the tube 3 with respect to the ITO electrode side, 200 nm-thick Al conductive films 90 of 150×150

μm-square were formed at a pitch of 200 μm along a longitudinal direction of the tube 3.

The tube 3 was filled with the same display medium DM as used in Example 39, and a plurality of the tubes 3 thus prepared were arranged in contact with each other on the same first substrate 8 as in Example 39 (FIG. 43B). Further thereon, the same second electrode 6 provided with second substrates 7 as in Example 24 (FIG. 43A) was placed so that the second substrates 7 contacted the ITO films 9 formed on the tubes 3. Further, the stacked structure after alignment of the substrates 4 and 6 and application of an adhesive was installed within an outer frame and heated for bonding of the substrates while setting a gap between the substrates of 220 μm to provide a structure as shown in FIG. 43C (but further including the inner projections 3a). The structure was further provided with a voltage application means to complete a display device.

The thus-prepared display device was subjected to a display operation in the same manner as in Example 39, whereby a good display free from display irregularity due to localization of the colored particles 2 was performed at a response time of 30 msec or shorter.

EXAMPLE 42

A light-transmissive cylindrical tube 3 of 10 μm-thick PET film having an inner diameter of 200 μm was locally periodically heated to provide circumferential inner wall projections 3a giving an inner diameter of 100–150 μm. Then, on an outer wall of the tube 3, a 100 μm-wide stripe first electrode 8 of 200 nm-thick Pt was formed.

Figure 58B:
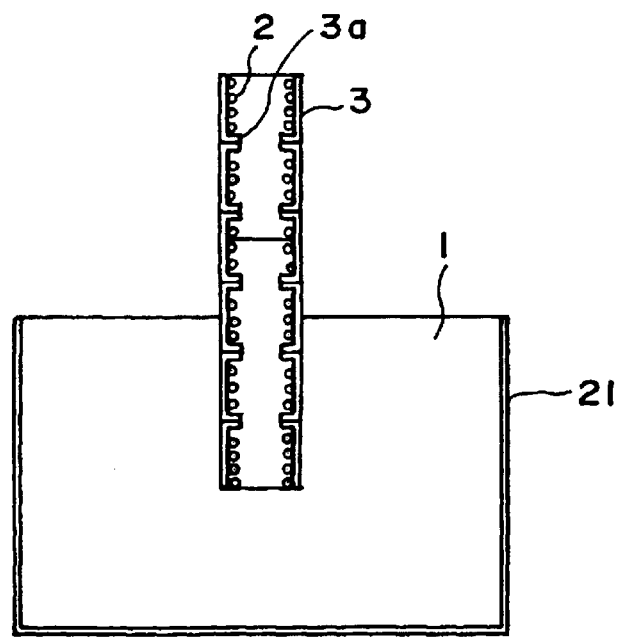

A plurality of tubes thus-treated were then filled with three colors of display media DM comprising three colors of insulating liquid 1 of silicone oil dyed with oil-soluble dyes of yellow, magenta and cyan, respectively, and 2 wt. % of white electrophoretic particles 2 of 1 to 2 μm-dia. $TiO_2$ particles in a manner as illustrated in FIG. 58B. After the filling, both ends of each tube were sealed by heating. Thus, three types of tubes 3 containing three colors of insulating liquid 1 were prepared.

Then, the thus-prepared three colors of tubes 3 were arranged in a prescribed order on a first substrate 4 provided with first electrodes 8, and a second substrate 6 provided with second electrodes 7 was placed thereon and bonded to the first substrate 4 in the same manner as in Example 39, followed by provision of a voltage application means to complete a display device.

The thus-prepared display device was subjected to voltage application of ±50 volts for observation from the second substrate 6 side. As the white particles 2 were negatively charged in the silicone oil 1, the particles 2 were moved to the first electrodes 8 to display the respective colors of the insulating liquids when the first electrodes were supplied with +50 volt and moved to the second electrodes 7 to provide a white display state when the second electrodes 7 were supplied with +50 volts. Accordingly, by changing a combination of voltages applied to the first electrode 8 and the second electrode 7 at respective pixels, a color display could be performed as combinations of yellow, magenta and cyan. The response time was 30 msec or shorter, and no display irregularity due to localization of the colored particles 2 was observed.

EXAMPLE 43

A plurality light-transmissive PET tubes 3 used in Example 39 were filled with three display media comprising a white insulating liquid 1 of dyed silicone oil and three colors of 1 to 2 μm-dia. electrophoretic particles 2 formed as mixture of polystyrene and one of yellow, magenta and cyan colorants in a manner as illustrated in FIG. 58B.

Then, each tube 3 filled with a display medium was provided with inner wall projections giving a remaining inner diameter of 50–100 μm at a pitch of 200 μm along the length of the tube 3 by press-forming using a pressing tool while heating the tube 3. Further, on the outer surface of the tube 3, a 100 μm-wide stripe first electrode 8 of 200 nm-thick Ag was formed. Thus, three colors of tubes 3 each provided with a first electrode 8 were prepared.

Then, the thus-prepared three colors of tubes 3 were arranged in a prescribed order on a 200 μm-thick first substrate 4, identical to the one used in Example 39, and a second substrate 6 provided with second electrodes 7 was placed thereon and bonded to the first substrate 4 in the same manner as in Example 39, followed by provision of a voltage application means to complete a display device.

The thus-prepared display device was subjected to voltage application of ±50 volts for observation from the second substrate 6 side. As the colored particles 2 were positively charged in the silicone oil 1, the particles 2 were moved to the first electrodes 8 to display a white color of the insulating liquid 1 when the first electrodes were supplied with −50 volt and moved to the second electrodes 7 to display the respective colors of the colored particles 2 when the second electrodes 7 were supplied with +50 volts. Accordingly, by changing a combination of voltages applied to the first electrode 8 and the second electrode 7 at respective pixels, a color display could be performed as combinations of yellow, magenta and cyan. The response time was 30 msec or shorter, and no display irregularity due to localization of the colored particles 2 was observed.

EXAMPLE 44

A display device was prepared through similar steps as in Example 39 by using tubes 3 having an inner diameter of 30 μm, colored particles of ca. 0.5–1.0 μm and a smaller gap of 25 μm between the substrates.

The thus-prepared display device was driven by application of ±50 volts. As a result of shorter migration distance by using a smaller gap between the substrates, the response time could be reduced to 5 msec or shorter with no display irregularity due to localization of the colored electrophoretic particles.

According to this embodiment, the effects of Third and Fifth embodiments can be attained in combination.

(Eighth Embodiment)

Figure 61:
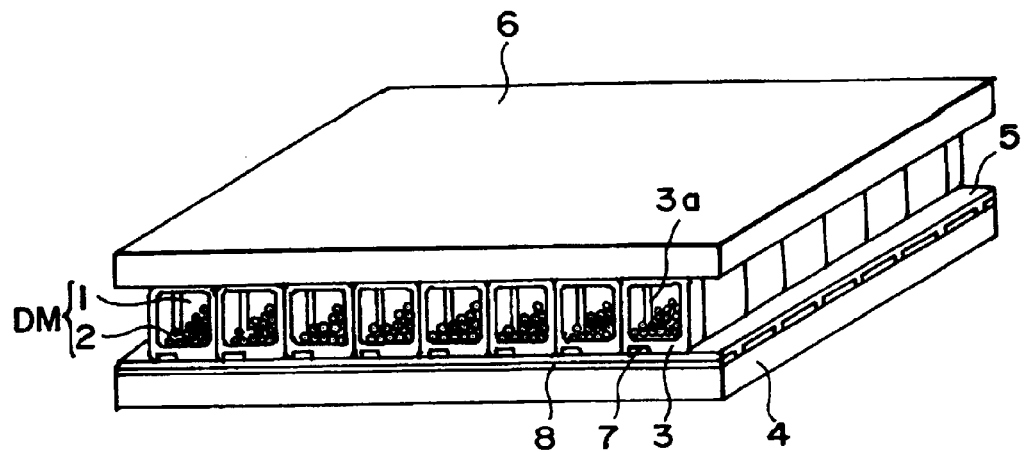
Figure 62A:
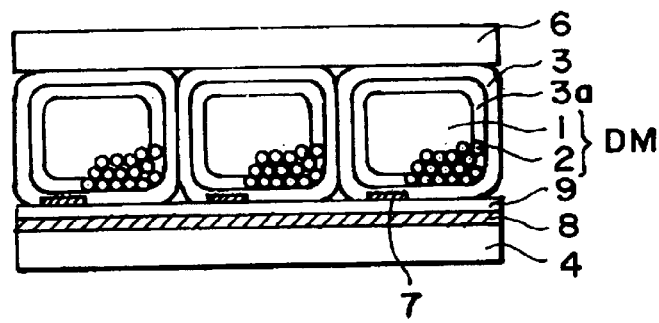
Figure 62B:
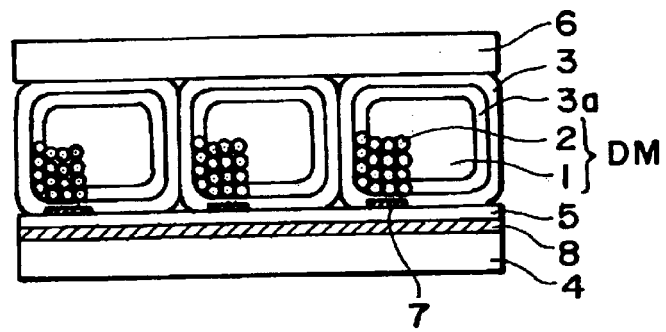
Figure 63A:
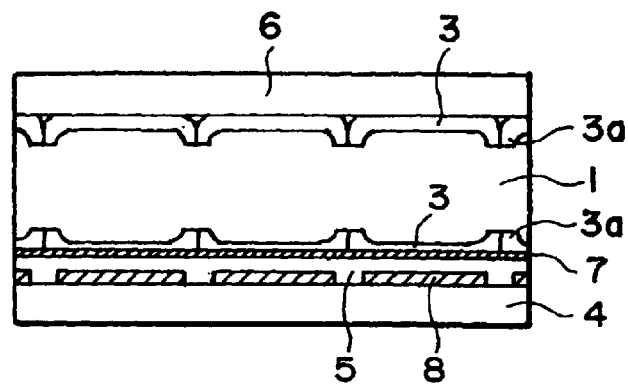
Figure 63B:
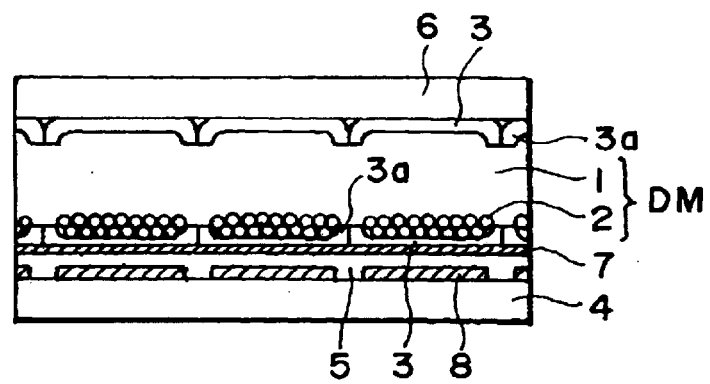

FIG. 61 is a schematic perspective view of an electrophoretic display device according to this embodiment, and FIGS. 62A and 62B (transverse sectional views) and FIGS. 63A and 63B (longitudinal sectional views) are partial sectional views thereof for illustrating an operation principle thereof.

This embodiment illustrated in FIGS. 61 to 70 is different from Sixth embodiment described with reference to FIGS. 44 to 54 in that each tube 3 is provided with a plurality of projections 3a from the inner wall thereof at prescribed intervals for obstructing the movement of colored electrophoretic particles 2 in a longitudinal direction thereof. The other features are substantially identical to those in Sixth embodiment.

Some specific examples according to this embodiment will be described hereinbelow.

EXAMPLE 45

A display device having a structure as shown in FIGS. 61 to 63 was prepared through a process as illustrated in FIGS. 67A–67B and 68A–68E.

A cylindrical light-transmissive tube 3 of 10 μm-thick PET having an inner diameter of 200 μm was locally periodically heated for causing heat-shrinkage to be provided with inner wall projections 3a at a pitch of 180 μm providing constricted inner wall diameter of 100–150 μm. On an outer surface of and along a longitudinal generatrix of the deformed tube 3, a 0.2 μm-thick and 50 μm-wide Al second electrode 7 was formed by vacuum evaporation (FIGS. 67A and 67B).

The thus-processed tube 3 was then filled with a display medium DM comprising a transparent insulating liquid 1 of silicone oil and 3 wt. % of black electrophoretic particles 2 of a polystyrene-carbon mixture having particle sizes of 1–2 μm in a manner as illustrated in FIG. 58A, i.e., by dipping one end of the tube 3 into a bath of the display medium DM under sufficient stirring in a vessel 21 and sucking from the other end of the tube 3. After the filling, both ends of the tube 3 were sealed up by heating.

Figure 68A:
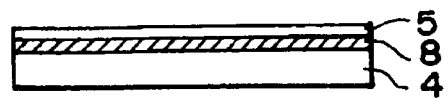

Separately, on a first substrate 4 of 200 μm-thick PET film, a 300 nm-thick ITO film was formed and patterned by photolithography including dry etching to form first electrode 8 of 150 μm-wide stripes at a pitch of 200 μm, which were then coated with a 3 μm-thick insulation layer 5 of acrylic resin colored with $TiO_2$ fine particles (FIG. 68A).

Figure 68B:
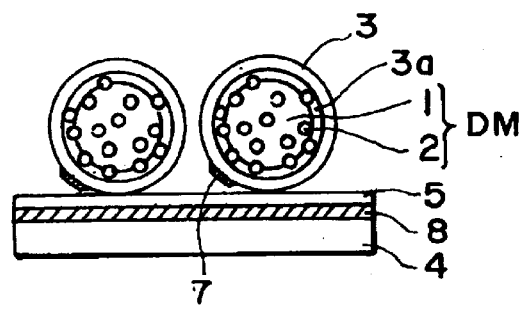

Then, a plurality of the above-prepared tubes 3 each provided with a second substrate 7 and filled with the display medium DM were arranged on the first substrate 4 so that the tubes 3 were perpendicular to the first electrodes 8 and the second electrodes thereon contacted the insulating layer 5 on the first substrate 4 (FIG. 68B).

Figure 68C:
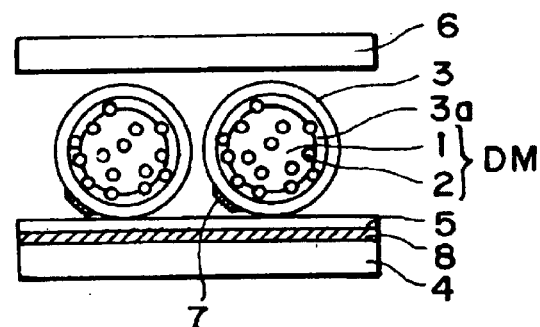
Figure 68D:
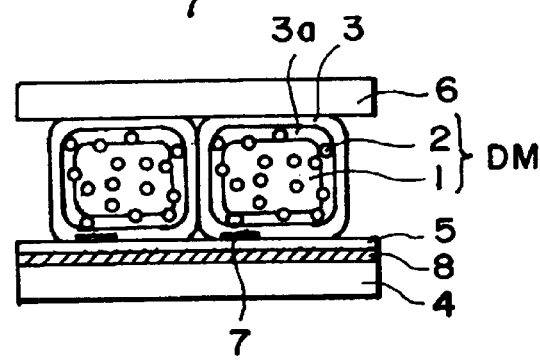
Figure 68E:
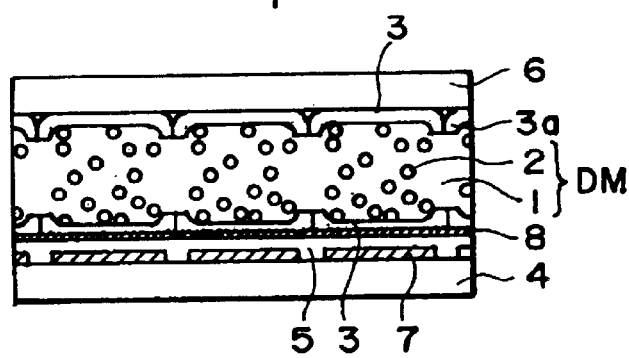

Then, a second substrate 6 of 200 μm-thick PET film was placed on the tubes 3 so that the second electrodes 7 contacted the tubes 3 and positionally with the first substrate 4 (FIG. 68C). Further, a casting polypropylene-type heat-curable adhesive was applied between the substrates at peripheries of the stacked structure, which was then installed within a PET-made outer frame (not shown) and heated at 100° C. via the outer frame while setting a gap between the substrates 4 and 6 at 150 μm. As a result, the upper and lower parts of the tubes 3 were made flat by contact with the substrates 6 and 4, the tubes 3 were deformed and disposed in intimate contact with each other while reducing a distance between the upper and lower portions of the projections 3a to produce a structure as shown in FIGS. 68D and 68E. Further, the structure was provided with a voltage application means to provide a display device.

The thus-prepared display device was subjected to a display operation to be observed from the second substrate 6 side by voltage application of ±50 volts between the first and second electrodes 8 and 7. In this example, the black particles 2 were positively charged in the insulating liquid 1 of silicone oil and moved toward an electrode supplied with a negative voltage. As a result, the black particles 2 were moved to the first electrodes 8 to provide a black display state when the first electrodes were supplied with −50 volts (FIGS. 62A and 63A). On the other hand, the black particles 2 were moved to the second electrodes 7 to provide a grayish white display state when the second electrodes 7 were supplied with −50 volts (FIGS. 62B and 63B). The response time was 30 msec or shorter. No display irregularity due to localization of the colored particles 2 was observed.

EXAMPLE 46

A display device was prepared through a process as illustrated in FIGS. 67C–67D and 69A–69D.

A cylindrical light-transmissive PET tube 3 of 200 μm in inner diameter was filled with the same display medium DM as in Example 45 in a manner as illustrated in FIG. 58B. The tube 3 was locally periodically heated in a longitudinal direction for causing local heat-shrinkage, while taking care of not causing the denaturation of the display medium therein, to form local inner wall projections having a height of 40 μm at a pitch of ca. 200 μm.

Then, on an outer wall of and on the same side as the inner wall projections of the tube 3, a 0.2 μm-thick and ca. 50 μm-wide second electrode 7 of Cu stripe was applied and coated with a 0.3 μm-thick polyimide layer 5a by painting (FIGS. 67C and 67D).

Figure 69A:
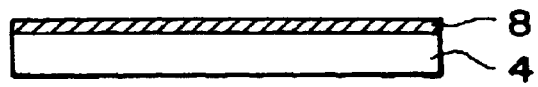
Figure 69B:
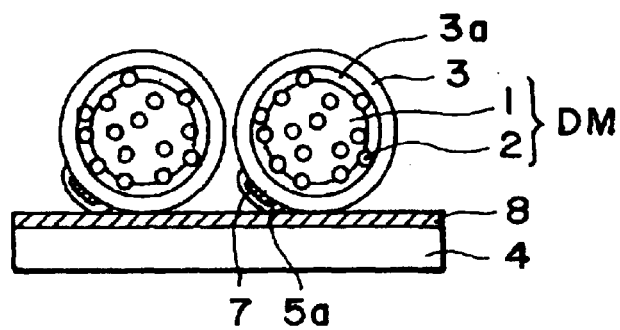
Figure 69C:
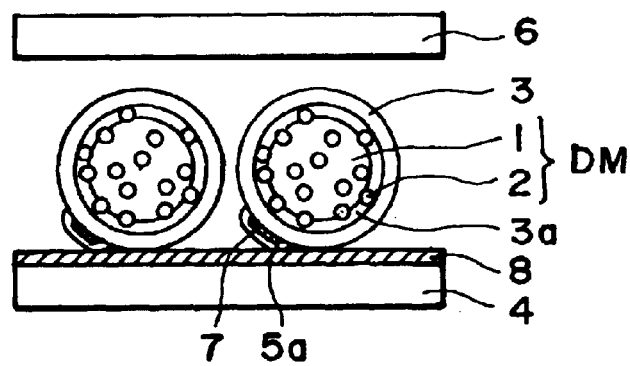

Then, in the same manner as in Example 45, a first substrate 4 was provided with first electrodes 8 (FIG. 69A), and a plurality of the above-processed tubes 3 were arranged thereon so that the longitudinal direction of the tubes 3 was perpendicular to the stripe first electrodes 8 and the insulating layers 5a on the second electrodes 7 contacted the first electrodes 8 (FIG. 69B).

Figure 69D:
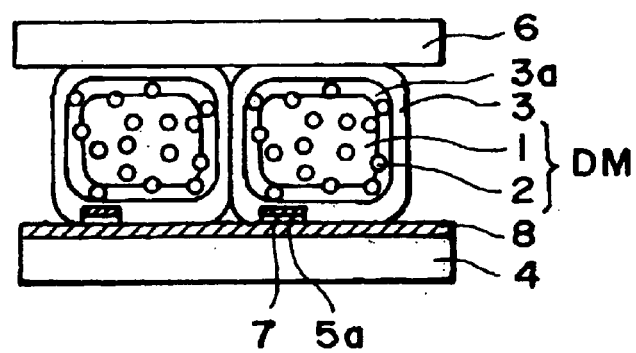

Thereafter, a second substrate 6 of PET film as used in Example 45 further provided with masking patterns (not shown) at parts corresponding the second electrodes 7 was placed thereon, and after alignment of the substrates 4 and 6, the substrates were bonded to each other while setting a gap therebetween at 200 μm within an outer frame to form a structure shown in FIG. 69D, which was then provided with a voltage application means to complete a display device.

The thus-prepared display device was subjected to a display operation for observation from the second substrate 6 side under application of ±50 volts in the same manner as in Example 45. As a result, a good display similarly as in Example 45 was performed at a response time of 30 msec or shorter while causing no display irregularity due to localization of the colored particles 2.

EXAMPLE 47

A color display device having an organization as illustrated in FIG. 61 was prepared through a process as illustrated in FIGS. 68A–68E.

A light-transmissive tube 3 of PES having an inner diameter of 200 μm was locally periodically heated in a longitudinal direction for causing local heat-shrinkage to provide 40 μm-high local inner wall projections at a pitch of ca. 200 μm. Then, on an outer wall of the tube 3, a dark black titanium carbide film was formed and patterned by photolithography including dry etching to form a 50 μm-wide and 0.3 μm-thick stripe second electrode 7 (FIGS. 67A and 67B).

A plurality of the thus-prepared tubes 3 were filled with three colors of display media DM comprising three colors of insulating liquid 1 of silicone oil dyed with yellow, magenta and cyan dyes, respectively, and 3 wt. % of white particles 2 of $TiO_2$ having particle sizes of 1–2 μm, in a manner as illustrated in FIG. 58A, followed by sealing of both ends. Thus, three colors of tubes 3 were prepared.

Separately, a first substrate 4 identical to the one used in Example 45 was provided with 50 μm-wide first electrodes 8 of ITO stripes and further coated with a 5 μm-thick transparent polyimide layer 5 otherwise in the same manner as in Example 45. Thereon, the above-processed three colors of tubes 3 were arranged in a prescribed order so as to be perpendicular to the first electrodes 8 and so that the second electrodes 7 contacted the insulating layer 5 on the first substrate 4 (FIG. 68B), and a second substrate 6 identical to the one used in Example 45 was further disposed thereon (FIG. 68C). Thereafter, the structure was installed within an outer frame and subjected to bonding of the substrates 4 and 6, followed by provision of a voltage application means, in the same manner as in Example 45.

The thus-prepared display device was subjected to voltage application of ±50 volts for observation from the first substrate 4 side. As the white particles 2 were negatively charged in the silicone oil 1, the particles 2 were moved to the first electrodes 8 to provide a white display state when the first electrodes were supplied with +50 volt and moved to the second electrodes 7 to display the respective colors of the insulating liquids 1 when the second electrodes 7 were supplied with +50 volts. Accordingly, by changing a combination of voltages applied to the first electrode 8 and the second electrode 7 at respective pixels, a color display could be performed as combinations of yellow, magenta and cyan. The response time was 30 msec or shorter, and no display irregularity due to localization of the colored particles 2 was observed.

EXAMPLE 48

Figure 64:
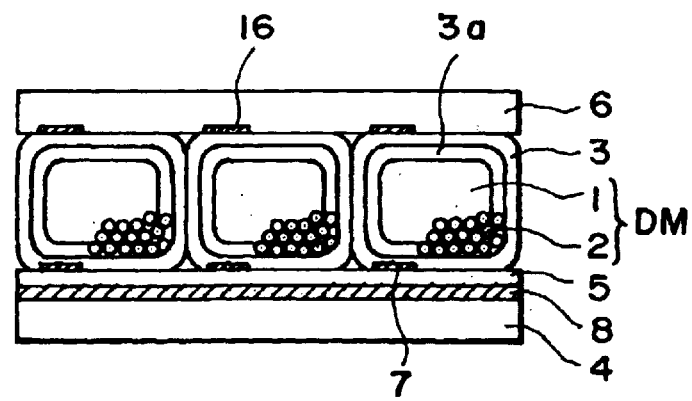

A color display device having an organization as illustrated in FIG. 64 was prepared through a process similar to the one illustrated in FIGS. 69A–69D.

A plurality of light-transmissive tubes 3 of PET used in Example 45 were fitted with three colors of display media DM prepared as mixtures of an insulating liquid 1 of silicone oil and 1 to 2 $\mu$m-dia. colored particles comprising polystyrene in mixture with colorants of yellow, magenta and cyan, respectively, in a manner as illustrated in FIG. 58B.

Each tube 3 filled with a display medium was subjected to heat-shrinkage by using a pressing tool to provide circumferentially extending 30 $\mu$m-high inner wall projections at a pitch of 200 $\mu$m in a longitudinal direction of the tube 3.

Then, on an outer surface of the tube 3, a 0.3 $\mu$m-thick and 50 $\mu$m-wide stripe of second electrode 7 of dark black titanium carbide was formed and covered with a 0.5 $\mu$m thick and 80 $\mu$m-wide transparent polyimide layer 5a (FIGS. 67C and 67D).

Separately, a first substrate 4 of 200 $\mu$m-thick PET film was provided with first electrodes 8 of 300 nm-thick and 150 $\mu$m-wide ITO stripes at a pitch of 200 $\mu$m and a 5 $\mu$m-thick transparent polyimide insulating layer 5 (not shown) (close to FIG. 69A).

On the thus-processed first substrate 4, the above-prepared three colors of the tubes 3 each provided with a second electrode 7 and an insulating layer 5a were arranged in a prescribed order so that the second electrodes 7 thereon were perpendicular to the first electrodes 8 and the insulating layers 5a thereon contacted the first substrate 4 (FIG. 69B).

Separately, on a second substrate 6 of 200 $\mu$m-thick PET film, a dark black-colored 300 nm-thick titanium carbide film was formed and patterned by photolithography including dry etching to form masking stripes 16 (not shown) corresponding to second electrodes 7. The thus-treated second substrate 6 was disposed on the tubes 3 arranged on the first substrate 4 with the masking stripes 16 downward so as to be aligned with the second electrodes 7 after deformation of the tubes 3 (close to FIG. 69C). Then, the structure was installed within an outer frame, bonding of the substrates and provision of a voltage application means in the same manner as in Example 45 to complete a display device.

The thus-prepared display device was subjected to voltage application of ±50 volts for observation from the second substrate 6 side. As the colored particles 2 were positively charged in the silicone oil 1, the particles 2 were moved to the first electrodes 8 to display the respective colors of the colored particles 2 when the first electrodes were supplied with −50 volt and moved to the second electrodes 7 to display a white color of the first electrodes 8 when the second electrodes 7 were supplied with +50 volts. Accordingly, by changing a combination of voltages applied to the first electrode 8 and the second electrode 7 at respective pixels, a color display could be performed as combinations of yellow, magenta and cyan. The response time was 30 msec or shorter, and no display irregularity due to localization of the colored particles 2 was observed.

EXAMPLE 49

Figure 65A:
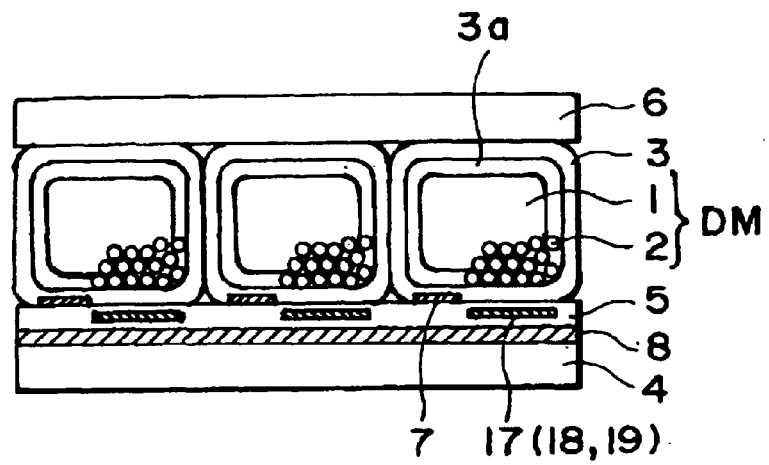
Figure 65B:
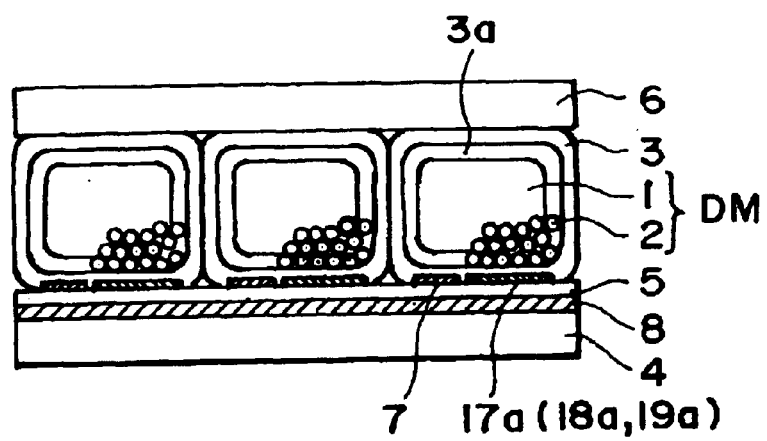
Figure 66A:
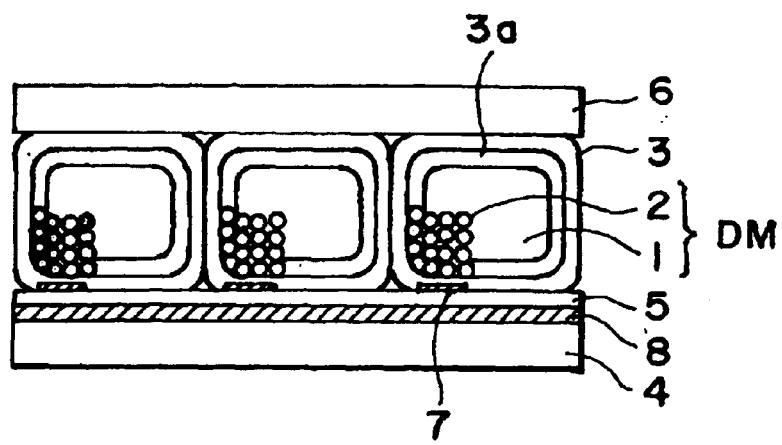
Figure 66B:
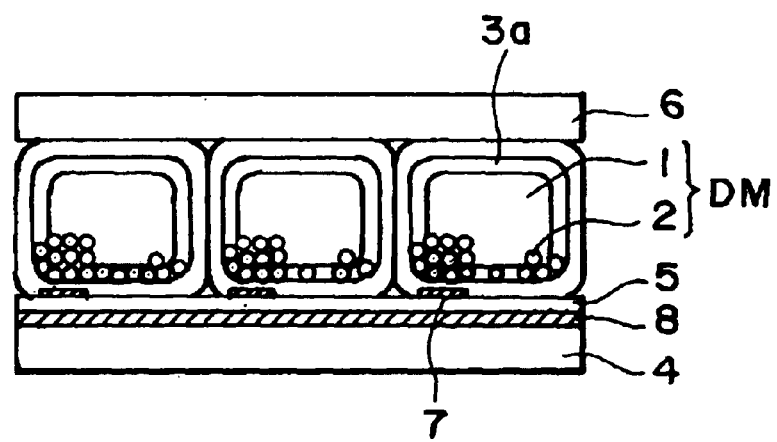

A color display having an organization of FIG. 65A was prepared through a process as illustrated in FIGS. 70A–70D.

Tubes 3 each provided with a second electrode 7 and filled with a display medium were formed in the same manner as in Example 45 except for reducing the tube inner diameters to 100 $\mu$m and using a display medium comprising an insulating liquid 1 of silicone oil and 3 wt. % of 1 to 2 $\mu$m-dia. white colored particles 2 of $TiO_2$.

Figure 70A:
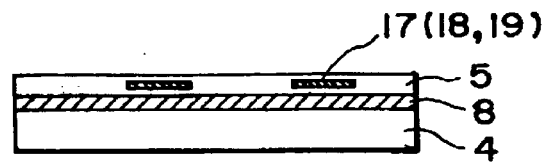

Separately, a light-transmissive first substrate 4 of 200 $\mu$m-thick PET film was provided with 0.3 $\mu$m-thick and 150 $\mu$m-wide stripe first electrodes 8 of ITO at a pitch of 200 $\mu$m and coated with a 0.2 $\mu$m-thick transparent polyimide layer (as a lower half of 5), on which colored layers 17, 18 and 19 of yellow, magenta and cyan respectively in the form of 0.2 $\mu$m-thick and 100 $\mu$m-wide stripes were formed in a prescribed order and so as to extend perpendicularly to the first electrodes 8 and then further coated with a 0.5 $\mu$m-thick transparent polyimide layer (upper half of 5), thereby providing a structure of processed first substrate 4 as shown in FIG. 70A.

Figure 70B:
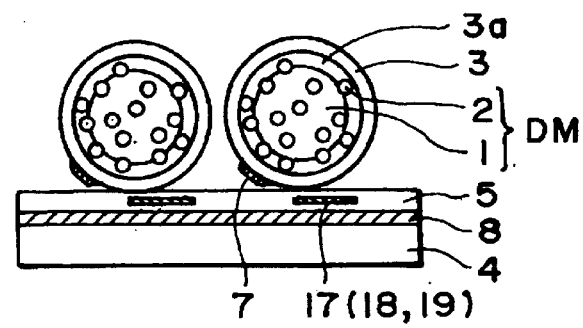
Figure 70C:
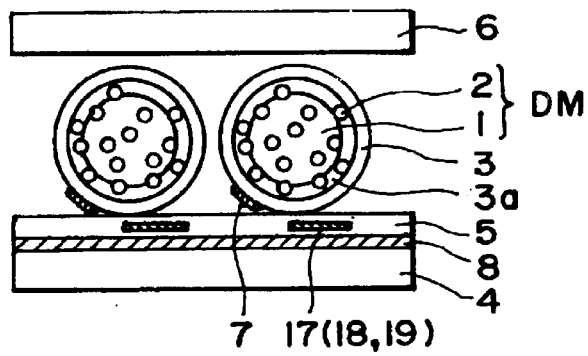

Then, the above-prepared tubes 3 each provided with a second electrode 7 and filled with a display medium were arranged on the above-processed first substrate 4 so that each second electrodes 7 thereon was parallel to the color stripes 17 (18, 19) and disposed between adjacent color stripes 17 (18, 19) (FIG. 70B).

Figure 70D:
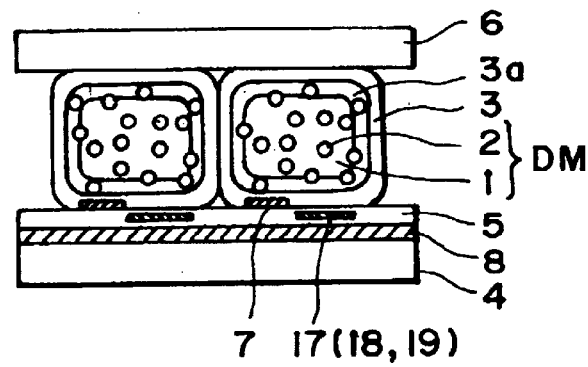

Then, a second substrate 6 identical to the one used in Example 45 was placed thereover (FIG. 70C), and the structure was installed within an outer frame, bonding of the substrates 4 and 6, and provision of a voltage application means in the same manner as in Example 32 to provide a display device having a structure as shown in FIG. 65A (FIG. 70D).

The thus-prepared display device was subjected to voltage application of ±60 volts for observation from the second substrate 6 side. As the white particles 2 were negatively charged in the silicone oil 1, the particles 2 were moved to the first electrodes 8 to provide a white display state when the first electrodes were supplied with +60 volt and moved to the second electrodes 7 to display the respective colors of the color layers 17, 18 and 19 when the second electrodes 7 were supplied with +50 volts. Accordingly, by changing a combination of voltages applied to the first electrode 8 and the second electrode 7 at respective pixels, a color display could be performed as combinations of yellow, magenta and cyan. The response time was 30 msec or shorter, and no display irregularity due to localization of the colored particles 2 was observed.

Further, in case where the display device was driven by reducing the voltage application time to 5 msec, the brightness of the respective colors could be reduced to nearly a half, whereby a gradational color display characteristic by various selection voltage application time was confirmed.

EXAMPLE 50

A display device was prepared through similar steps as in Example 45 by using tubes 3 having an inner diameter of 30

μm, colored particles of ca. 0.5–1.0 μm and first electrodes 8 and second electrodes 7 in smaller widths of 20 μm and 10 μm, respectively.

The thus-prepared display device was driven by application of ±60 volts. As a result of shorter migration distance by using narrower electrodes, the response time could be reduced to 5 msec or shorter with no display irregularity due to localization of the colored electrophoretic particles.

According to this embodiment, the effects of third and sixth embodiments can be attained in combination.

What is claimed is:

1. A display device, comprising:
   a first substrate and a second substrate disposed opposite to each other;
   a display medium comprising an insulating liquid and electrophoretic colored particles dispersed therein and disposed between the first and second substrates; and
   first electrodes and second electrodes for applying a voltage to the display medium so as to move the colored particles between a pair of a first electrode and a second electrode to effect a display depending on a voltage between the pair of first and second electrodes, wherein
   a plurality of light-transmissive tubes are each filled with the display medium and are disposed parallel to each other between the first and second substrates,
   a plurality of the first electrodes in the form of stripes are disposed between the first substrate and the tubes so that each first electrode extends in alignment with an associated one tube, and
   the second electrodes are disposed to intersect the first electrodes.

2. A display device according to claim 1, wherein the second electrodes are disposed between the tubes and the second substrate, and the colored particles are moved vertically to the substrates.

3. A display device according to claim 2, wherein a pair of the first electrodes and the first substrates, or a pair of the second electrodes and the first substrate, or a pair of the second electrodes and the second substrate, is light-transmissive.

4. A display device according to claim 2, wherein an electroconductive film is disposed between the second electrodes and the tubes.

5. A display device according to claim 1, wherein the first electrodes and the second electrodes are both disposed between the first substrate and the tubes while being electrically insulated from each other, and the colored particles are moved parallel to the substrates.

6. A display device according to claim 4, wherein either the second substrate is light-transmissive, or the first and second electrodes and the second substrate are light-transmissive.

7. A display device according to claim 1, wherein the light-transmissive tubes are formed of a resin.

8. A display device according to claim 1, wherein the light-transmissive tubes are flexible.

9. A display device according to claim 1, wherein the insulating liquid and the colored particles are colored in different colors.

10. A display device according to claim 1, wherein one of the insulating liquid and the colored particles is colored in yellow, magenta or cyan, and is separately contained in different tubes for respective colors.

11. A display device according to claim 10, wherein the tubes of yellow, magenta and cyan are arranged in a prescribed order.

12. A display device according to claim 1, wherein the second electrodes are formed in stripes and disposed to intersect the first electrodes at right angles to form an electrode matrix.

13. A process for producing a display device according to claim 1, comprising:
    forming a stripe first electrode on an outer surface of and in a longitudinal direction of a light-transmissive tube comprising an insulating material,
    filling a tube with a display medium comprising an insulating liquid and electrophoretic colored particles dispersed therein, and
    disposing and fixing a plurality of tubes between a first substrate and a second substrate, one of which has been provided with second electrodes, so that the first electrode on the tube contacts the first substrate.

14. A process according to claim 13, wherein the insulating liquid and the colored particles are simultaneously introduced in the tube.

15. A process according to claim 13, wherein the insulating liquid and the colored particles are separately introduced into the tube.

16. A process according to claim 13, wherein the light-transmissive tube has a rectangular cross section.

17. A process according to claim 13, wherein the light-transmissive tubes are flexible and are deformed while changing their sectional shape to be in intimate contact with each other when the tubes are disposed and fixed between the first and second substrates.

18. A display device, comprising:
    a first substrate and a second substrate disposed opposite to each other;
    a display medium comprising an insulating liquid and electrophoretic colored particles dispersed therein and disposed between the first and second substrates; and
    first electrodes and second electrodes for applying a voltage to the display medium so as to move the colored particles between a pair of a first electrode and a second electrode to effect a display depending on a voltage between the pair of first and second electrodes, wherein
    a plurality of light-transmissive tubes are each filled with the display medium and are disposed parallel to each other between the first and second substrates,
    each tube is provided with inner wall projections disposed at a regular interval in its longitudinal direction,
    a plurality of the first electrodes in the form of stripes are disposed between the first substrate and the tubes so that each first electrode extends in alignment with an associated one tube, and
    the second electrodes are disposed to intersect the first electrodes.

19. A display device according to claim 18, wherein the second electrodes are disposed between the tubes and the second substrate, and the colored particles are moved vertically to the substrates within a section partitioned by neighboring two of the inner wall projections.

20. A display device according to claim 19, wherein a pair of the first electrodes and the first substrate, or a pair of the second electrodes and the second substrate, is light-transmissive.

21. A display device according to claim 19, wherein an electroconductive film is disposed between the second electrodes and the tubes.

22. A display device according to claim 18, wherein the first electrodes and the second electrodes are both disposed between the first substrate and the tubes while being electrically insulated from each other, and the colored particles are moved parallel to the substrates within a section partitioned by neighboring two of the inner wall projections.

23. A display device according to claim 22, wherein either the second substrate is light-transmissive, or the first and second electrodes and the second substrate are light-transmissive.

24. A display device according to claim 18, wherein each tube is provided with the inner wall projections along its side wall perpendicular to the substrates.

25. A display device according to claim 18, wherein the light-transmissive tubes are formed of a resin.

26. A display device according to claim 18, wherein the light-transmissive tubes are flexible.

27. A display device according to claim 18, wherein the insulating liquid and the colored particles are colored in different colors.

28. A display device according to claim 18, wherein one of the insulating liquid and the colored particles is colored in yellow, magenta or cyan, and is separately contained in different tubes for respective colors.

29. A display device according to claim 28, wherein the tubes of yellow, magenta and cyan are arranged in a prescribed order.

30. A display device according to claim 18, wherein the second electrodes are formed in stripes and disposed to intersect the first electrodes at right angles to form an electrode matrix.

31. A process for producing a display device according to claim 18, comprising:

forming a stripe first electrode on an outer surface of and in a longitudinal direction of a light-transmissive tube comprising an insulating material, forming projections at a regular interval in a longitudinal direction on an inner wall of the tube, filling a tube with a display medium comprising an insulating liquid and electrophoretic colored particles dispersed therein, and disposing and fixing a plurality of tubes between a first substrate and a second substrate, one of which has been provided with second electrodes, so that the first electrode on the tube contacts the first substrate.

32. A process according to claim 31, wherein the insulating liquid and the colored particles are simultaneously introduced in the tube.

33. A process according to claim 31, wherein the insulating liquid and the colored particles are separately introduced into the tube.

34. A process according to claim 31, wherein the light-transmissive tube has a rectangular cross section.

35. A process according to claim 31, wherein the light-transmissive tubes are flexible and are deformed while charging their sectional shape to be in intimate contact with each other when the tubes are disposed and fixed between the first and second substrates.

36. A process according to claim 31, wherein the light-transmissive tube comprises a heat-shrinkable material, and the inner wall is formed by heat-shrinkage of the tube.

37. A process according to claim 31, wherein the inner wall projections are formed by pressing the light-transmissive tube with a pressing tool.

38. A process according to claim 31, wherein the light-transmissive tubes are each provided with external projections on each outer wall, and the external projections are pressed inside to form the inner wall projections when the light-transmissive tubes are disposed and fixed between the first and second substrates.

* * * * *

UNITED STATES PATENT AND TRADEMARK OFFICE
CERTIFICATE OF CORRECTION

| | |
|---|---|
| PATENT NO. | : 6,876,476 B1 |
| APPLICATION NO. | : 09/572328 |
| DATED | : April 5, 2005 |
| INVENTOR(S) | : Naoko Miura et al. |

It is certified that error appears in the above-identified patent and that said Letters Patent is hereby corrected as shown below:

COLUMN 5:

Line 53, "deice" should read --device--.

COLUMN 11:

Line 38, "(FIG. 1D)," should read --(FIG. 11D),--.
    Line 41, "FIG. 1E," should read --FIG. 11E,--.

COLUMN 37:

Line 17, "volt" should read --volts--.
    Line 65, "volt" should read --volts--.

COLUMN 38:

Line 37, "volt" should read --volts--.
    Line 39, "19a)" should read --19a--.

COLUMN 40:

Line 29, "tubes 3 process" should read --tubes 3, processed-- and "manner" should read --manner,--.
    Line 38, "while" should read --other while--.

COLUMN 42:

Line 25, "volt" should read --volts--.

UNITED STATES PATENT AND TRADEMARK OFFICE
CERTIFICATE OF CORRECTION

PATENT NO. : 6,876,476 B1
APPLICATION NO. : 09/572328
DATED : April 5, 2005
INVENTOR(S) : Naoko Miura et al.

It is certified that error appears in the above-identified patent and that said Letters Patent is hereby corrected as shown below:

COLUMN 43:

Line 32, "with" should read --aligned with--.

COLUMN 45:

Line 8, "volt" should read --volts--.

COLUMN 46:

Line 2, "volt" should read --volts--.
Line 49, "volt" should read --volts--.

COLUMN 47:

Line 8, "third" should read --Third--.
Line 9, "sixth" should read --Sixth--.

Signed and Sealed this

Eighteenth Day of July, 2006

JON W. DUDAS
*Director of the United States Patent and Trademark Office*